(12) United States Patent
Kimura et al.

(10) Patent No.: US 8,650,943 B2
(45) Date of Patent: Feb. 18, 2014

(54) APPARATUS FOR DETERMINING AN AIR-FUEL RATIO IMBALANCE AMONG CYLINDERS OF AN INTERNAL COMBUSTION ENGINE

(75) Inventors: Koichi Kimura, Numazu (JP); Hiroshi Sawada, Gotenba (JP); Toru Kidokoro, Hadano (JP); Yasushi Iwazaki, Ebina (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 152 days.

(21) Appl. No.: 13/393,148

(22) PCT Filed: Aug. 28, 2009

(86) PCT No.: PCT/JP2009/065457
§ 371 (c)(1),
(2), (4) Date: Mar. 8, 2012

(87) PCT Pub. No.: WO2011/024324
PCT Pub. Date: Mar. 3, 2011

(65) Prior Publication Data
US 2012/0160022 A1 Jun. 28, 2012

(51) Int. Cl.
*G01M 15/10* (2006.01)
(52) U.S. Cl.
USPC ........................................ 73/114.72
(58) Field of Classification Search
USPC ................. 73/23.31, 23.32, 114.69, 114.71, 73/114.72, 114.75
See application file for complete search history.

(56) References Cited

U.S. PATENT DOCUMENTS

| 7,152,594 | B2 | 12/2006 | Anilovich et al. |
| 8,452,517 | B2* | 5/2013 | Sawada et al. ................ 701/101 |
| 2007/0017210 | A1 | 1/2007 | Hirata et al. |
| 2009/0037079 | A1 | 2/2009 | Suzuki et al. |
| 2009/0056686 | A1 | 3/2009 | Suzuki |
| 2010/0168986 | A1 | 7/2010 | Iwazaki et al. |
| 2010/0191444 | A1 | 7/2010 | Aoki |
| 2012/0116651 | A1* | 5/2012 | Miyamoto et al. ............ 701/103 |
| 2012/0173116 | A1* | 7/2012 | Iwazaki et al. ................ 701/101 |
| 2012/0323466 | A1* | 12/2012 | Iwazaki et al. ................ 701/104 |
| 2013/0073184 | A1* | 3/2013 | Miyamoto et al. ............ 701/104 |

FOREIGN PATENT DOCUMENTS

| JP | A-02-163489 | 6/1990 |
| JP | 04-318250 | 11/1992 |
| JP | A-2000-220489 | 8/2000 |
| JP | A-2003-206771 | 7/2003 |

(Continued)

OTHER PUBLICATIONS

International Search Report issued in Application No. PCT/JP2009/065457; Dated Nov. 2, 2009 (With Translation).

*Primary Examiner* — Eric S McCall
(74) *Attorney, Agent, or Firm* — Oliff, PLC

(57) ABSTRACT

An air-fuel ratio imbalance among cylinders determining apparatus according to the present invention is applied to a multi-cylinder internal combustion engine in which a compression ratio is variable. The determining apparatus obtains, using at least an output value of an upstream air-fuel ratio sensor disposed for a catalyst, an "imbalance determining parameter" which becomes larger as a degree of an imbalance among "individual cylinder air-fuel ratios" becomes larger, each of the individual cylinder air-fuel ratios being an air-fuel ratio of a mixture supplied to each of cylinders. Further, the determining apparatus determines that an air-fuel ratio imbalance state among cylinders is occurring, when the imbalance determining parameter is larger than a predetermined threshold. The determining apparatus changes the predetermined threshold in accordance with a mechanical compression ratio of the engine.

9 Claims, 20 Drawing Sheets

(56) References Cited

FOREIGN PATENT DOCUMENTS

| | | |
|---|---|---|
| JP | A-2003-232233 | 8/2003 |
| JP | A-2004-239147 | 8/2004 |
| JP | A-2007-023917 | 2/2007 |
| JP | A-2007-154840 | 6/2007 |
| JP | A-2007-303423 | 11/2007 |
| JP | A-2009-013967 | 1/2009 |
| JP | A-2009-030455 | 2/2009 |
| JP | A-2009-138589 | 6/2009 |
| WO | WO 2009/013600 A2 | 1/2009 |

* cited by examiner (A)

(B)

(C)

APPARATUS FOR DETERMINING AN AIR-FUEL RATIO IMBALANCE AMONG CYLINDERS OF AN INTERNAL COMBUSTION ENGINE

TECHNICAL FIELD

The present invention relates to an "apparatus for determining an air-fuel ratio imbalance among cylinders of an internal combustion engine", which is applied to a multi-cylinder internal combustion engine in which a compression ratio is variable, the apparatus being able to determine (or monitor, detect) whether or not an imbalance of air-fuel ratios of air-fuel mixtures, each supplied to each of cylinders (i.e., an air-fuel ratio imbalance among the cylinders, variation in air-fuel ratios among the cylinders, or air-fuel ratio non-uniformity among the cylinders) becomes large.

BACKGROUND ART

Conventionally, an air-fuel ratio control apparatus has been widely known, which comprises a three-way catalytic converter disposed in an exhaust passage of an internal combustion engine, and an upstream air-fuel ratio sensor and a downstream air-fuel ratio sensor disposed, in the exhaust passage, upstream and downstream of the three-way catalytic converter, respectively. The air-fuel ratio control apparatus performs a feedback control on an air-fuel ratio (air-fuel ratio of the engine) of a mixture supplied to the engine based on the output value of the upstream air-fuel ratio sensor and the output value of the downstream air-fuel ratio sensor in such a manner that the air-fuel ratio of the engine coincides with (becomes equal to) a stoichiometric air-fuel ratio.

Such a air-fuel ratio control apparatus carries out the feedback control on the air-fuel ratio of the engine using a control amount (air-fuel ratio feedback amount) commonly used for all of the cylinders. That is, the air-fuel ratio feedback control is performed in such a manner that an average of the air-fuel ratio of the mixture supplied to the entire engine becomes equal to the stoichiometric air-fuel ratio.

For example, when a measured value or an estimated value of an intake air amount of the engine deviates from a "true intake air amount", a fuel injection amount calculated based on the measured value or the estimated value of the intake air amount deviates from an "amount required to have the air-fuel ratio coincide with the stoichiometric air-fuel ratio." Consequently, each of the air-fuel ratios of the cylinders uniformly (evenly) is deviated toward "a rich side or a lean side" with respect to the stoichiometric air-fuel ratio. In this case, the conventional air-fuel control shifts the air-fuel ratio of the mixture supplied to the engine to "a lean side or a rich side". As a result, each air-fuel ratio of the mixture supplied to each cylinder is corrected to become in the vicinity of the stoichiometric air-fuel ratio. Accordingly, a combustion state in each of the cylinders comes closer to a perfect combustion state (the combustion state when the air-fuel ratio of the mixture is equal to the stoichiometric air-fuel ratio), and an air-fuel ratio of an exhaust gas flowed into the three-way catalytic converter becomes equal to the stoichiometric air-fuel ratio or in the vicinity of the stoichiometric air-fuel ratio. This can avoid worsening of an emission.

Meanwhile, an electronic control fuel injection type internal combustion engine typically comprises at least one fuel injector in each of the cylinders or in each of intake ports, each communicating with each of the cylinders. Accordingly, when a property (characteristic) of the fuel injector for a specific cylinder becomes a "property that the fuel injector injects fuel in an amount larger (more excessive) than an instructed fuel injection amount", only an air-fuel ratio (air-fuel-ratio-of-the-specific-cylinder) of a mixture supplied to the specific cylinder shifts (deviates) to an extremely richer side. That is, a non-uniformity among air-fuel ratios of the cylinders (variation in air-fuel ratios among the cylinders, air-fuel ratio imbalance among the cylinders) becomes high (prominent). In other words, there arises an imbalance among the air-fuel ratios (hereinafter, each referred to as an "individual cylinder air-fuel ratio") of the mixtures supplied to a plurality of the cylinders.

In this case, the average of the air-fuel ratios of the mixtures supplied to the engine becomes an air-fuel ratio richer than the stoichiometric air-fuel ratio. Accordingly, the feedback amount commonly used for all of the cylinders causes the air-fuel ratio of the specific cylinder to shift to a leaner air-fuel ratio so that the air-fuel ratio of the specific cylinder is made closer to the stoichiometric air-fuel ratio. Further, each of the air-fuel ratios of the other cylinders is caused to shift to a leaner air-fuel ratio so that the air-fuel ratios of the other cylinders are made to deviate more from the stoichiometric air-fuel ratio. In this case, the air-fuel ratio of the specific cylinder is still richer than the stoichiometric air-fuel ratio, and the air-fuel ratios of the other cylinders become leaner than the stoichiometric air-fuel ratio. Therefore, the average of the air-fuel ratios of the entire mixtures supplied to the engine is made to coincide with the stoichiometric air-fuel ratio.

However, since the air-fuel ratio of the specific cylinder is still richer than the stoichiometric air-fuel ratio, and the air-fuel ratios of the other cylinders are leaner than the stoichiometric air-fuel ratio, the combustion condition of the mixture in each of the cylinders is different from the perfect combustion condition. As a result, an amount of emissions (an amount of unburnt substances and an amount of nitrogen oxides) discharged from each of the cylinders increases. Accordingly, even though the average of the air-fuel ratios of the mixtures supplied to the engine is equal to the stoichiometric air-fuel ratio, the three-way catalytic converter may not be able to purify the increased emissions, and thus, there is a possibility that the emissions become worse. It is therefore important to detect whether or not the air-fuel ratio non-uniformity among cylinders becomes excessively large so that some appropriate measure can be taken in order not to worsen the emissions.

One of such conventional apparatuses for determining whether or not a non-uniformity of the air-fuel ratios of the air-fuel mixtures among the cylinders (an air-fuel ratio imbalance among cylinders, non-uniformity among the individual cylinder air-fuel ratios) becomes excessively large (air-fuel ratio imbalance among cylinders determining apparatus) obtains an estimated air-fuel ratios, each representing each of the air-fuel ratios of the cylinders, by analyzing the output of a single air-fuel ratio sensor (upstream air-fuel ratio sensor) disposed at an exhaust gas aggregated portion. Then the conventional apparatus determines whether or not the "non-uniformity of the air-fuel ratios among the cylinders" becomes excessively large using the estimated air-fuel ratios (refer to, for example, Japanese Patent Application Laid-Open No. 2000-220489). It should be noted that the determination of whether or not the air-fuel ratio imbalance state among cylinders is occurring may be referred to as an "air-fuel ratio imbalance among cylinders determination" or an "imbalance determination", in the present specification.

Further, another of the conventional apparatuses obtains a trajectory length of or a frequency of a variation in the output signal (output value) of the air-fuel ratio sensor (upstream air-fuel ratio sensor) disposed at the exhaust gas aggregated portion into which the exhaust gas discharged from a plurality of the cylinders aggregate/merge, compares the trajectory length or the frequency of a variation with a "reference value varying depending on the engine rotational and the intake air amount", and determines whether or not the air-fuel ratio imbalance state among cylinders is occurring based on the comparison result (refer to, for example, U.S. Pat. No. 7,152, 594).

On one hand, various proposals have been made concerning a variable compression ratio internal combustion engine with a variable compression ratio mechanism which varies a "mechanical compression ratio", which is a ratio of a "volume of the combustion chamber when the piston is at a bottom dead center" to a "volume of the combustion chamber when the piston is at a top dead center". These types of the variable compression ratio internal combustion engines may vary the mechanical compression ratio using any one of techniques described below.

(1) Varying a movement distance of a piston (movement distance of the piston between when the piston is at the bottom dead center and when the piston is at the top dead center) using a link mechanism (refer to, for example, Japanese Patent Application Laid-Open No. 2004-239147).

(2) Varying an inclination angle of a cylinder block to a crank case.

(3) Moving the cylinder block with respect to the crank case along an axial direction of the cylinder (refer to, for example, Japanese Patent Application Laid-Open No. 2003-206771, and Japanese Patent Application Laid-Open No. 2007-303423).

(4) Varying a distance between a piston and a crank shaft (refer to, for example, Japanese Patent Application Laid-Open No. Hei 2-163429).

On the other hand, various proposals have also been made concerning a variable compression ratio internal combustion engine which can vary a "substantial compression ratio", which is a ratio of a "volume of the combustion chamber at a intake valve closing timing when a substantial compression of the mixture starts" to a "volume of the combustion chamber when the piston is at the top dead center" (refer to, for example, Japanese Patent Application Laid-Open No. 2007-303423). It should be noted that, in the present specification, a "compression ratio" includes both the mechanical compression ratio and the substantial compression ratio.

SUMMARY OF THE INVENTION

Meanwhile, the conventional imbalance determining apparatus described above is also applied to the engine which can vary the compression ratio using the technique described above. Further, the conventional imbalance determining apparatus determines that the air-fuel ratio imbalance state among cylinders has occurred when a degree of the non-uniformity (imbalance) of the "individual cylinder air-fuel ratios, each of which is the air-fuel ratio of the mixture supplied to each of a plurality of the cylinders", becomes larger than or equal to a "certain threshold". The degree of the non-uniformity (imbalance) of the individual cylinder air-fuel ratios is represented by a parameter referred to as an "imbalance rate", for example. When the air-fuel ratio of the mixture of a cylinder (imbalance cylinder) whose mixture has an air-fuel ratio greatly deviating from the stoichiometric air-fuel ratio X is defined to be Y, the imbalance rate means a ratio (X−Y)/X of a difference (X−Y) between the stoichiometric air-fuel ratio X to an air-fuel ratio Y of the imbalance cylinder to the stoichiometric air-fuel ratio X.

However, an amount of hydrogen greatly varies (fluctuate) when the compression ratio varies. For example, even when the air-fuel ratio of the mixture is unchanged, the amount of hydrogen generated by the combustion of the mixture increases as the compression ratio becomes higher. Accordingly, when the air-fuel ratio imbalance state among cylinders is occurring, and even when the degree of the non-uniformity (imbalance) of the individual cylinder air-fuel ratios is the same (unchanged), the emission becomes worse as the compression ratio becomes higher. In other words, in a case in which the imbalance determining apparatus is configured so as to determine that the air-fuel ratio imbalance state among cylinders has occurred to turn on a warning lamp and so on when the "degree of the non-uniformity (imbalance) of the individual cylinder air-fuel ratios" becomes larger than or equal to the certain threshold while the compression ratio of the engine is a "specific compression ratio", the emission has already worsen at a time point when it is determined that the air-fuel ratio imbalance state among cylinders has occurred while the compression ratio of the engine is larger than the specific compression ratio.

Accordingly, one of objects of the present invention is to provide an "air-fuel ratio imbalance among cylinders determining apparatus of an internal combustion engine", which can determine that "the air-fuel ratio imbalance state among cylinders is occurring" at a time point when the emission has not extremely worsen in a multi-cylinder internal combustion engine having means for varying a compression ratio.

An air-fuel ratio imbalance among cylinders determining apparatus of the present invention (hereinafter, also referred simply to as a "present determining apparatus") is applied to a multi cylinder internal combustion engine having a plurality of cylinders. Further, the present determining apparatus comprises compression ratio varying means, a catalyst, an upstream air-fuel ratio sensor, and imbalance determining means.

The compression ratio varying means is configured so as to vary a compression ratio of the engine in accordance with an operating state of the engine. The compression ratio varying means may be means for varying the mechanical compression ratio as (1) to (4) described above, or may be means for varying the substantial compression ratio by varying intake valve closing timing.

The catalyst is a catalyst (for example, three-way catalyst) which oxidizes at least hydrogen. The catalyst is disposed at an exhaust gas aggregated (converged) portion into which exhaust gases discharged from at least two or more of combustion chambers of cylinders among a plurality of the cylinders merge", or is disposed at a "portion (the exhaust gas passage) downstream of the exhaust gas aggregated portion".

Each of fuel injectors is provided so as to correspond to each of the at least two or more of cylinders. Further, each of the fuel injectors is configured so as to inject a fuel to be contained in a mixture supplied to each of the combustion chambers of the at least two or more of cylinders.

The upstream air-fuel ratio sensor is disposed at a position upstream of the catalyst in the exhaust gas aggregated portion, or is disposed in the exhaust gas passage between the exhaust gas aggregated portion and the catalyst. The upstream air-fuel ratio sensor includes a diffusion resistance layer with which an exhaust gas which has not passed through the catalyst contacts, and comprises an air-fuel ratio detecting element, which is covered by the diffusion resistance layer, and which outputs, as an "output value of the upstream air-fuel ratio sensor", a signal in accordance with (indicative of) an air-fuel ratio of an exhaust gas which has passed through the diffusion resistance layer.

The imbalance determining means is configured so as to obtain, using "at least the output value of the upstream air-fuel ratio sensor", an "imbalance determining parameter, which becomes larger as a degree of an imbalance among individual cylinder air-fuel ratios becomes larger, each of the individual cylinder air-fuel ratios being an air-fuel ratio of a mixture supplied to each of the at least two or more of cylinders". Further, the imbalance determining means performs a "determination of (as to) whether or not the air-fuel ratio imbalance state among cylinders is occurring" based on a "comparison result as to whether or not the obtained imbalance determining parameter is larger than or equal to a predetermined threshold".

The imbalance determining parameter obtained by the imbalance determining means is not limited, as long as it is a parameter which becomes larger as the degree of the imbalance among individual cylinder air-fuel ratios become larger. For example, the imbalance determining parameter may be a parameter described below.

(P1) The imbalance determining parameter may be a trajectory (locus) length of the output value of the upstream air-fuel ratio sensor.

(P2) The imbalance determining parameter may be an absolute value (magnitude) of a value (a differential value of the output value of the upstream air-fuel ratio sensor with respect to time, or a differential value of an air-fuel ratio represented by the output value of the upstream air-fuel ratio sensor with respect to time) varying in accordance with (corresponding to) a change rate of the output value of the upstream air-fuel ratio sensor.

In a case in which the air-fuel ratio imbalance state among cylinders is occurring, the output value of the upstream air-fuel ratio sensor rapidly varies when the exhaust gas discharged from an abnormal cylinder (imbalance cylinder) has newly arrived at the upstream air-fuel ratio sensor while the exhaust gases discharged from normal cylinders are contacting with the upstream air-fuel ratio sensor. Further, the output value of the upstream air-fuel ratio sensor rapidly varies when the exhaust gas discharged from the normal cylinders has newly arrived at the upstream air-fuel ratio sensor while the exhaust gas discharged from the abnormal cylinder is contacting with the upstream air-fuel ratio sensor. Accordingly, the absolute value of the value varying in accordance with (corresponding to) the change rate of the output value of the upstream air-fuel ratio sensor increases when the air-fuel ratio imbalance state among cylinders has occurred. In addition, the absolute value of the value varying in accordance with the change rate of the output value of the upstream air-fuel ratio sensor becomes larger as the degree of the non-uniformity of the individual cylinder air-fuel ratios becomes larger. Therefore, the absolute value of the value varying in accordance with the change rate of the output value of the upstream air-fuel ratio sensor is a parameter which can be used as the imbalance determining parameter.

(P3) The imbalance determining parameter may be an absolute value (magnitude) of a value (a second order differential value of the output value of the upstream air-fuel ratio sensor with respect to time, or a second order differential value of the air-fuel ratio represented by the output value of the upstream air-fuel ratio sensor with respect to time) varying in accordance with (corresponding to) a change rate of the change rate of the output value of the upstream air-fuel ratio sensor.

(P4) The imbalance determining parameter may be a magnitude of a difference among the "individual cylinder air-fuel ratios estimated by analyzing the output value of the upstream air-fuel ratio sensor based on an engine rotational speed, a crank angle of the engine, the intake air amount, and so on" (e.g., an absolute value of a difference between a maximum value and a minimum value among the individual cylinder air-fuel ratios, or the like).

(P5) The imbalance determining parameter may be a value in accordance with (corresponding to) a difference between an amount of hydrogen $H_2$ of a gas which has not passed the catalyst and an amount of hydrogen $H_2$ of a gas which has passed the catalyst. This value can be obtained using at least the output value of the upstream air-fuel ratio sensor (for example, refer to Japanese Patent Application Laid-Open No. 2009-30455).

When the air-fuel ratio imbalance state among cylinders is occurring, a cylinder appears whose individual cylinder air-fuel ratio becomes an "air-fuel ratio relatively greatly deviating toward richer side than the stoichiometric air-fuel ratio", even when the above mentioned air-fuel ratio feedback control is being performed. Further, the air-fuel ratio in the richer side becomes much richer as the degree of the non-uniformity of the individual cylinder air-fuel ratios becomes greater. On the other hand, the unburnt substances such as hydrogen $H_2$, hydrocarbon HC, carbon monoxide CO quadratically increases as the air-fuel ratio of the combusted mixture deviates greater from the stoichiometric air-fuel ratio in the richer side than the stoichiometric air-fuel ratio (refer to FIG. 9). Accordingly, the unburnt substances such as hydrogen $H_2$, hydrocarbon HC, carbon monoxide CO are generated more as the degree of the non-uniformity of the individual cylinder air-fuel ratios becomes greater when the air-fuel ratio imbalance state among cylinders is occurring.

Hydrogen $H_2$ is a small molecule, compared with carbon hydride HC, carbon monoxide CO, and the like. Accordingly, hydrogen $H_2$ rapidly diffuses through the diffusion resistance layer of the upstream air-fuel ratio sensor, compared to the other unburnt substances (HC, CO). Therefore, when a large amount of the unburnt substances including HC, CO, and $H_2$ are generated, a preferential diffusion of hydrogen $H_2$ occurs in the diffusion resistance layer prominently. That is, hydrogen $H_2$ reaches the surface of the air-fuel detecting element in a larger amount compared with the "other unburnt substances (HC, CO)". As a result, a balance between a concentration of hydrogen $H_2$ and a concentration of the other unburnt substances (HC, CO) is lost. In other words, a fraction of hydrogen $H_2$ to all of the unburnt substances included in the "exhaust gas reaching the air-fuel ratio detecting element of the upstream air-fuel ratio sensor" becomes greater than a fraction of hydrogen $H_2$ to all of the unburnt substances included in the "exhaust gas discharged from the combustion chambers of the engine."

Now, it is assumed that each of air-fuel ratios of all of the cylinders is evenly equal to a certain air-fuel ratio AF richer than the stoichiometric air-fuel ratio while the air-fuel ratio imbalance state among cylinders is not occurring, and an amount of hydrogen, being discharged from the combustion chambers and reaching the diffusion resistance layer of the upstream air-fuel ratio sensor, is equal to a certain amount S. In this case, an average of the air-fuel ratio of mixture supplied to the entire engine is the certain air-fuel ratio AF. In contrast, since a large amount of hydrogen is generated in a specific cylinder while the air-fuel ratio imbalance state among cylinders is occurring, an amount of hydrogen reaching the diffusion resistance layer of the upstream air-fuel ratio sensor becomes equal to the certain amount S when the average of the air-fuel ratio of mixture supplied to the entire engine is an "air-fuel ratio leaner than the certain air-fuel ratio AF."

This causes the output value of the upstream air-fuel ratio sensor to be a value indicating an "air-fuel ratio which is more richer" than an average of the actual air-fuel ratio of the exhaust gas, as the degree of the non-uniformity of the individual cylinder air-fuel ratios becomes larger. Meanwhile, hydrogen is purified by the catalyst, and therefore, an air-fuel ratio of an exhaust gas downstream of the catalyst represents the average of the actual air-fuel ratio of the exhaust gas. Accordingly, it is possible to obtain, based on the output value of the upstream air-fuel ratio sensor and the output value of the downstream air-fuel ratio sensor, the value in accordance with (corresponding to) the difference between an amount of hydrogen $H_2$ of a gas which has not passed the catalyst and an amount of hydrogen $H_2$ of a gas which has passed the catalyst, and thus obtained value can be used as the "imbalance determining parameter which becomes larger as the degree of the non-uniformity of the individual cylinder air-fuel ratios becomes larger".

Further, the imbalance determining means is configured so as to change at least one of "the predetermined threshold and the imbalance determining parameter" in accordance with the compression ratio of the engine (or to determine at least one of "the predetermined threshold and the imbalance determining parameter" based on the compression ratio of the engine)."

As described above, the amount of hydrogen generated in the combustion chambers increases as the compression ratio becomes higher. Thus, in a case in which the air-fuel ratio imbalance state among cylinders is occurring, the emission worsens if the compression ratio of the engine is high, even when the degree of the non-uniformity of the individual cylinder air-fuel ratios is small. Accordingly, determining at least one of "the predetermined threshold and the imbalance determining parameter" based on the compression ratio of the engine, as the above described imbalance determining means does, will allow to determine that the "air-fuel ratio imbalance state among cylinders has occurred" and to perform warning if necessary, before a time point when the emission worsens.

In this case, it is preferable that the imbalance determining means be configured so as to determine the predetermined threshold based on the compression ratio of the engine in such a manner that an amount of the unburnt substance flowing out from the catalyst coincides with a certain (constant) permissible limit value regardless of the compression ratio, when the imbalance determining parameter becomes a value equal to or larger than the predetermined threshold.

According to the above configuration, it is possible to determine that the "air-fuel ratio imbalance state among cylinders has occurred" at a time point before the amount of the unburnt substance flowing out from the catalyst exceeds the certain (constant) permissible limit value, whatever the compression ratio of the engine is.

The means for varying a compression ratio may be means for varying the mechanical compression ratio.

That is, the means for varying a compression ratio may include, a compression ratio varying mechanism for varying, in response to an instruction signal, the mechanical compression ratio which is a ratio of a "volume of the combustion chamber when the piston is at a bottom dead center" to a "volume of the combustion chamber when the piston is at a top dead center"; and compression ratio control means for providing to the compression ratio varying mechanism the instruction signal to have an actual mechanical compression ratio of the engine become equal to a target mechanical compression ratio determined based on (in accordance with) an operating state of the engine In this configuration, the imbalance determining means may be configured so as to, include a mechanical compression ratio detecting sensor which detects the actual mechanical compression ratio of the engine; and determine the predetermined threshold based on the actual mechanical compression ratio detected by the mechanical compression ratio detecting sensor.

According to the above configuration, the predetermined threshold can be appropriately determined based on the "actual compression ratio", even when there is a difference between a mechanical compression ratio realized according to an instruction signal provided to the compression ratio varying mechanism and the compression ratio actually realized.

Further, it is preferable that the determining apparatus include, air-fuel ratio for feedback control obtaining means for obtaining an air-fuel ratio for feedback control by applying a "value based on the actual output value of the upstream air-fuel ratio sensor" to a "first air-fuel ratio conversion table which defines a relationship between the output value of the upstream air-fuel ratio sensor and an air-fuel ratio" when the compression ratio is equal to a first compression ratio, and obtaining the air-fuel ratio for feedback control by applying the "value based on the actual output value of the upstream air-fuel ratio sensor" to a "second air-fuel ratio conversion table, which is different from the first air-fuel ratio conversion table, and which defines a relationship between the output value of the upstream air-fuel ratio sensor and an air-fuel ratio", when the compression ratio is equal to a second compression ratio different from the first compression ratio; and fuel injection amount correcting means for varying an amount of a fuel which is injected in such a manner that the obtained air-fuel ratio for feedback control coincide with a predetermined target air-fuel ratio.

According to this configuration, it is possible to reduce a "difference, between an air-fuel ratio represented by the output value of the upstream air-fuel ratio sensor and an air-fuel ratio (i.e., actual air-fuel ratio of the mixture) which has actually reached the position at which the upstream air-fuel ratio sensor is disposed", caused by a change in the compression ratio. Consequently, the emission can be maintained at a good level, regardless of whether or not the air-fuel ratio imbalance state among cylinders is occurring.

DESCRIPTION OF THE EMBODIMENT TO CARRY OUT THE INVENTION

Each air-fuel ratio imbalance among cylinders determining apparatus of a multi-cylinder internal combustion engine according to each embodiment of the present invention will next be described with reference to the drawings. The apparatus is a portion of an air-fuel ratio control apparatus for controlling an air-fuel ratio of the internal combustion engine, and further, is a fuel injection amount control apparatus for controlling a fuel injection amount.

First Embodiment

Structure

Figure 1:
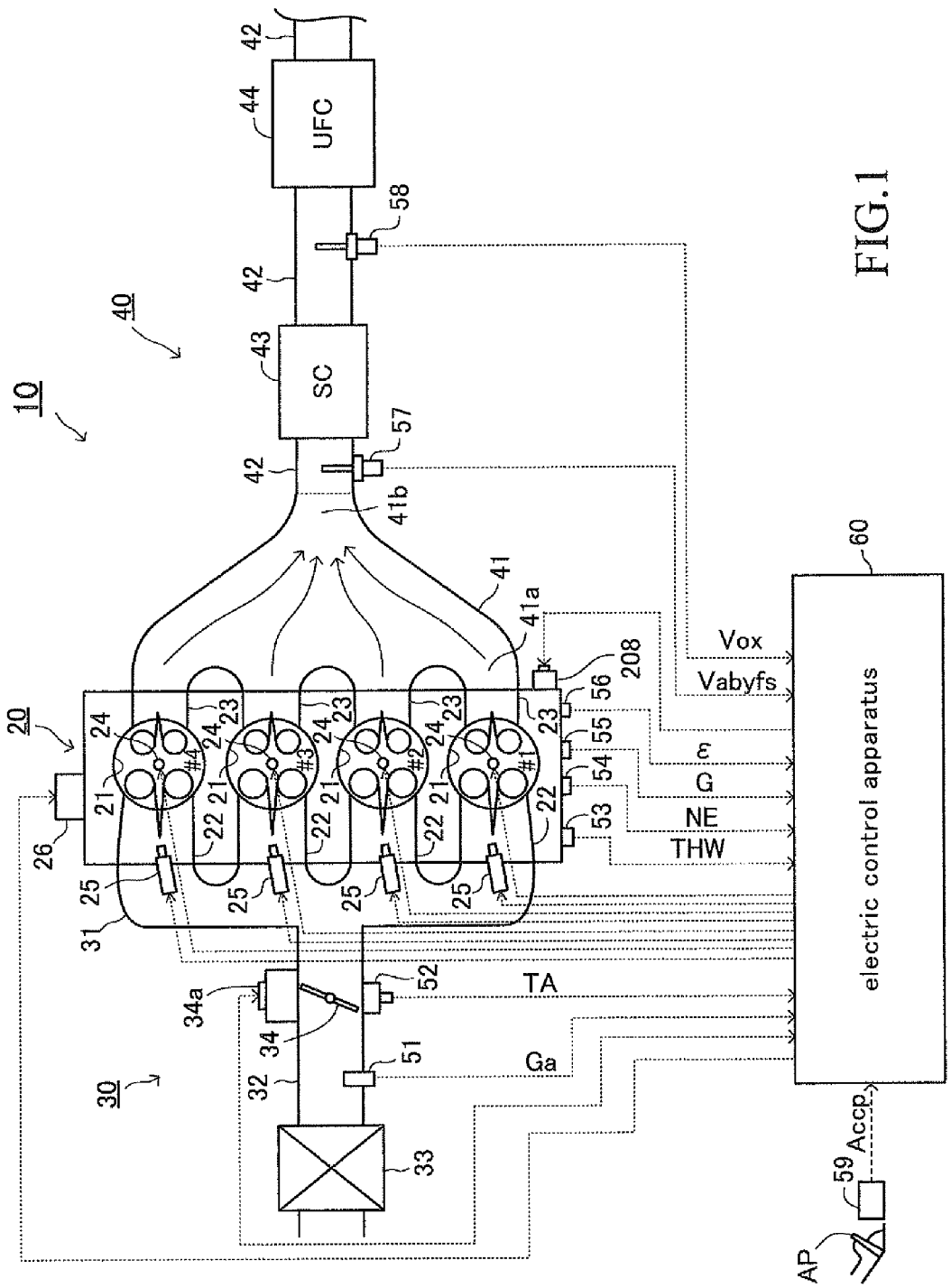
FIG. 1 is a schematic view of an internal combustion engine to which air-fuel ratio imbalance among cylinders determining apparatus (first determining apparatus) according to a first embodiment of the present invention is applied.
Figure 2:
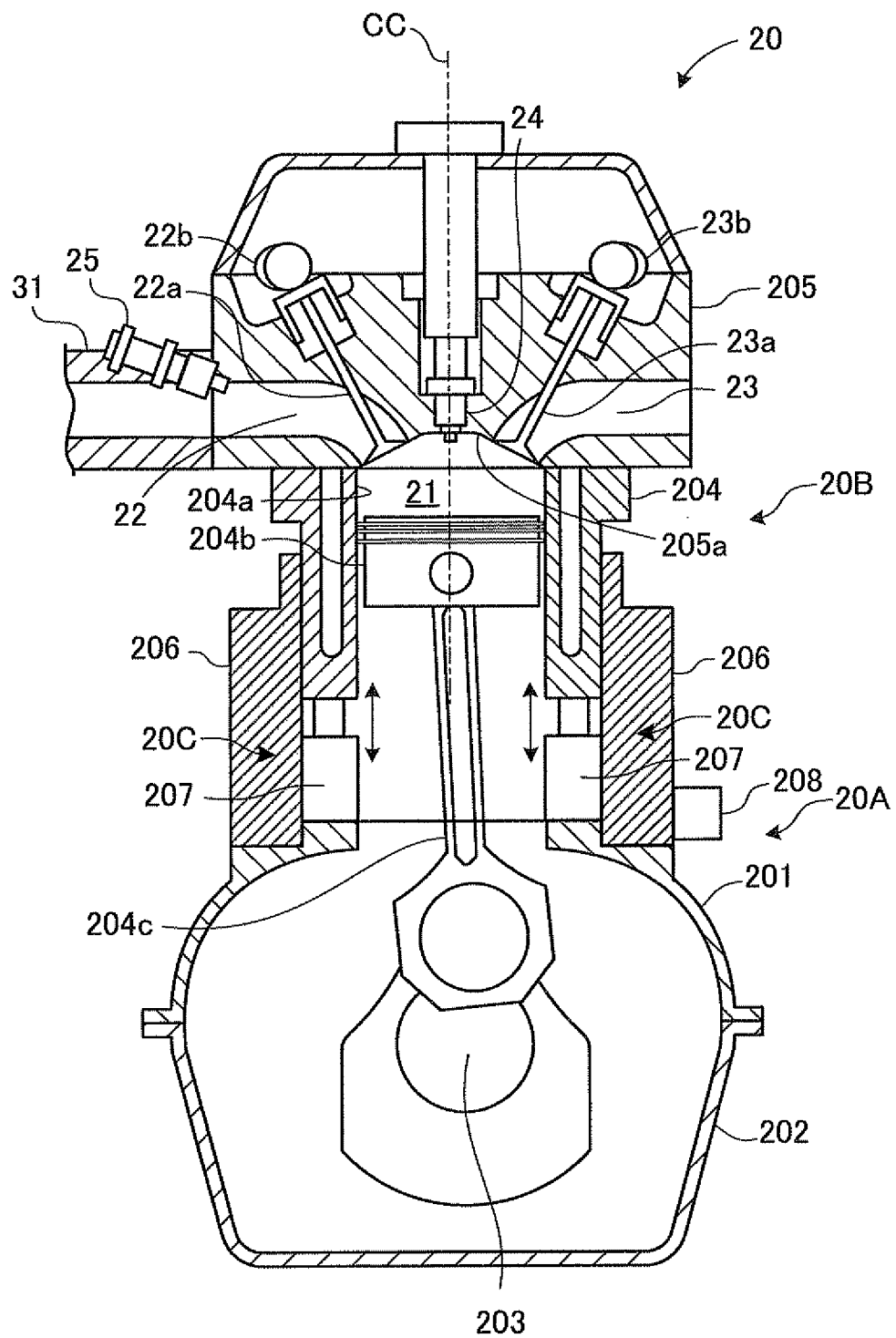
FIG. 2 is a schematic sectional view of a main body of the engine shown in FIG. 1.

FIGS. 1 and 2 show a schematic configuration of an internal combustion engine 10 to which an air-fuel ratio imbalance among cylinders determining apparatus (hereinafter, referred to as a "first determining apparatus") according to a first embodiment of the present invention is applied. The engine 10 is a 4-cycle, spark-ignition, multi-cylinder (in the present example, 4 cylinder), gasoline fuel, and variable compression ratio engine. The engine 10 comprises a main body section 20, an intake system 30, and an exhaust system 40.

As shown in FIG. 2, the main body section 20 includes a stationary section 20A, a movable section 20B, and a compression ratio varying mechanism 20C. It should be noted that FIG. 2 shows a sectional view of a specific cylinder, however, each of the other cylinders includes a similar configuration.

The stationary section 20A includes a crank case 201 and an oil pan 202.

The crank case 201 rotatably supports a crank shaft 203. The oil pan 202 is fixed to the crank case 201 at a lower portion of the crank case 201. The oil pan 202 together with the crank case 201 forms a space in which the crank shaft 203, lubricating oil, and so on are accommodated.

The movable section 20B comprises a cylinder block 204 disposed above the crank case 201, and a cylinder head 205 disposed above the cylinder block 204.

The cylinder block 204 is configured so as to slidably move along inner surfaces of side walls 206 fixed above the crank case 201. The cylinder block has a plurality (four) of cylinders (cylinder bores) 204a, each of which is hollow cylindrical. A piston 204b has a substantially cylindrical shape, and is accommodated in the cylinder 204a. The piston 204b is connected to the crank shaft 204 through a connecting rod 204c. The cylinder block 204, as described later, moves in an axial direction of the cylinder 204a (hereinafter, referred to as an "up/down direction") with respect to the crank case 201 to thereby vary a mechanical compression ratio of the engine. It should be noted that the mechanical compression ratio is defined as a ratio of "a volume of the combustion chamber when the piston 204b is at a bottom dead center to a volume of the combustion chamber when the piston 204b is at a top dead center".

The cylinder head 205 is fixed on the cylinder block 204. In the cylinder head 205, a cylinder head lower surface 205a which forms an upper surface of a combustion chamber 21, an intake port 22 communicating with the combustion chamber 21, and an exhaust port 23 communicating with the combustion chamber 21 are formed.

Further, the cylinder head 205 accommodates intake valves 22a which open/close the intake ports 22, an intake cam shaft 22b having intake cams to drive the intake valves 22a, exhaust valves 23a which open/close the exhaust ports 23, an exhaust cam shaft having exhaust cams to drive the exhaust valves 23a, spark plugs 24, each of which is connected with an igniter including an ignition coil, and so on. The spark plug 24 is disposed in such a manner that its spark generation portion is exposed at a center of the combustion chamber 21 and in the vicinity of the lower surface of the cylinder head. The spark plug 24 is configured so as to generate an ignition spark from the spark generation portion in response to an ignition signal.

The compression ratio varying mechanism 20C has a mechanism similar to one which is disclosed, for example, Japanese Patent Application Laid-Open (kokai) No. 2003-206771, Japanese Patent Application Laid-Open No. 2007-303423, Japanese Patent Application Laid-Open No. 2007-321589, and Japanese Patent Application Laid-Open No. 2004-218522, etc. In FIG. 2, the compression ratio varying mechanism 20C is illustrated with blocks indicating functions.

The compression ratio varying mechanism 20C includes a driving section 207 interposed between the cylinder block 204 and the crank case 201, and an actuator 208 of the compression ratio varying mechanism. The actuator 208 is a electric motor. The driving section 207 extends/shortens in the axial direction (up/down direction) of the cylinder 204a in response to a drive signal from an electric control apparatus 60 described later (refer to FIG. 1) to the actuator 208. This extension/shortening allows a distance between the cylinder block 204 and the crank case 201 to be varied, and thus, the mechanical compression ratio of the engine 10 is varied.

Referring back to FIG. 1, the main body section 20 is provided with an intake valve control apparatus 26. The intake valve control apparatus 26 comprises a well known configuration for hydraulically adjusting/controlling a relative angle (phase angle) between the intake cam shaft (now shown) and the intake cams (not shown). The intake valve control apparatus 26 operates in response to an instruction signal (driving signal) so as to change opening-timing and-closing timing of the intake valves. The intake valve control apparatus 26 changes intake valve closing timing during a compression stroke to thereby vary a time point from which a substantial compression of the mixture is started, and accordingly, it varies the volume of the combustion chamber at the time point of start of the compression, so that it varies a substantial compression ratio.

Fuel injection valves (injectors) 25 are fixed in the main body section 20. Each of the fuel injectors 25 is provided for each of the intake ports 22 one by one. Each of the fuel injectors 25 is configured so as to inject, in response to an injection instruction signal, a "fuel of an instructed injection amount included in the injection instruction signal" into a corresponding intake port 22, when the fuel injector 25 is normal. In this way, each of the plurality of the cylinders 21 comprises the fuel injector 25 for supplying the fuel independently from the other cylinders.

The intake system 30 comprises an intake manifold 31, an intake pipe 32, an air filter 33, a throttle valve 34, and a throttle valve actuator 34a.

The intake manifold 31 includes a plurality of branch portions each of which is connected to each of the intake ports 22, and a surge tank to which the branch portions aggregate. The intake pipe 32 is connected to the surge tank. The intake manifold 31, the intake pipe 32, and a plurality of the intake ports 22 constitute an intake passage. The air filter is provided at an end of the intake pipe 32. The throttle valve 34 is rotatably supported by the intake pipe 32 at a position between the air filter 33 and the intake manifold 31. The throttle valve 34 is configured so as to adjust an opening sectional area of the intake passage provided by the intake pipe 32 when it rotates. The throttle valve actuator 34a includes a DC motor, and rotates the throttle valve 34 in response to an instruction signal (driving signal).

The exhaust system 40 includes an exhaust manifold 41, an exhaust pipe 42, an upstream-side catalytic converter (catalyst) 43, and a downstream-side catalytic converter (catalyst) 44.

The exhaust manifold 41 comprises a plurality of branch portions 41a, each of which is connected to each of the exhaust ports 23, and an aggregated (merging) portion (exhaust gas aggregated portion) 41b into which the branch portions 41a aggregate (merge). The exhaust pipe 42 is connected to the aggregated portion 41b of the exhaust manifold 41. The exhaust manifold 41, the exhaust pipe 42, and a plurality of the exhaust ports 23 constitute a passage through which the exhaust gas passes. It should be noted that the aggregated portion 41b of the exhaust manifold 41 and the exhaust pipe 42 are referred to as an "exhaust passage" for convenience, in the present specification.

The upstream-side catalyst 43 is a three-way catalytic unit which supports "noble (precious) metals which are catalytic substances" and a "ceria ($CeO_2$)" on a support made of ceramics, and has an oxygen storage/release function (oxygen storage function). The upstream-side catalyst 43 is disposed (interposed) in the exhaust pipe 42. When a temperature of the upstream-side catalyst reaches a certain activation temperature, it exerts a "catalytic function for purifying unburnt substances (HC, CO, $H_2$, and so on) and nitrogen oxide (NOx) simultaneously" and the "oxygen storage function".

The downstream-side catalyst 44 is the three-way catalyst similar to the upstream-side catalyst 43. The downstream-side catalyst 44 is disposed (interposed) in the exhaust pipe 42 at a position downstream of the upstream-side catalyst 43.

The first determining apparatus includes a hot-wire air flowmeter 51, a throttle position sensor 52, a water temperature sensor 53, a crank angle sensor 54, an intake cam position sensor 55, a stroke sensor 56, an upstream (upstream-side) air-fuel ratio sensor 57, a downstream (downstream-side) air-fuel ratio sensor 58, an accelerator opening sensor 59, and so on.

The hot-wire air flowmeter 51 measures a mass flow rate of an intake air flowing through the intake pipe 32 so as to output a signal Ga representing the mass flow rate (an intake air amount of the engine 10 per unit time).

The throttle position sensor 52 detects the opening degree of the throttle valve 34, and outputs a signal representing the throttle valve opening degree TA.

The water temperature sensor 53 detects a temperature of a cooling water (coolant) of the internal combustion engine 10, so as to output a signal representing the cooling water temperature THW.

The crank angle sensor 54 outputs a signal which includes a narrow pulse generated every time the crank shaft 203 rotates 10 degrees and a wide pulse generated every time the crank shaft 203 rotates 360 degrees. This signal is converted into an engine rotational speed NE by the electric control apparatus 60 described later.

The intake cam position sensor 55 outputs a single pulse every time the intake cam shaft rotates 90 degrees, and then 90 degrees, and further 180 degrees. The electric control apparatus 60 obtains, based on the signals from the crank angle sensor 54 and the intake cam position sensor 55, an absolute crank angle with reference to a compression top dead center of a specific cylinder (e.g., the first cylinder #1).

The stroke sensor 56 measures a distance between the crank case 201 (e.g., a top end of the crank case 201) shown in FIG. 2 and the cylinder block (e.g., a bottom end of the cylinder block 204) shown in FIG. 2, so as to output a signal representing the distance ST. The electric control apparatus 60 obtains a "mechanical compression ratio εact based on the distance ST. Therefore, the stroke sensor 56 can be referred to as a mechanical compression ratio sensor.

The upstream air-fuel ratio sensor 57 is disposed at a position between the aggregated portion 41b of the exhaust manifold 41 and the upstream-side catalyst 43, and in either one of "the exhaust manifold 41 and the exhaust pipe 42 (that is, in the exhaust passage)". The upstream air-fuel ratio sensor 57 is a "wide range air-fuel ratio sensor of a limiting current type having a diffusion resistance layer" described in, for example, Japanese Patent Application Laid-Open (kokai) No. Hei 11-72473, Japanese Patent Application Laid-Open No. 2000-65782, and Japanese Patent Application Laid-Open No. 2004-69547, etc.

Figure 3:
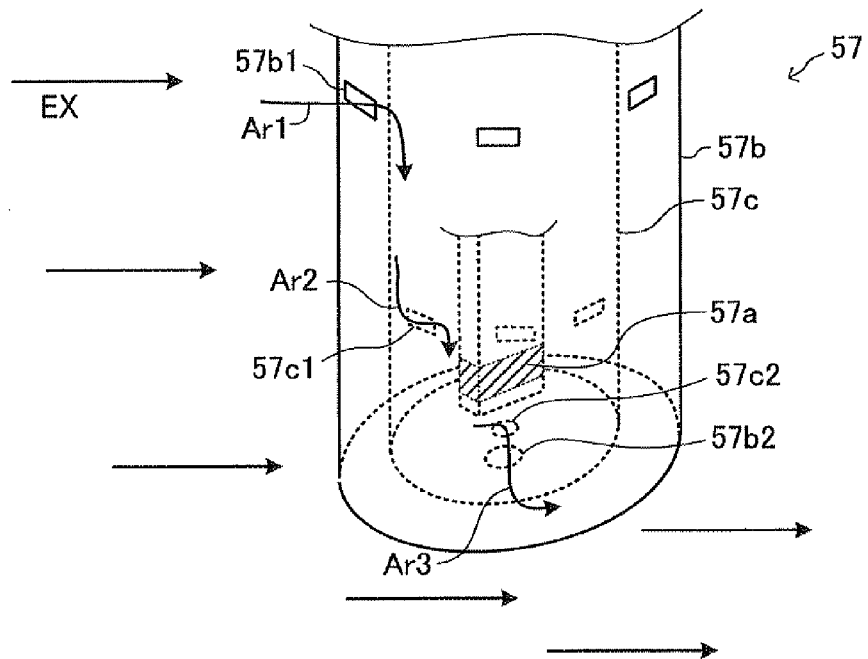
FIG. 3 is a partial schematic perspective view of an air-fuel ratio sensor (upstream air-fuel ratio sensor) shown in FIG. 1.
Figure 4:
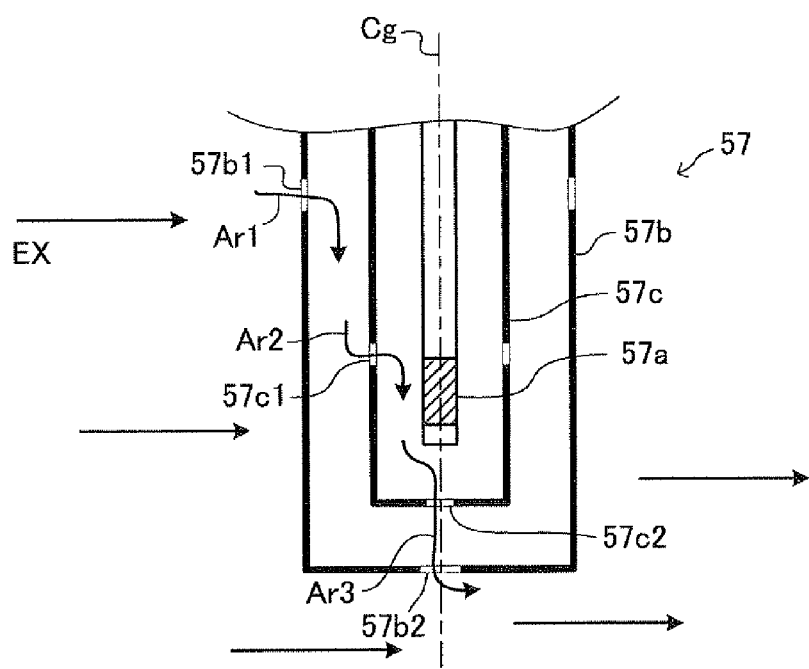
FIG. 4 is a partial sectional view of the air-fuel ratio sensor shown in FIG. 1.

As shown in FIGS. 3 and 4, the upstream air-fuel ratio sensor 57 comprises an air-fuel ratio detecting section 57a, an outer protective cover 57b, and an inner protective cover 57c.

The outer protective cover 57b has a hollow cylindrical body made of a metal. The outer protective cover 57b accommodates the inner protective cover 57c in its inside so as to cover the inner protective cover 57c. The outer protective cover 57b comprises a plurality of inflow holes 57b1 at its side surface. The inflow hole 57b1 is a through-hole which allows the exhaust gas EX (the exhaust gas outside of the outer protective cover 57b) passing through the exhaust gas passage to flow into the inside of the outer protective cover 57b. Further, the outer protective cover 57b has outflow holes 57b2 which allow the exhaust gas inside of the outer protective cover 57b to flow out to the outside (the exhaust gas passage) of the outer protective cover 57b, at a bottom surface of it.

The inner protective cover 57c is made of a metal and has a hollow cylindrical body having a diameter smaller than a diameter of the outer protective cover 57b. The inner protective cover 57c accommodates the air-fuel ratio detecting section 57a in its inside so as to cover the air-fuel ratio detecting section 57a. The inner protective cover 57c comprises a plurality of inflow holes 57c1 at its side surface. The inflow hole 57c1 is a through-hole which allows the exhaust gas flowing into a "space between the outer protective cover 57b and the inner protective cover 57c" through the inflow holes 57b1 of the outer protective cover 57b to further flow into the inside of the inner protective cover 57c. In addition, the inner protective cover 57c has outflow holes 57c2 which allow the exhaust gas inside of the inner protective cover 57c to flow out to the outside of the inner protective cover 57c, at a bottom surface of it.

The upstream air-fuel ratio sensor 57 is disposed in such a manner that "a center line Cg of the outer protective cover 57b is orthogonal to a direction of the flow of the exhaust gas and a bottom surface of the outer protective cover 57b is parallel to the direction of the flow of the exhaust gas". As shown by an arrow Ar1, the exhaust gas EX flowing through the exhaust passage flows into the "space between the outer protective cover 57b and the inner protective cover 57c" via inflow holes 57b1 of the outer protective cover 57b. Thereafter, as shown by an arrow Ar2, the exhaust gas flows into the "inside of the inner protective cover 57c" via inflow holes 57c1 of the inner protective cover 57c to reach the air-fuel ratio detecting element 57a. Then, as shown by an arrow Ar3, the exhaust gas flows out to the exhaust passage via "the outflow holes 57c2 of the inner protective cover 57c and the outflow holes 57b2 of the outer protective cover 57b".

Figure 5:
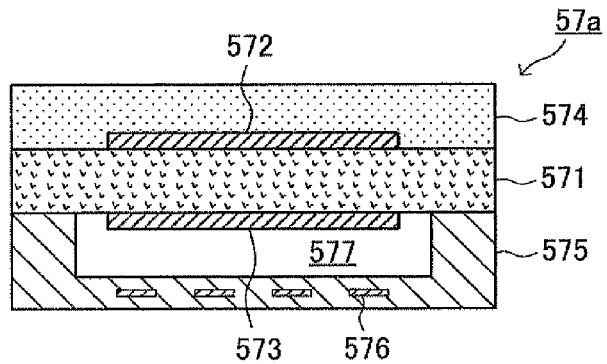
FIG. 5 includes (A) to (C), each of which is a schematic sectional view of an air-fuel ratio detecting element of the upstream air-fuel ratio sensor shown in FIG. 1.
Figure 5:
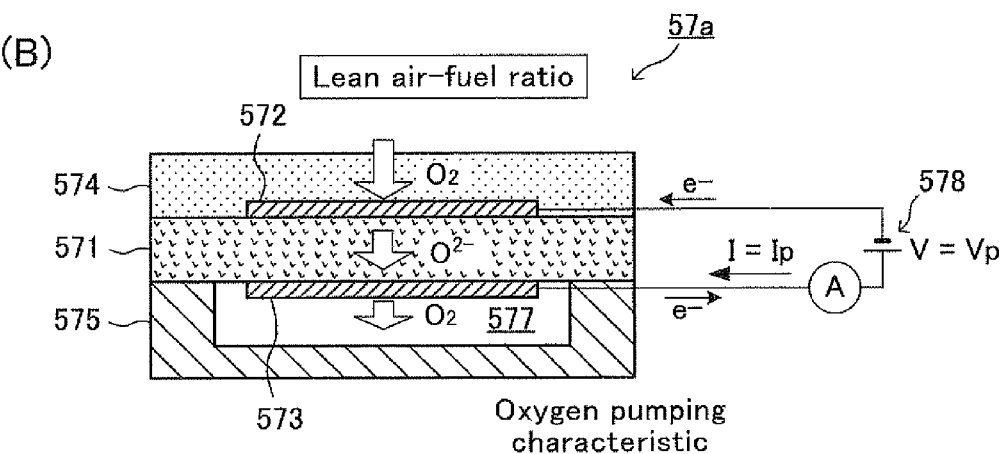
Figure 5:
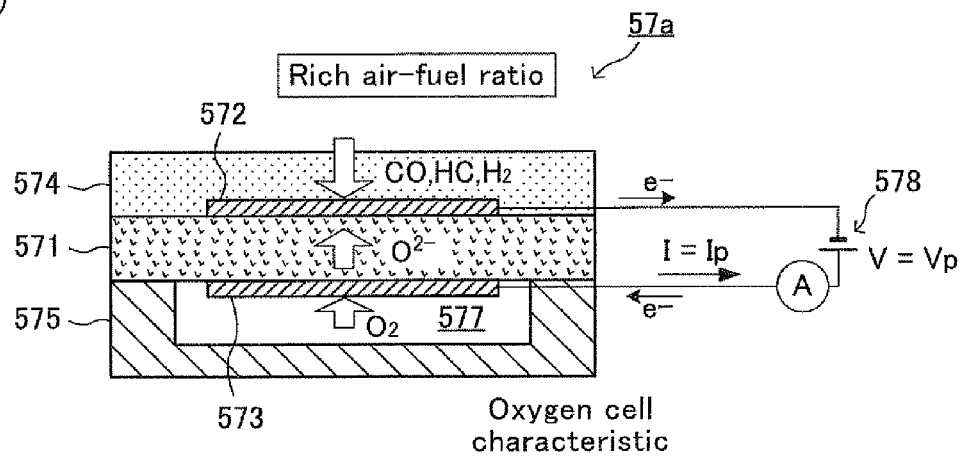

As shown in (A) of FIG. 5, the air-fuel detecting element 57a includes a solid electrolyte layer 571, an exhaust-gas-side electrode layer 572, an atmosphere-side electrode layer 573, a diffusion resistance layer 574, a wall section 575, and a heater 576.

As shown in (B) of FIG. 5, when the air-fuel ratio of the exhaust gas is leaner than the stoichiometric air-fuel ratio, an oxygen pumping characteristic is utilized to detect the air-fuel ratio. That is, when the air-fuel ratio of the exhaust gas is leaner than the stoichiometric air-fuel ratio, a large amount of oxygen molecules included in the exhaust gas reach the exhaust-gas-side electrode layer 572 after passing through the diffusion resistance layer 574. The oxygen molecules receive electrons to change to oxygen ions. The oxygen ions pass through the solid electrolyte layer 571, and release the electrons to change to oxygen molecules at the atmosphere-side electrode layer 573. As a result, a current I flows from the positive electrode of the electric power supply 578 to the negative electrode of the electric power supply 578, thorough the atmosphere-side electrode layer 573, the solid electrolyte layer 571, and the exhaust-gas-side electrode layer 572.

Figure 6:
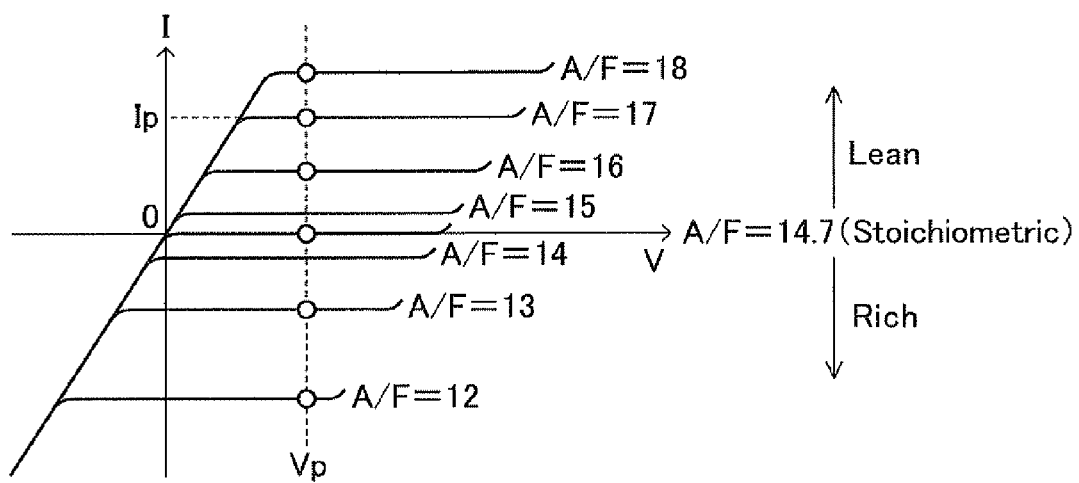
FIG. 6 is a graph showing a relationship between an air-fuel ratio of an exhaust gas and a limiting current value of the upstream air-fuel ratio sensor.

The magnitude of the electrical current I varies according to an amount of the "oxygen molecules reaching the exhaust-gas-side electrode layer 572 after passing through the diffusion resistance layer 574 by the diffusion" out of the oxygen molecules included in the exhaust gas reaching the outer surface of the diffusion resistance layer 574, when a magnitude of the voltage V is set at a predetermined value Vp or larger. That is, the magnitude of the electrical current I varies depending upon a concentration (partial pressure) of oxygen at the exhaust-gas-side electrode layer 572. The concentration of oxygen at the exhaust-gas-side electrode layer 572 varies depending upon the concentration of oxygen of the exhaust gas reaching the outer surface of the diffusion resistance layer 574. The current I, as shown in FIG. 6, does not vary when the voltage V is set at a value equal to or higher than the predetermined value Vp, and therefore, is referred to as a limiting current Ip. The air-fuel ratio sensor 57 outputs a value corresponding to the air-fuel ratio based on the limiting current Ip.

In contrast, as shown in (C) of FIG. 5, when the air-fuel ratio of the exhaust gas is richer than the stoichiometric air-fuel ratio, the oxygen cell characteristic is utilized so as to detect the air-fuel ratio. Specifically, when the air-fuel ratio of the exhaust gas is richer than the stoichiometric air-fuel ratio, a large amount of unburnt substances (HC, CO, and $H_2$ etc.) included in the exhaust gas reach the exhaust-gas-side electrode layer 572 through the diffusion resistance layer 574. In this case, a difference (oxygen partial pressure difference) between the concentration of oxygen at the atmosphere-side electrode layer 573 and the concentration of oxygen at the exhaust-gas-side electrode layer 572 becomes large, and thus, the solid electrolyte layer 571 functions as an oxygen cell. The applied voltage V is set at a value lower than the elective motive force of the oxygen cell.

Accordingly, oxygen molecules existing in the atmosphere chamber 577 receive electrons at the atmosphere-side electrode layer 573 so as to change into oxygen ions. The oxygen ions pass through the solid electrolyte layer 571, and move to the exhaust-gas-side electrode layer 572. Then, they oxidize the unburnt substances at the exhaust-gas-side electrode layer 572 to release electrons. Consequently, a current I flows from the negative electrode of the electric power supply 578 to the positive electrode of the electric power supply 578, thorough the exhaust-gas-side electrode layer 572, the solid electrolyte layer 571, and the atmosphere-side electrode layer 573.

The magnitude of the electrical current I varies according to an amount of the oxygen ions reaching the exhaust-gas-side electrode layer 572 from the atmosphere-side electrode layer 573 through the solid electrolyte layer 571. As described above, the oxygen ions are used to oxidize the unburnt substances at the exhaust-gas-side electrode layer 572. Accordingly, the amount of the oxygen ions passing through the solid electrolyte layer 571 becomes larger, as an amount of the unburnt substances reaching the exhaust-gas-side electrode layer 572 through the diffusion resistance layer 574 by the diffusion becomes larger. In other words, as the air-fuel ratio is smaller (as the air-fuel ratio is more richer than the stoichiometric air-fuel ratio, and thus, an amount of the unburnt substances becomes larger), the magnitude of the electrical current I becomes larger. Meanwhile, the amount of the unburnt substances reaching the exhaust-gas-side electrode layer 572 is limited owing to the existence of the diffusion resistance layer 574, and therefore, the current I becomes a constant value Ip varying depending upon the air-fuel ratio. The upstream air-fuel ratio sensor 57 outputs a value corresponding to the air-fuel ratio based on the limiting current Ip.

Figure 7:
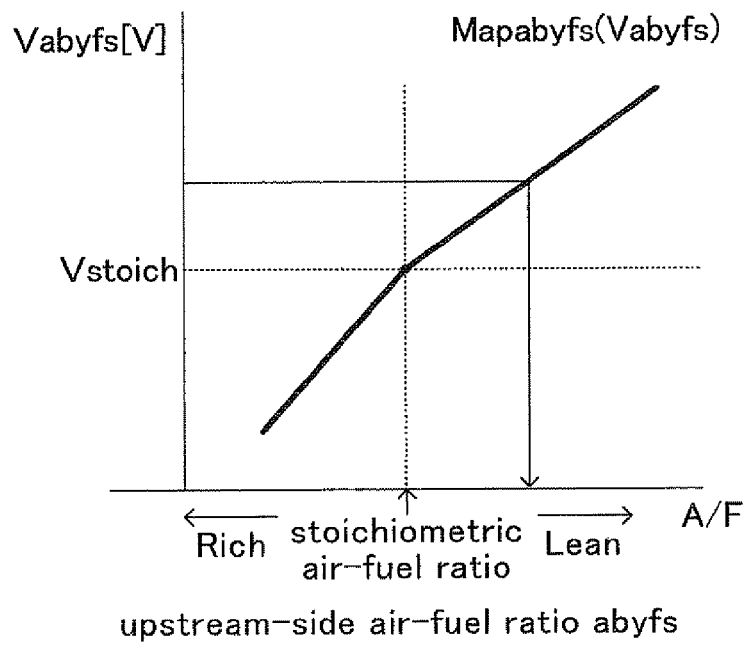
FIG. 7 is a graph showing a relationship between the air-fuel ratio of the exhaust gas and an output value of the upstream air-fuel ratio sensor.

As shown in FIG. 7, the upstream air-fuel ratio sensor 57 utilizing the above described detecting principle outputs an output values Vabyfs according to the air-fuel ratio (an upstream-side air-fuel ratio abyfs) of the exhaust gas flowing through the position at which the upstream air-fuel ratio sensor 57 is disposed. The output values Vabyfs is obtained by converting the limiting current Ip into a voltage. The output values Vabyfs increases, as the air-fuel ratio of the gas to be detected becomes larger (leaner). The electric control apparatus 60 stores an air-fuel ratio conversion table (map) Mapabyfs shown in FIG. 7, and detects an actual upstream-side air-fuel ratio abyfs by applying an actual output value Vabyfs to the air-fuel ratio conversion table Mapabyfs. The air-fuel ratio conversion table Mapabyfs is made in consideration of the preferential diffusion of hydrogen. In other words, the table Mapabyfs is made based on an "actual output value Vabyfs of the upstream air-fuel sensor 57" when the air-fuel ratio of the exhaust gas reaching the upstream air-fuel ratio sensor 57 is set at a value A by setting each of the air-fuel ratios of each of the cylinders at the same air-fuel ratio A to each other.

Referring back to FIG. 1 again, the downstream air-fuel ratio sensor 58 is disposed in the exhaust pipe 42 (i.e., the exhaust passage), and at a position between the upstream-side catalyst 43 and the downstream-side catalyst 44. The downstream air-fuel ratio sensor 58 is a well-known oxygen-concentration-cell-type oxygen concentration sensor (O2 sensor). The downstream air-fuel ratio sensor 58 has, for example, a structure similar to the upstream air-fuel ratio sensor 57 shown in (A) of FIG. 5 (except the electric power supply 578). Alternatively, the downstream air-fuel ratio sensor 58 may comprise a test-tube like solid electrolyte layer, an exhaust-gas-side electrode layer formed on an outer surface of the solid electrolyte layer, an atmosphere-side electrode layer formed on the solid electrolyte layer in such a manner that it is exposed in an atmosphere chamber (inside of the solid electrolyte layer) and faces (opposes) to the exhaust-gas-side electrode layer to sandwich the solid electrolyte layer therebetween, and a diffusion resistance layer which covers the exhaust-gas-side electrode layer and with which the exhaust gas contacts (or which is disposed to be exposed in the exhaust gas). The downstream air-fuel ratio sensor 58 outputs an output value Voxs in accordance with an air-fuel ratio (downstream-side air-fuel ratio afdown) of the exhaust gas passing through the position at which the downstream air-fuel ratio sensor 58 is disposed.

Figure 8:
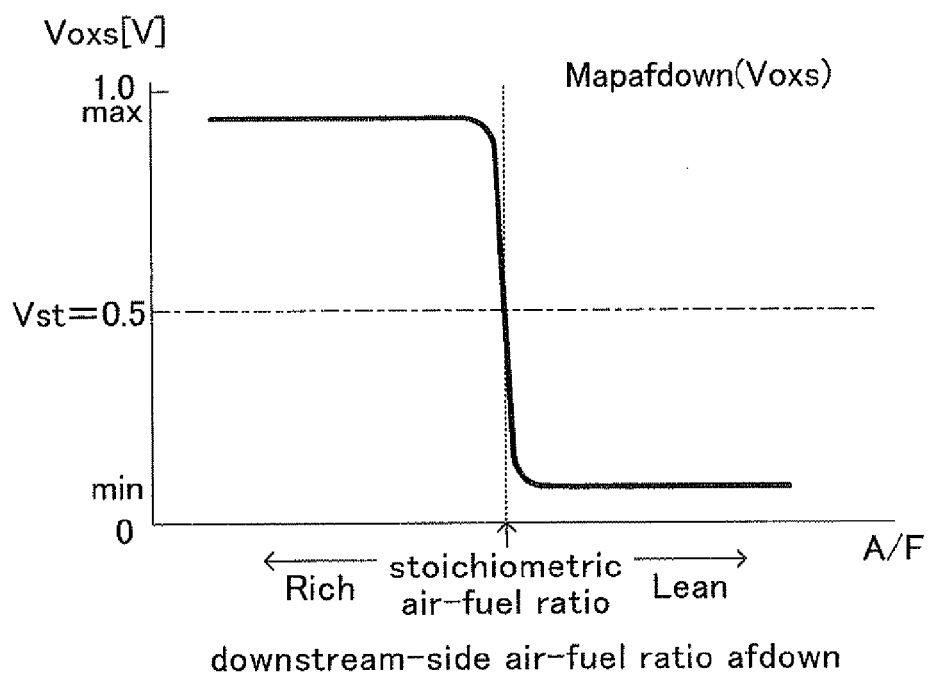
FIG. 8 is a graph showing a relationship between an air-fuel ratio of the exhaust gas and an output value of the downstream air-fuel ratio sensor.

As shown in FIG. 8, the output value Voxs of the downstream air-fuel ratio sensor 58 becomes equal to a maximum output value max (e.g., about 0.9 V) when the air-fuel ratio of the gas to be detected is richer than the stoichiometric air-fuel ratio, becomes equal to a minimum output value min (e.g., about 0.1 V) when the air-fuel ratio of the gas to be detected is leaner than the stoichiometric air-fuel ratio, and becomes equal to a voltage Vst which is about a middle value between the maximum output value max and the minimum output value min (the middle voltage Vst, e.g., about 0.5 V) when the air-fuel ratio of the gas to be detected is equal to the stoichiometric air-fuel ratio. Further, the output value Voxs varies rapidly from the maximum output value max to the minimum output value min when the air-fuel ratio of the gas to be detected varies from the air-fuel ratio richer than the stoichiometric air-fuel ratio to the air-fuel ratio leaner than the stoichiometric air-fuel ratio, and the output value Voxs varies rapidly from the minimum output value min to the maximum output value max when the air-fuel ratio of the gas to be detected varies from the air-fuel ratio leaner than the stoichiometric air-fuel ratio to the air-fuel ratio richer than the stoichiometric air-fuel ratio.

The accelerator opening sensor 59 shown in FIG. 1 detects an operation amount of the accelerator pedal AP operated by a driver so as to output a signal representing the operation amount Accp of the accelerator pedal AP.

The electric control apparatus 60 is a well-known microcomputer, including "a CPU, a ROM, a RAM, a backup RAM (or a nonvolatile memory such as an EEPROM), an interface including an AD converter, and so on".

The backup RAM is configured in such a manner that it is supplied with an electric power from a battery of a vehicle on which the engine 10 is mounted regardless of a position (any one of an off-position, a start-position, an on-position, and the like) of an unillustrated ignition key switch of the vehicle. The backup RAM stores data (data is written into the backup RAM) in accordance with an instruction from the CPU and retains (stores) the stored data in such a manner that the data can be read out, while it is supplied with the electric power from the battery. The backup RAM can not retain the data, while supplying the electric power from the battery is stopped, such as when the battery is taken out from the vehicle. Accordingly, the CPU initializes data to be stored in the backup RAM (or sets the data at default values), when supplying the electric power to the backup RAM is resumed.

The interface of the electric control apparatus 60 is connected to the sensors 51 to 59, and supplies signals from the sensors 51 to 59 to the CPU. Further, the interface sends instruction signals (drive signals), in accordance with instructions from the CPU, to each of the spark plugs 24 of each of the cylinders, each of the fuel injectors 25 of each of the cylinders, the intake valve control apparatus 26, the throttle valve actuator 34a, the actuator 208 of the compression ratio varying mechanism, and so on. It should be noted that the electric control apparatus 60 sends the instruction signal to the throttle valve actuator 34a, in such a manner that the throttle valve opening degree TA is increased as the obtained accelerator pedal operation amount Accp becomes larger. Further, the electric control apparatus 60 sends an instruction signal to the actuator 208 of the compression ratio varying mechanism in such a manner that the mechanical compression ratio of the engine 10 is set to (at) a first mechanical compression ratio when a load KL (described later) of the engine 10 is equal to or larger than a predetermined value, and in such a manner that the mechanical compression ratio of the engine 10 is set to (at) a second mechanical compression ratio when the load KL of the engine 10 is smaller than the predetermined value. In the present example, the first mechanical compression ratio is smaller than the second mechanical compression ratio. It should be noted however that the magnitude relation between the first mechanical compression ratio and the second mechanical compression ratio may be set appropriately depending on a characteristic (property) of the engine 10.

(Principle of a Determination of an Air-Fuel Ratio Imbalance Among Cylinders)

Next will be described the principle of the "determination of an air-fuel ratio imbalance among cylinders". The determination of an air-fuel ratio imbalance among cylinders is determining whether or not the air-fuel ratio non-uniformity among cylinders becomes larger than a "predetermined value determined based on the compression ratio", in other words, is determining whether or not a prominent imbalance among individual cylinder air-fuel-ratios is occurring, which may cause the emission to greatly worsen.

The fuel of the engine 10 is a chemical compound of carbon and hydrogen. Accordingly, "carbon hydride HC, carbon monoxide CO, and hydrogen $H_2$, and so on" are generated as intermediate products, while the fuel is burning so as to change into water $H_2O$ and carbon dioxide $CO_2$.

Figure 9:
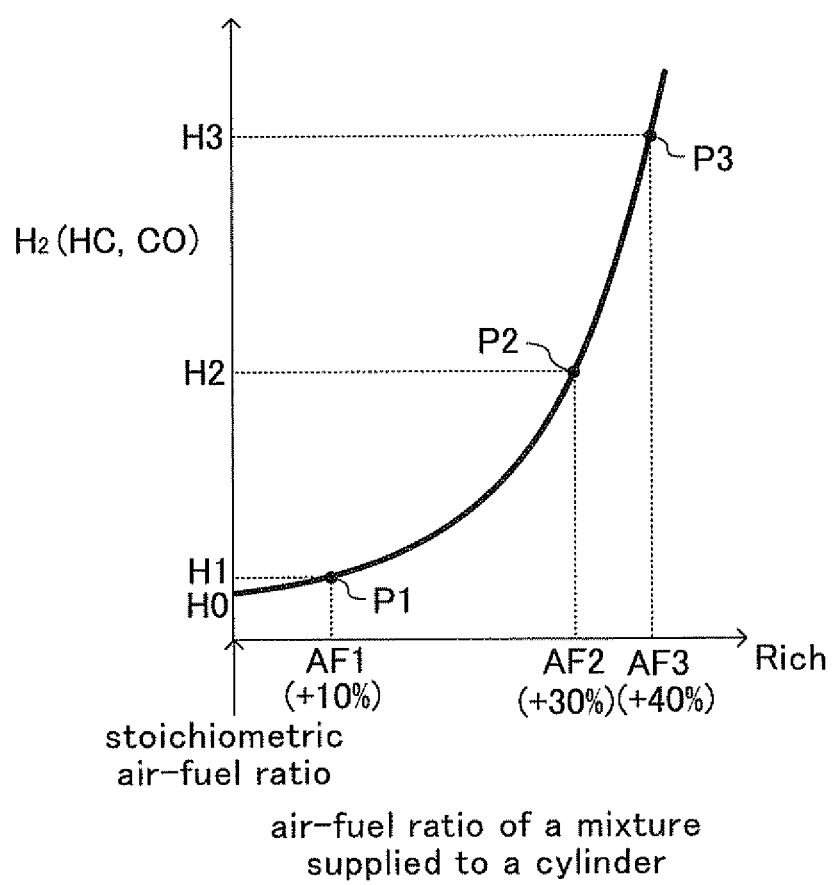
FIG. 9 is a graph showing a relationship between an air-fuel ratio of a mixture supplied to a certain cylinder and an amount of unburnt substances discharged from that certain cylinder.

As the air-fuel ratio of the mixture for the combustion becomes smaller than the stoichiometric air-fuel ratio (i.e., as the air-fuel ratio becomes richer than the stoichiometric air-fuel ratio), a difference between an amount of oxygen required for a perfect combustion and an actual amount of oxygen becomes larger. In other words, as the air-fuel ratio becomes richer, a shortage amount of oxygen during the combustion increases, and therefore, a concentration of oxygen lowers. Thus, a probability that intermediate products (unburnt substances) meet and bind with oxygen molecules (or are oxidized) greatly decreases. Consequently, as shown in FIG. 9, an amount of the unburnt substances (HC, CO, and $H_2$) discharged from a cylinder drastically (e.g., in a quadratic function fashion) increases, as the air-fuel ratio of the mixture supplied to the cylinder becomes richer. It should be noted that points P1, P2, and P3 in FIG. 9 corresponds to states in which an amount of fuel supplied to a certain cylinder becomes 10% (=AF1) excess, 30% (=AF2) excess, and 40% (=AF3) excess, respectively, with respect to an amount of the fuel that have an air-fuel ratio of the cylinder coincide with the stoichiometric air-fuel ratio.

In the mean time, hydrogen $H_2$ is a small molecule, compared with carbon hydride HC and carbon monoxide CO. Accordingly, hydrogen $H_2$ rapidly diffuses through the diffusion resistance layer 574 of the upstream air-fuel ratio sensor 57, compared to the other unburnt substances (HC, CO). Therefore, when a large amount of the unburnt substances including HC, CO, and $H_2$ are generated, a preferential diffusion of hydrogen $H_2$ prominently occurs in the diffusion resistance layer 574. That is, hydrogen $H_2$ reaches the surface of the air-fuel detecting element (the exhaust-gas-side electrode layer 572 formed on the surface of the solid electrolyte layer 571) in a larger mount compared with the "other unburnt substances (HC, CO)". As a result, a balance between a concentration of hydrogen $H_2$ and a concentration of the other unburnt substances (HC, CO) is lost. In other words, a fraction of hydrogen $H_2$ to all of the unburnt substances included in the "exhaust gas reaching the air-fuel ratio detecting element (the exhaust-gas-side electrode layer 572) of the upstream air-fuel ratio sensor 57" becomes larger than a fraction of hydrogen $H_2$ to all of the unburnt substances included in the "exhaust gas discharged from the combustion chambers 21 of the engine 10."

Meanwhile, the first determining apparatus is a portion of the air-fuel ratio control apparatus. The air-fuel ratio control apparatus performs a "feedback control on an air-fuel ratio (main feedback control)" to have the "upstream-side air-fuel ratio abyfs represented by the output value Vabyfs of the upstream air-fuel ratio sensor 57 (i.e., an air-fuel ratio corresponding to the output value Vabyfs)" become equal to a "target upstream-side air-fuel ratio abyfr". Typically, the target upstream-side air-fuel ratio abyfr is set at (to) the stoichiometric air-fuel ratio.

Further, the air-fuel ratio control apparatus performs a "sub feedback control on an air-fuel ratio" to have the "output value Voxs of the downstream air-fuel sensor 58 (or the downstream-side air-fuel ratio afdown represented by the output value Voxs of the downstream air-fuel ratio sensor)" become equal to a "target downstream-side value Voxsref (or a target downstream-side air-fuel ratio represented by the downstream-side value Voxsref)." Typically, the target downstream-side value Voxsref is set at (or to) a value (0.5V) corresponding to the stoichiometric air-fuel ratio.

Here, it is assumed that each of air-fuel ratios of the cylinders deviates toward a rich side without exception (evenly), while the air-fuel ratio imbalance state among cylinders is not occurring. Such a state occurs, for example, when a "measured or estimated value of the intake air amount of the engine" which is a basis when calculating a fuel injection amount becomes larger than a "true intake air amount".

In this case, for example, it is assumed that the air-fuel ratio of each of the cylinders is AF2 shown in FIG. 9. When the air-fuel ratio of a certain cylinder is AF2, a larger amount of the unburnt substances (thus, hydrogen $H_2$) are included in the exhaust gas than when the air-fuel ratio of the certain cylinder is AF1 closer to the stoichiometric air-fuel ratio than AF2 (refer to the point P1 and the point P2). Accordingly, the "preferential diffusion of hydrogen $H_2$" occurs in the diffusion resistance layer 574 of the upstream air-fuel ratio sensor 57.

In this case, a true average of the air-fuel ratio of the "mixture supplied to the engine 10 during a period in which each and every cylinder completes one combustion stroke (a period corresponding to 720° crank angle)" is also AF2. In addition, as described above, the air-fuel ratio conversion table Mapabyfs shown in FIG. 7 is made in consideration of the "preferential diffusion of hydrogen $H_2$". Therefore, the upstream-side air-fuel ratio abyfs represented by the actual output value Vabyfs of the upstream air-fuel ratio sensor 57 (i.e., the upstream-side air-fuel ratio abyfs obtained by applying the actual output value Vabyfs to the air-fuel ratio conversion table Mapabyfs) coincides with the "true average AF2 of the air-fuel ratio".

Accordingly, by the main feedback control, the air-fuel ratio of the mixture supplied to the entire engine 10 is corrected to coincide with the "stoichiometric air-fuel ratio which is the target upstream-side air-fuel ratio abyfr". In addition, the air-fuel ratio imbalance state among cylinders is not occurring. Therefore, each of the air-fuel ratios of the cylinders also roughly coincides with the stoichiometric air-fuel ratio. Consequently, a sub feedback amount (as well as a learning value of the sub feedback amount described later) does not become a value which corrects the air-fuel ratio in (or by) a great amount. That is, when the air-fuel ratio imbalance among cylinders is not occurring, the sub feedback amount (as well as the learning value of the sub feedback amount described later) does not become the value which greatly corrects the air-fuel ratio.

Another description will next be made regarding behaviors of various values, when the "air-fuel ratio imbalance among cylinders is not occurring."

For example, it is assumed that an air-fuel ratio A0/F0 is equal to the stoichiometric air-fuel ratio (e.g., 14.5), when the intake air amount (weight) introduced into each of the cylinders of the engine 10 is A0, and the fuel amount (weight) supplied to each of the cylinders is F0.

Further, it is assumed that an amount of the fuel supplied (injected) to each of the cylinders becomes uniformly excessive in (or by) 10% due to an error in estimating the intake air amount, etc. That is, it is assumed that the fuel of 1.1·F0 is supplied to each of the cylinder. Here, a total amount of the intake air supplied to the engine 10 which is the four cylinder engine (i.e., an intake amount supplied to the entire engine 10 during the period in which each and every cylinder completes one combustion stroke) is equal to 4·A0. A total amount of the fuel supplied to the engine 10 (i.e., a fuel amount supplied to the entire engine 10 during the period in which each and every cylinder completes one combustion stroke) is equal to 4.4·F0 (=1.1·F0+1.1·F0+1.1·F0+1.1·F0). Accordingly, a true average of the air-fuel ratio of the mixture supplied to the entire engine 10 is equal to 4·A0/(4.4·F0)=A0/(1.1·F0). At this time, the output value of the upstream air-fuel ratio sensor becomes equal to an output value corresponding to the air-fuel ratio A0/(1.1·F0).

Accordingly, the amount of the fuel supplied to each of the cylinders is decreased in (by) 10% (the fuel of 1·F0 is supplied to each of the cylinders) by the main feedback control, and therefore, the air-fuel ratio of the mixture supplied to the entire engine 10 is caused to coincide with the stoichiometric air-fuel ratio A0/F0.

In contrast, it is assumed that only the air-fuel ratio of a specific cylinder greatly deviates to (become) the richer side. This state occurs, for example, when the fuel injection characteristic of the fuel injector 25 provided for the specific cylinder becomes the "characteristic that the injector 25 injects the fuel in an amount which is considerable larger (more excessive) than the instructed fuel injection amount". This type of abnormality of the injector 25 is also referred to as a "rich deviation abnormality of the injector".

Here, it is assumed that an amount of the fuel supplied to one certain specific cylinder is excessive in (by) 40% (i.e., 1.4·F0), and an amount of the fuel supplied to each of the other three cylinders is a fuel amount required to have each of the air-fuel ratios of the other three cylinders coincide with the stoichiometric air-fuel ratio (i.e., F0). Under this assumption, the air-fuel ratio of the specific cylinder is "AF3" shown in FIG. 9, and the air-fuel ratio of each of the other cylinders is the stoichiometric air-fuel ratio.

At this time, a total amount of the intake air supplied to the engine 10 which is the four cylinder engine (an amount of the air supplied to the entire engine 10 during the period in which each and every cylinder completes one combustion stroke) is equal to 4·A0. A total amount of the fuel supplied to the entire engine 10 (an amount of the fuel supplied to the entire engine 10 during the period in which each and every cylinder completes one combustion stroke) is equal to 4.4·F0 (=1.4·F0+F0+F0+F0).

Accordingly, the true average of the air-fuel ratio of the mixture supplied to the entire engine 10 is equal to 4°A0/(4.4·F0)=A0/(1.1·F0). That is, the true average of the air-fuel ratio of the mixture supplied to the entire engine 10 is the same as the value obtained "when the amount of the fuel supplied to each of the cylinders is uniformly excessive in (by) 10%" as described above.

However, as described above, the amount of the unburnt substances (HC, CO, and $H_2$) drastically increases, as the air-fuel ratio of the mixture supplied to the cylinder becomes richer and richer. Accordingly, a "total amount SH1 of hydrogen $H_2$ included in the exhaust gas in the case in which "only the amount of the fuel supplied to the specific cylinder becomes excessive in (by) 40%" is equal to SH1=H3+H0+H0+H0=H3+3·H0, according to FIG. 9. In contrast, a "total amount SH2 of hydrogen $H_2$ included in the exhaust gas in the case in which the "amount of the fuel supplied to each of the cylinders is uniformly excessive in (by) 10%" is equal to SH2=H1+H1+H1+H1=4·H1, according to FIG. 9. The amount H1 is slightly larger than the amount H0, however, both of the amount H1 and the amount H0 are considerably small. That is, the amount H1 and the amount H0, as compared to the amount H3, is substantially equal to each other. Consequently, the total hydrogen amount SH1 is considerably larger than the total hydrogen amount SH2 (SH1>>SH2).

As described above, even when the average of the air-fuel ratio of the mixture supplied to the entire engine 10 is the same, the total amount SH1 of hydrogen included in the exhaust gas when the air-fuel ratio imbalance among cylinders is occurring is considerably larger than the total amount SH2 of hydrogen included in the exhaust gas when the air-fuel ratio imbalance among cylinders is not occurring.

Accordingly, due to the "preferential diffusion of hydrogen $H_2$" in the diffusion resistance layer 574, the air-fuel ratio represented by the output value Vabyfs of the upstream air-fuel ratio sensor when only the amount of the fuel supplied to the specific cylinder is excessive in (by) 40% becomes richer (smaller) than the "true average (A0/(1.1·F0)) of the air-fuel ratio of the mixture supplied to the entire engine 10". That is, even when the average of the air-fuel ratio of the exhaust gas is the same air-fuel ratio, the concentration of hydrogen $H_2$ at the exhaust-gas-side electrode layer 572 of the upstream air-fuel ratio sensor 57 becomes higher when the air-fuel ratio imbalance among cylinders is occurring than when the air-fuel ratio imbalance among cylinders is not occurring. Accordingly, the output value Vabyfs of the upstream air-fuel ratio sensor 57 becomes a value indicating an air-fuel ratio richer than the "true average of the air-fuel ratio".

Consequently, by the main feedback control, the true average of the air-fuel ratio of the mixture supplied to the entire engine 10 is caused to be leaner than the stoichiometric air-fuel ratio.

On the other hand, the exhaust gas which has passed through the upstream-side catalytic converter 43 reaches the downstream air-fuel ratio sensor 58. The hydrogen $H_2$ included in the exhaust gas is oxidized (purified) together with the other unburnt substances (HC, CO) in the upstream-side catalyst 43. Accordingly, the output value Voxs of the downstream air-fuel ratio sensor 58 becomes a value corresponding to the average of the true air-fuel ratio of the mixture supplied to the entire engine 10. Therefore, the air-fuel ratio control amount (sub feedback amount, and so on) calculated according to the sub feedback control becomes a value which compensates for the excessive correction of the air-fuel ratio to the lean side due to the main feedback control. The true average of the air-fuel ratio of the engine 10 is made to coincide with the stoichiometric air-fuel ratio by that sub feedback amount, and so on.

As described above, the air-fuel ratio control amount (sub feedback amount) calculated according to the sub feedback control becomes the value to compensate for the "excessive correction of the air-fuel ratio to the lean side" caused by the rich deviation abnormality of the injector 25 (the air-fuel ratio imbalance among cylinders). In addition, a degree of the excessive correction of the air-fuel ratio to the lean side increases, as the injector 25 which is in the rich deviation abnormality state injects the fuel in (by) larger amount with respect to the "instructed injection amount" (i.e., as the air-fuel ratio of the specific cylinder becomes richer).

Therefore, in a "system in which the air-fuel ratio of the engine is corrected to the richer side", as the sub feedback amount is a positive value and the magnitude of the sub feedback amount becomes larger, a "value varying depending on the sub feedback amount (in practice, for example, a learning value of the sub feedback amount, the learning value being obtained from the steady-state component of the sub feedback amount)" is a value representing the degree of the air-fuel ratio imbalance among cylinders.

In view of the above, the first determining apparatus obtains the value varying depending upon the sub feedback amount (in the present example, the "sub FB learning value" which is the learning value of the sub feedback amount), as the imbalance determining parameter. That is, the imbalance determining parameter is a "value which becomes larger, as a difference becomes larger between an amount of hydrogen included in the exhaust gas before passing through the upstream-side catalyst 43 and an amount of hydrogen included in the exhaust gas after passing through the upstream-side catalyst 43". Accordingly, the imbalance determining parameter is also referred to as a hydrogen amount difference indicating parameter.

Thereafter, the first determining apparatus determines that the air-fuel ratio imbalance among cylinders is occurring, when the imbalance determining parameter becomes equal to or larger than a "predetermined threshold."

Figure 10:
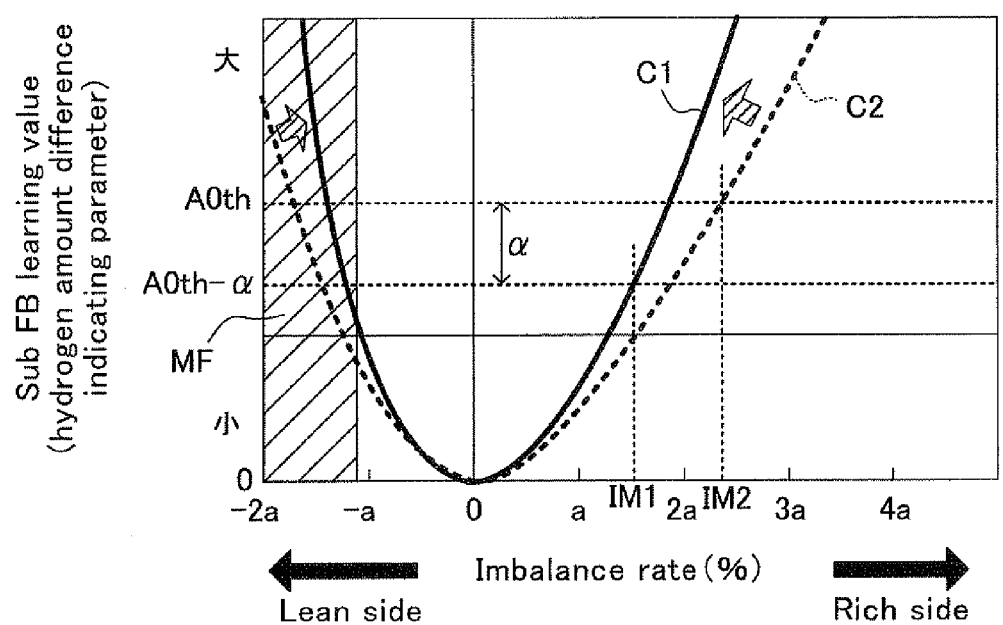
FIG. 10 is a graph showing a relationship between an air-fuel ratio imbalance rate among cylinders and a sub FB learning value (imbalance determining parameter, hydrogen amount difference indicating parameter)

A curve lines C1 and C2 shown in FIG. 10 indicates the sub FB learning value (hydrogen amount difference indicating parameter serving as the imbalance determining parameter), when the air-fuel ratio imbalance among cylinders is occurring, and an air-fuel ratio of one certain cylinder deviates to a richer side or to a leaner side from the stoichiometric air-fuel ratio. The curve line C1 shows the sub FB learning value when the mechanical compression ratio is equal to a high value, and the curve line C2 shows the sub FB learning value when the mechanical compression ratio is equal to a low value. The abscissa axis of the graph shown in FIG. 10 is an "imbalance rate (ratio)" which indicates a "degree of imbalance (non-uniformity) among individual cylinder air-fuel ratios, each of which is an air-fuel ratio of a mixture supplied to each of a plurality of the cylinders." The imbalance rate is a ratio ($=(X-Y)/X$) of a difference ($=(X-Y)$) between the stoichiometric air-fuel ratio X and the air-fuel ratio of the cylinder which deviates to the richer side or to the leaner side to the stoichiometric air-fuel ratio X.

Figure 11:
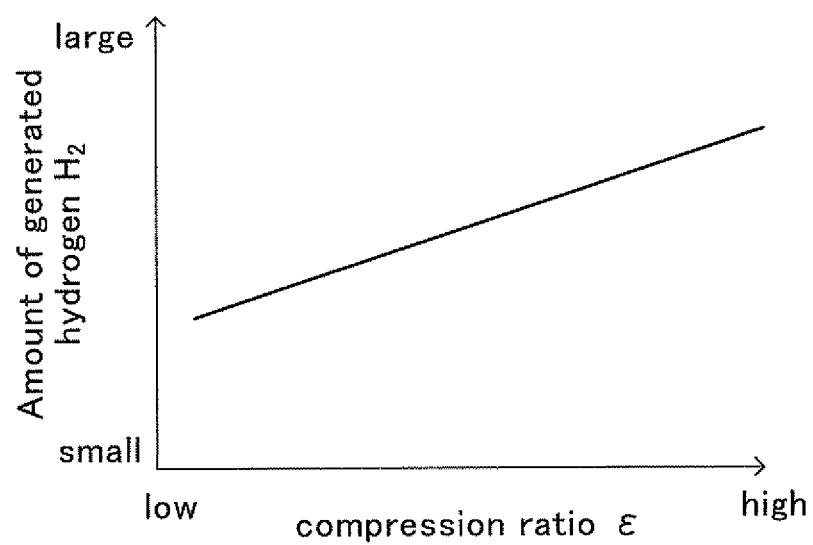
FIG. 11 is a graph showing a relationship between a mechanical compression ratio and an amount of generated hydrogen.

As described above, an effect of the preferential diffusion of hydrogen $H_2$ emerges drastically as the imbalance rate becomes larger and larger. Further, an amount of hydrogen $H_2$ discharged from the combustion chamber 21 becomes larger, as the mechanical compression ratio $\epsilon$ becomes higher, as shown in FIG. 11, regardless of the imbalance rate. Consequently, as shown by the curve lines C1 and C2 in FIG. 10, the sub FB learning value increases, as the imbalance rate becomes larger and as the compression ratio (the mechanical compression ratio or the substantial compression ratio) $\epsilon$ becomes higher.

It should be noted that, as shown in FIG. 10, the sub FB learning value increases as an absolute value of the imbalance rate becomes larger even when the imbalance rate is a negative value. That is, for example, when an air-fuel ratio imbalance state among cylinders is occurring in which only an air-fuel ratio of a specific cylinder greatly deviates to (become) the leaner side, the sub FB learning value (value corresponding to the sub FB learning value) serving as the imbalance determining parameter increases. This state occurs, for example, when the fuel injection characteristic of the fuel injector 25 provided for the specific cylinder becomes a "characteristic that the injector 25 injects the fuel in (by) an amount which is considerable smaller than the instructed fuel injection amount". This type of abnormality of the injector 25 is also referred to as a "lean deviation abnormality of the injector".

The reason why the sub FB learning value increases when the air-fuel ratio imbalance among cylinders occurs in which the air-fuel ratio of the single specific cylinder greatly deviates to the leaner side will next be described briefly. In the description below, it is assumed that the intake air amount (weight) introduced into each of the cylinders of the engine 10 is A0. Further, it is assumed that the air-fuel ratio A0/F0 coincides with the stoichiometric air-fuel ratio, when the fuel amount (weight) supplied to each of the cylinders is F0.

Here, it is assumed that the amount of fuel supplied to one certain specific cylinder (the first cylinder, for convenience) is considerably small in (by) 40% (i.e., 0.6·F0), and an amount of fuel supplied to each of the other three cylinders (the second, the third, and the fourth cylinder) is a fuel amount required to have each of the air-fuel ratios of the other three cylinders coincide with the stoichiometric air-fuel ratio (i.e., F0). It should be noted it is assumed that a misfiring does not occur.

In this case, by the main feedback control, it is further assumed that the amount of the fuel supplied to each of the first to fourth cylinders is increased in the same amount (10%) to each other. At this time, the amount of the fuel supplied to the first cylinder is equal to 0.7·F0, and the amount of the fuel supplied to each of the second to fourth cylinders is equal to 1.1·F0.

Under this assumption, a total amount of the intake air supplied to the engine 10 which is the four cylinder engine (an amount of air supplied to the entire engine 10 during the period in which each and every cylinder completes one combustion stroke) is equal to 4·A0. A total amount of the fuel supplied to the engine 10 (an amount of fuel supplied to the entire engine 10 during the period in which each and every cylinder completes one combustion stroke) is equal to 4.0·F0 ($=0.7\cdot F0+1.1\cdot F0+1.1\cdot F0+1.1\cdot F0$), as a result of the main feedback control. Consequently, the true average of the air-fuel ratio of the mixture supplied to the entire engine 10 is equal to $4\cdot A0/(4\cdot F0)=A0/F0$, that is the stoichiometric air-fuel ratio.

However, a "total amount SH3 of hydrogen $H_2$ included in the exhaust gas" in this case is equal to $SH3=H4+H1+H1+H1=H4+3\cdot H1$. It should be noted that H4 is an amount of hydrogen generated when the air-fuel ratio is equal to A0/(0.7·F0), and is roughly equal to H0. Accordingly, the total amount SH3 is at most equal to ($H0+3\cdot H1$).

In contrast, when the air-fuel ratio imbalance among cylinders is not occurring and the true average of the air-fuel ratio of the mixture supplied to the entire engine 10 is equal to the stoichiometric air-fuel ratio, a "total amount SH4 of hydrogen $H_2$ included in the exhaust gas" is $SH4=H0+H0+H0+H0=4\cdot H0$. As described above, H1 is slightly larger than H0. Accordingly, the total amount SH3($=H0+3\cdot H1$) is larger than the total amount SH4 ($=4\cdot H0$).

Consequently, while the air-fuel ratio imbalance among cylinders is occurring due to the "lean deviation abnormality of the fuel injector", the output value Vabyfs of the upstream air-fuel ratio sensor 57 is affected by the preferential diffusion of hydrogen, even when the true average of the air-fuel ratio of the mixture supplied to the entire engine 10 is shifted to the stoichiometric air-fuel ratio by the main feedback control. That is, the upstream-side air-fuel ratio abyfs obtained by applying the output value Vabyfs to the air-fuel ratio conversion table Mapabyfs becomes "richer (smaller)" than the stoichiometric air-fuel ratio which is the target upstream-side air-fuel ratio abyfr. As a result, the main feedback control is further performed, and the true average of the air-fuel ratio of the mixture supplied to the entire engine 10 is adjusted (corrected) to the leaner side with respect to the stoichiometric air-fuel ratio.

Accordingly, the air-fuel ratio control amount calculated according to the sub feedback control becomes larger to compensate for the "excessive correction of the air-fuel ratio to the leaner side due to the main feedback control" caused by the lean deviation abnormality of the fuel injector 25 (the air-fuel ratio imbalance among cylinders). Therefore, the "sub FB learning value" obtained based on the "air-fuel ratio control amount calculated according to the sub feedback control" increases, as the imbalance rate is a negative value and the magnitude of the imbalance rate increases.

Accordingly, the first determining apparatus determines that the air-fuel ratio imbalance among cylinders has occurred, when the imbalance determining parameter which increases and decreases according to an increase and a decrease of the sub FB learning value, respectively, becomes equal to or larger than the "predetermined threshold", not only in the case in which the air-fuel ratio of the specific cylinder deviates to the "rich side" but also in the case in which the air-fuel ratio of the specific cylinder deviates to the "lean side". It should be noted that, generally, the misfiring occurs before the sub FB learning value reaches the "predetermined threshold" (refer to a misfiring area MF shown in FIG. 10). Accordingly, typically, the "deviation of the air-fuel ratio of a specific cylinder to the lean side" is detected by detecting the misfiring.

Figure 12:
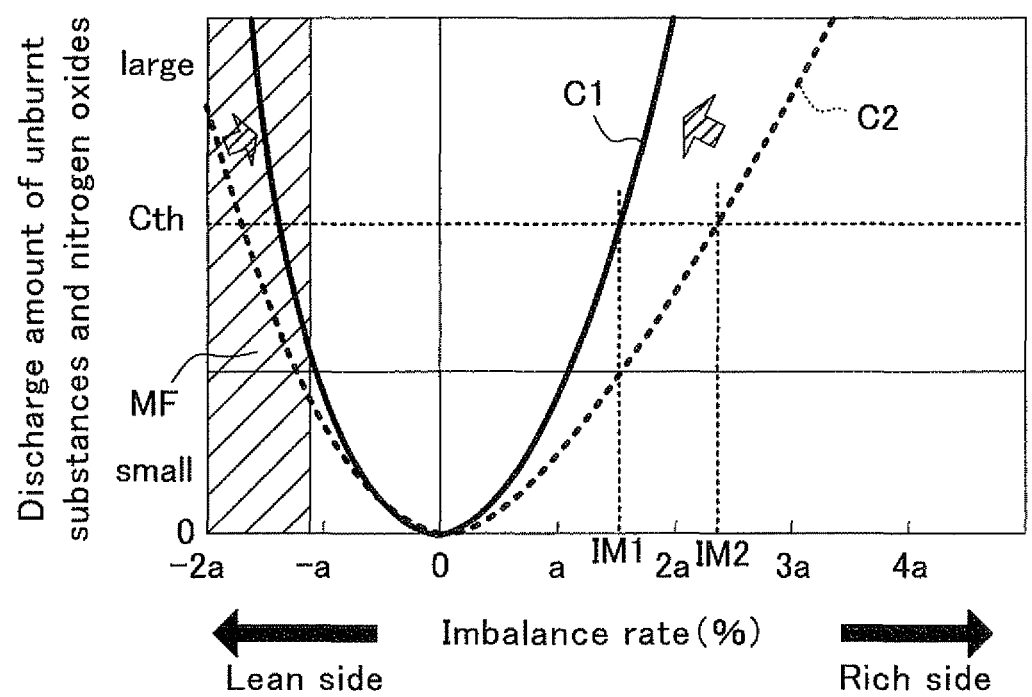
FIG. 12 is a graph showing a relationship between the air-fuel ratio imbalance rate among cylinders and an discharge amount of emission (unburnt substances and a nitrogen oxide)

FIG. 12 is a graph showing an amount of the emission (unburnt substances and nitrogen oxides), when the air-fuel ratio imbalance state among cylinders is occurring. In this graph, a curve line C1 shows the amount of the emission when the mechanical compression ratio is equal to a high value, and the curve line C2 shows the amount of the emission when the mechanical compression ratio is equal to a low value. A value Cth indicates a permissible level of the amount of the emission (allowable limit amount).

As is clear from FIG. 12, in a case in which the mechanical compression ratio is high (curve line C1), the amount of the emission reaches the permissible level value Cth when the imbalance rate is relatively small (=IM1). In contrast, in a case in which the mechanical compression ratio is low (curve line C2), the amount of the emission reaches the permissible level value Cth when the imbalance rate is relatively large (=IM2>IM1). This is because it is inferred that an amount of hydrogen $H_2$ discharged from the combustion chambers becomes larger, as the mechanical compression ratio becomes higher, as described above. This tendency is also maintained for the substantial compression ratio. That is, the imbalance rate which causes an amount of the emission to reach the permissible level value Cth becomes smaller, as the substantial compression ratio becomes higher.

Accordingly, if an "imbalance rate to determine that the air-fuel ratio imbalance state among cylinders has occurred" is set at (to) a constant rate (e.g., a rate corresponding to the imbalance rate IM2) regardless of the compression ratio, an amount of the emission may exceed the permissible level value Cth when the comparison ratio is changed. That is, if the first determining apparatus is configured so as to determine that the air-fuel ratio imbalance state among cylinders has occurred when the sub FB learning value serving as the imbalance determining parameter reaches a constant threshold A0th, an amount of the emission exceeds the permissible level value when it is determined that the air-fuel ratio imbalance state among cylinders has occurred under a high compression ratio.

In view of the above, the first determining apparatus sets an imbalance determination threshold Ath which is to be compared to the sub FB learning value at (to) a value A0th so that it is determined that the imbalance state has occurred when the imbalance rate is equal to IM2 in a case in which the mechanical compression ratio is low (refer to FIG. 10). Further, the first determining apparatus sets the imbalance determination threshold Ath at (to) a value (A0th−α, α>0) which is smaller than the value A0th by α so that it is determined that the imbalance state has occurred when the imbalance rate is equal to IM1 in a case in which the mechanical compression ratio is high (refer to FIG. 10).

According to the configuration described above, whatever the mechanical compression ratio is, it can be determined that the "air-fuel ratio imbalance state among cylinders has occurred" at a time point when an amount of the emission does not exceed the permissible level value Cth. It should be noted that the first determining apparatus changes the imbalance determination threshold based on the mechanical compression ratio, however, it may be configured in such a manner that, while it maintains the imbalance determination threshold at a constant value, it performs the imbalance determination by obtaining, as the imbalance determining parameter, a "value obtained by correcting the sub feedback learning value based on the mechanical compression ratio", and by comparing the obtained imbalance determining parameter with the constant imbalance determination threshold. In this case, as the imbalance determining parameter, a value is used, the value being obtained by correcting the sub FB learning value in such a manner that the value is equal to a "sub FB learning value obtained as if the mechanical compression ratio when the sub FB learning value is obtained were equal to a standard (reference) mechanical compression ratio (compression ratio when a standard threshold A0th is determined).

(Actual Operation)

The actual operation of the first determining apparatus will next be described.

<Fuel Injection Amount Control>

Figure 13:
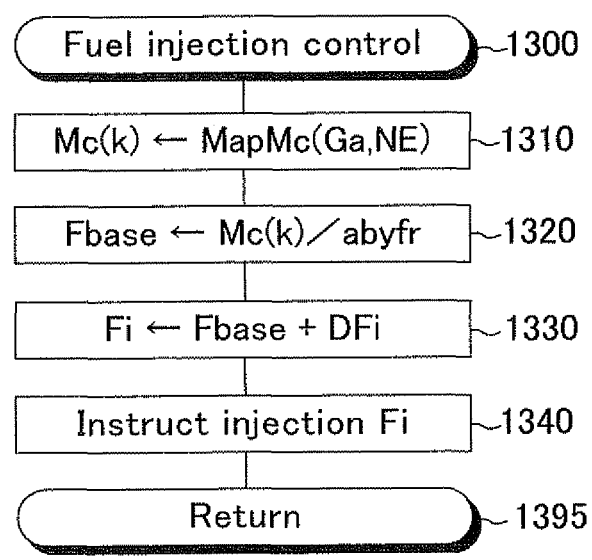
FIG. 13 is a flowchart showing a fuel injection control routine executed by a CPU of an electrical control apparatus shown in FIG. 1.

The CPU repeatedly executes a routine to calculate a fuel injection amount Fi and instruct a fuel injection, shown by a flowchart in FIG. 13, every time a crank angle of any one of cylinders reaches a predetermined crank angle before its intake top dead center (e.g., BTDC 90° CA), for that cylinder (hereinafter, referred to as a "fuel injection cylinder"). Accordingly, at an appropriate timing, the CPU starts a process from step 1300, and performs processes from step 1310 to step 1340 in this order, and thereafter, proceeds to step 1395 to end the present routine tentatively.

Step 1310: The CPU obtains a "cylinder intake air amount Mc(k)" which is an "air amount introduced into the fuel injection cylinder", on the basis of "the intake air flow rate Ga measured by the air flowmeter 51, the engine rotational speed NE, and a look-up table MapMc". The cylinder intake air amount Mc(k) is stored in the RAM, while being related to the intake stroke of each cylinder. The cylinder intake air amount Mc(k) may be calculated based on a well-known air model (model constructed according to laws of physics describing and simulating a behavior of an air in the intake passage).

Step 1320: The CPU obtains a base fuel injection amount Fbase by dividing the cylinder intake air amount Mc(k) by the target upstream-side air-fuel ratio abyfr. The target upstream-side air-fuel ratio abyfr is set at (to) the stoichiometric air-fuel ratio, with the exception of special cases described later.

Step 1330: The CPU calculates a final fuel injection amount Fi by correcting the base fuel injection amount Fbase with a main feedback amount DFi (more specifically, by adding the main feedback amount DFi to the base fuel injection amount Fbase). The main feedback amount DFi will be described later.

Step 1340: The CPU sends an instruction signal to the "fuel injector 25 disposed so as to correspond to the fuel injection cylinder" in order to have the fuel injector 25 inject a fuel of the final fuel injection amount (instructed fuel injection amount) Fi.

In this way, an amount of the fuel injected from each of the fuel injectors 25 is uniformly increased and decreased with the main feedback amount DFi commonly used for all of the cylinders.

<Calculation of the Main Feedback Amount>

Figure 14:
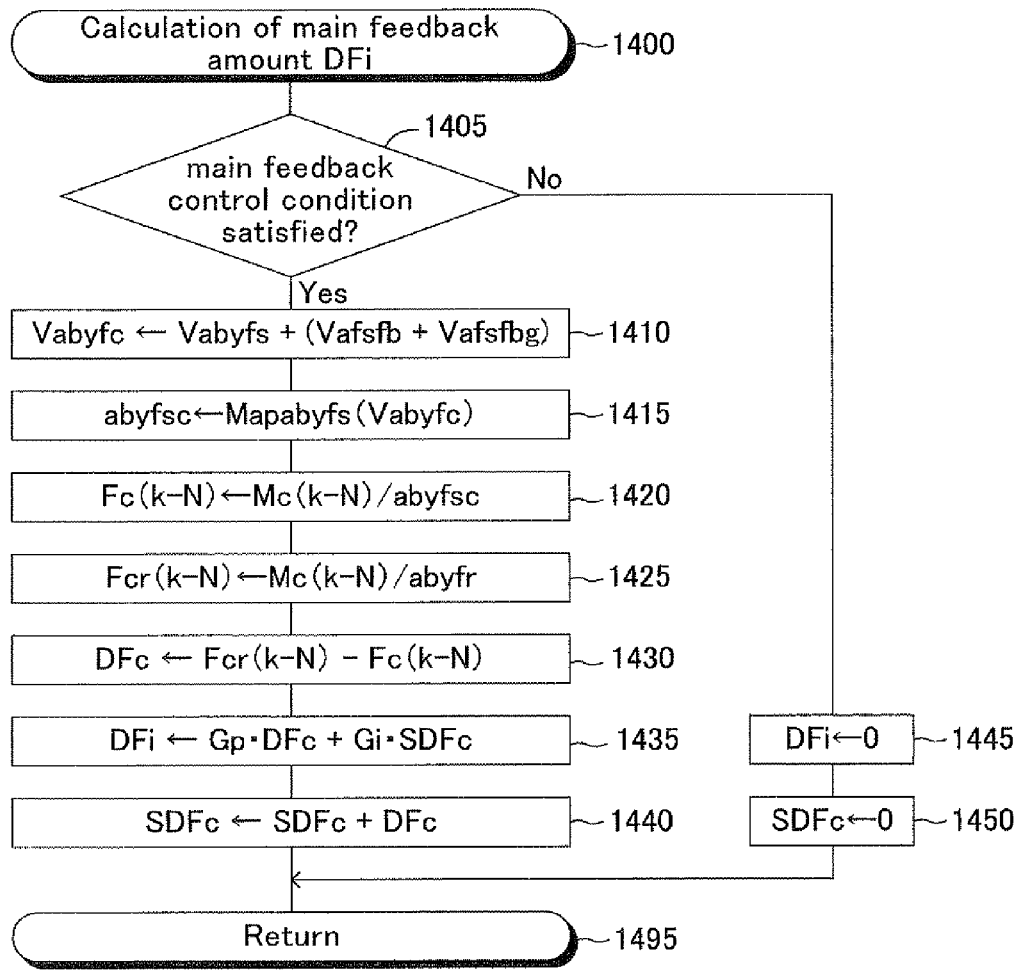
FIG. 14 is a flowchart showing a routine, executed by the CPU of an electrical control apparatus shown in FIG. 1, for calculating a main feedback amount.

The CPU repeatedly executes a routine for the calculation of the main feedback amount shown by a flowchart in FIG. 14, every time a predetermined time period elapses. Accordingly, at an appropriate timing, the CPU starts the process from step 1400 to proceed to step 1405, at which CPU determines whether or not a main feedback control condition (upstream-side air-fuel ratio feedback control condition) is satisfied.

The main feedback control condition is satisfied when all of the following conditions are satisfied.
(Condition A1) The upstream air-fuel ratio sensor 57 has been activated.
(Condition A2) The load (load rate) KL of the engine is smaller than or equal to a threshold value KLth.
(Condition A3) An operating state of the engine 10 is not in a fuel-cut state.

It should be noted that the load rate KL is obtained according to the following formula (1). The accelerator pedal operation amount Accp, the throttle valve opening degree TA, and the like can be used in place of the load rate KL. In the formula (1), Mc is the cylinder intake air amount, ρ is an air density (unit is (g/l), L is a displacement of the engine 10 (unit is (l)), and "4" is the number of cylinders of the engine 10.

$$KL=(Mc/(\rho \cdot L/4))\cdot 100\% \qquad (1)$$

The description continues assuming that the main feedback control condition is satisfied. In this case, the CPU makes a "Yes" determination at step 1405 to execute processes from steps 1410 to 1440 described below in this order, and then proceed to step 1495 to end the present routine tentatively.

Step 1410: The CPU obtains an output value Vabyfc for a feedback control, according to a formula (2) described below. In the formula (2), Vabyfs is the output value of the upstream air-fuel ratio sensor 57, Vafsfb is the sub feedback amount calculated based on the output value Voxs of the downstream air-fuel ratio sensor 58, Vafsfbg is the learning value (sub FB learning value) of the sub feedback amount. These values are currently obtained values. The way by which the sub feedback amount Vafsfb is calculated and the way by which the sub FB learning value Vafsfbg is calculated will be described later.

$$Vabyfc=Vabyfs+(Vafsfb+Vafsfbg) \qquad (2)$$

Step 1415: The CPU obtains an air-fuel ratio abyfsc for a feedback control by applying the output value Vabyfc for a feedback control to the table Mapabyfs shown in FIG. 7, as shown by a formula (3) described below.

$$abyfsc=Mapabyfs(Vabyfc) \qquad (3)$$

Step 1420: According to a formula (4) described below, the CPU obtains a "cylinder fuel supply amount Fc(k–N)" which is an "amount of the fuel actually supplied to the combustion chamber 21 for a cycle at a timing N cycles before the present time". That is, the CPU obtains the cylinder fuel supply amount Fc(k–N) through dividing the "cylinder intake air amount Mc(k–N) which is the cylinder intake air amount for the cycle the N cycles (i.e., N·720° crank angle) before the present time" by the "air-fuel ratio abyfsc for a feedback control".

$$Fc(k-N)=Mc(k-N)/abyfsc \qquad (4)$$

The reason why the cylinder intake air amount Mc(k–N) for the cycle N cycles before the present time is divided by the air-fuel ratio abyfsc for a feedback control in order to obtain the cylinder fuel supply amount Fc(k–N) is because the "exhaust gas generated by the combustion of the mixture in the combustion chamber 21" requires time "corresponding to the N cycles" to reach the upstream air-fuel ratio sensor 57. It should be noted that, in practical, a gas formed by mixing the exhaust gases from the cylinders in some degree reaches the upstream air-fuel ratio sensor 57.

Step 1425: The CPU obtains a "target cylinder fuel supply amount Fcr(k–N)" which is a "fuel amount which was supposed to be supplied to the combustion chamber 21 for the cycle the N cycles before the present time", according to a formula (5) described below. That is, the CPU obtains the target cylinder fuel supply amount Fcr(k–N) through dividing the cylinder intake air amount Mc(k–N) for the cycle the N cycles before the present time by the target upstream-side air-fuel ratio abyfr.

$$Fcr(k-N)=Mc(k-N)/abyfr \qquad (5)$$

Step 1430: The CPU obtains an "error DFc of the cylinder fuel supply amount", according to a formula (6) described below. That is, the CPU obtains the error DFc of the cylinder fuel supply amount by subtracting the cylinder fuel supply amount Fc(k–N) from the target cylinder fuel supply amount Fcr(k–N). The error DFc of the cylinder fuel supply amount represents excess and deficiency of the fuel supplied to the cylinder the N cycle before the present time.

$$DFc=Fcr(k-N)-Fc(k-N) \qquad (6)$$

Step 1435: The CPU obtains the main feedback amount DFi, according to a formula (7) described below. In the formula (7) below, Gp is a predetermined proportion gain, and Gi is a predetermined integration gain. Further, a "value SDFc" in the formula (7) is an "integrated value of the error DFc of the cylinder fuel supply amount". That is, the CPU calculates the "main feedback amount DFi" based on a proportional-integral control to have the air-fuel ratio abyfsc for a feedback control becomes equal to the target air-fuel ratio abyfr.

$$DFi=Gp\cdot DFc+Gi\cdot SDFc \qquad (7)$$

Step 1440: The CPU obtains a new integrated value SDFc of the error of the cylinder fuel supply amount by adding the error DFc of the cylinder fuel supply amount obtained at the step 1430 to the current integrated value SDFc of the error DFc of the cylinder fuel supply amount.

As described above, the main feedback amount DFi is obtained based on the proportional-integral control. The main feedback amount DFi is reflected in (onto) the final fuel injection amount Fi by the process of the step 1330 in FIG. 13.

Meanwhile, a "sum of the sub feedback amount Vafsfb and the sub FB learning value Vafsfbg" in the right-hand side of the formula (2) above is small and is limited to a small value, compared to the output value Vabyfs of the upstream air-fuel ratio 57. Accordingly, as described later, the "sum of the sub feedback amount Vafsfb and the sub FB learning value Vafsfbg" may be considered as a "supplement correction amount" to have the "output value Voxs of the downstream air-fuel sensor 58" become equal to a "target downstream-side value Voxsref which is a value corresponding to the stoichiometric air-fuel ratio". The air-fuel ratio abyfsc for a feedback control can therefore be said to be a value substantially based on the output value Vabyfs of the upstream air-fuel ratio 57. That is, the main feedback amount DFi can be said to be a correction amount to have the "air-fuel ratio of the engine represented by the output value Vabyfs of the upstream air-fuel ratio 57" become equal to the "target upstream-side air-fuel ratio (the stoichiometric air-fuel ratio)".

When the determination is made at step 1405, and if the main feedback condition is not satisfied, the CPU makes a "No" determination at step 1405 to proceed to step 1445, at which the CPU sets the value of the main feedback amount DFi to (at) "0". Subsequently, the CPU stores "0" into the integrated value SDFc of the error of the cylinder fuel supply amount at step 1450. Thereafter, the CPU proceeds to step 1495 to end the present routine tentatively. As described above, when the main feedback condition is not satisfied, the main feedback amount DFi is set to (at) "0". Accordingly, the correction for the base fuel injection amount Fbase with the main feedback amount DFi is not performed.

<Calculation of the Sub Feedback Amount and the Sub FB Learning Value>

Figure 15:
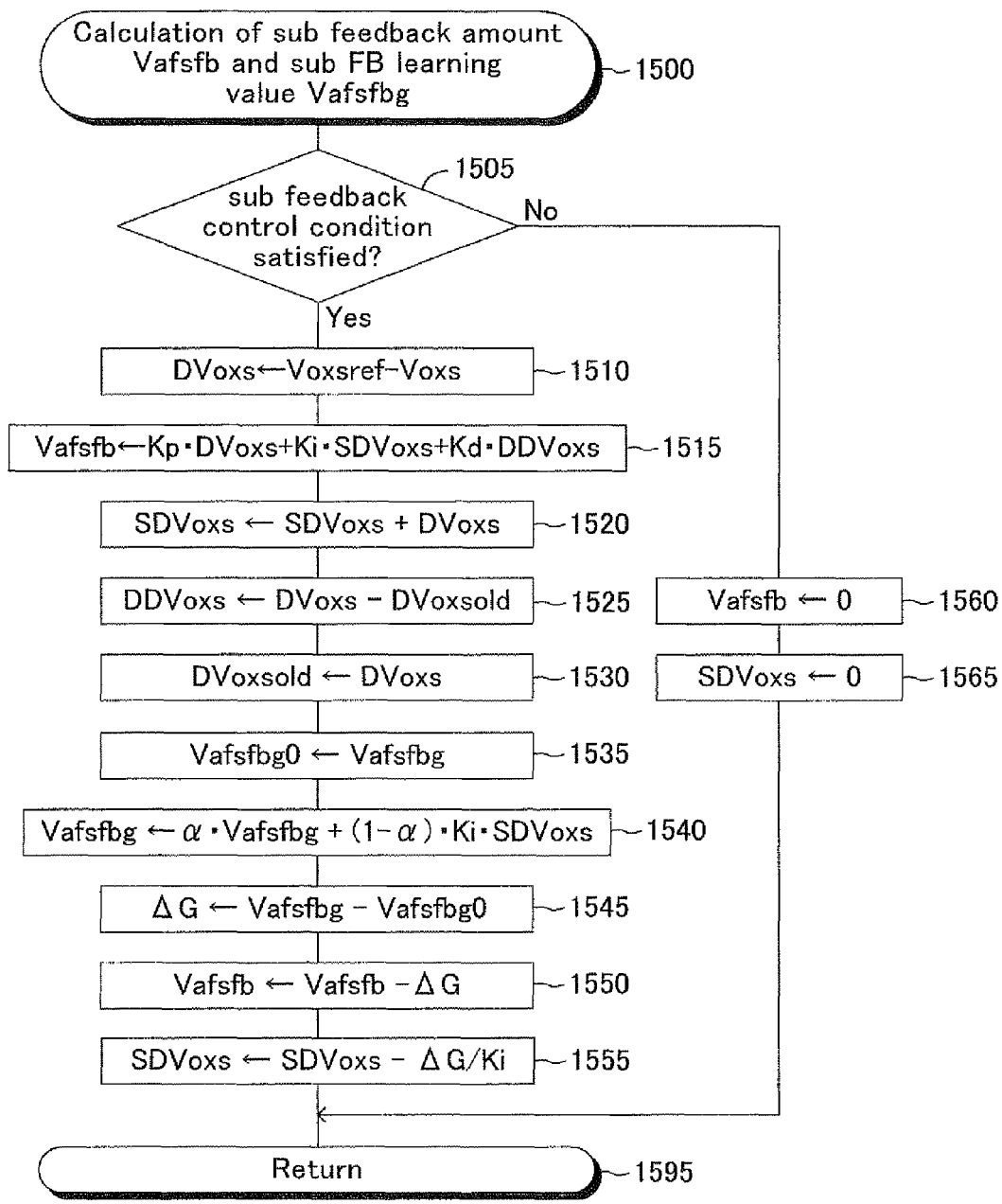
FIG. 15 is a flowchart showing a routine, executed by the CPU of an electrical control apparatus shown in FIG. 1, for calculating a sub feedback amount and sub FB learning value.

The CPU repeatedly executes a routine shown in FIG. 15 every time a predetermined time period elapses in order to calculate the "sub feedback amount Vafsfb" and the "learning value (the sub FB learning value) Vafsfbg of the sub feedback amount Vafsfb". Accordingly, at an appropriate timing, the CPU starts a process from step 1500 to proceed to step 1505, at which CPU determines whether or not a sub feedback control condition is satisfied.

The sub feedback control condition is satisfied when all of the following conditions are satisfied.
(Condition B1) The main feedback control condition is satisfied.
(Condition B2) The downstream air-fuel ratio sensor 58 has been activated.
(Condition B3) The target upstream-side air-fuel ratio abyfr is set at the stoichiometric air-fuel ratio stoich.

The description continues assuming that the sub feedback control condition is satisfied. In this case, the CPU makes a "Yes" determination at step 1505 to execute processes from steps 1510 to 1530 described below in this order, to calculate the sub feedback amount Vafsfb.

Step 1510: The CPU obtains an "error amount of output DVoxs" which is a difference between the "target downstream-side value Voxsref" and the "output value Voxs of the downstream air-fuel ratio sensor 58", according to a formula (8) described below. That is, the CPU obtains the "error amount of output DVoxs" by subtracting the "current output value Voxs of the downstream air-fuel ratio sensor 58" from the "target downstream-side value Voxsref". The target downstream-side value Voxsref is set at (to) the value Vst (0.5 V) corresponding to the stoichiometric air-fuel ratio.

$$DVoxs = Voxsref - Voxs \tag{8}$$

Step 1515: The CPU obtains the sub feedback amount Vafsfb according to a formula (9) described below. In the formula (9) below, Kp is a predetermined proportion gain (proportional constant), Ki is a predetermined integration gain (integration constant), and Kd is a predetermined differential gain (differential constant). The SDVoxs is an integrated value of the error amount of output DVoxs (time integration value SDVoxs), and the DDVoxs is a differential value of the error amount of output DVoxs.

$$Vafsfb = Kp \cdot DVoxs + Ki \cdot SDVoxs + Kd \cdot DDVoxs \tag{9}$$

Step 1520: The CPU obtains a new integrated value SDVoxs of the error amount of output by adding the "error amount of output DVoxs obtained at the step 1510" to the "current integrated value SDVoxs of the error amount of output".

Step 1525: The CPU obtains a new differential value DDVoxs by subtracting a "previous error amount of the output DVoxsold calculated when the present routine was executed at a previous time" from the "error amount of output DVoxs calculated at the step 1510".

Step 1530: The CPU stores the "error amount of output DVoxs calculated at the step 1510" as the "previous error amount of the output DVoxsold".

In this way, the CPU calculate the "sub feedback amount Vafsfb" according to a proportional-integral-differential (PID) control to have the output value Voxs of the downstream air-fuel ratio sensor 58 becomes equal to the target downstream-side value Voxsref. As shown in the formula (2) described above, the sub feedback amount Vafsfb is used to calculate the output value Vabyfc for a feedback control.

Subsequently, the CPU executes processes from steps 1535 to 1555 described below in this order, to calculate the "sub FB learning value Vafsfbg", and thereafter, proceeds to step 1595 to end the present routine tentatively.

Step 1535: The CPU stores the current sub FB learning value Vafsfbg as a before-updated learning value Vafsfbg0.

Step 1540: The CPU updates the sub FB learning value Vafsfbg according to a formula (10) described below. Vafsfbg (k+1) which is the left-hand side of the formula (10) is an updated sub FB learning value Vafsfbg. The Value α is a value equal to or larger than 0 and smaller than 1.

$$Vafsfbg(k+1) = \alpha \cdot Vafsfbg + (1-\alpha) \cdot Ki \cdot SDVoxs \tag{10}$$

As is clear from the formula (10), the sub FB learning value Vafsfbg is a value obtained by performing a "filtering process to eliminate noises" on the "integral term Ki·SDVoxs of the sub feedback amount Vafsfb". In other words, the sub FB learning value Vafsfbg is a value corresponding to the steady-state component (integral term Ki·SDVoxs) of the sub feedback amount Vafsfb, and is a first order lag amount (blurred value) of the integral term Ki·SDVoxs. In this way, the sub FB learning value Vafsfbg is updated in such a manner that the sub FB learning value Vafsfbg comes closer to a steady-state component of the sub feedback amount Vafsfb. Since the sub feedback amount Vafsfb and the sub FB learning value are values to correct a result of the feedback control based on the output value Vabyfs of the upstream air-fuel ratio sensor, they may be said to be values that are calculated based on the output value Vabyfs of the upstream air-fuel ratio sensor (values obtained using the output value Vabyfs of the upstream air-fuel ratio sensor). The updated sub FB learning value Vafsfbg (=Vafsfbg(k+1)) are stored in the backup RAM.

Step 1545: The CPU calculates a change amount (update amount) ΔG of the sub FB learning value Vafsfbg, according to a formula (11) described below.

$$\Delta G = Vafsfbg - Vafsfbg0 \tag{11}$$

Step 1550: The CPU corrects the sub feedback amount Vafsfb with the change amount ΔG, according to a formula (12) described below.

$$Vafsfb = Vafsfb - \Delta G \tag{12}$$

The processes of step 1545 and step 1550 will be described. As shown in the formula (2), the CPU obtains the output value Vabyfc for a feedback control by adding "the sub feedback amount Vafsfb and the sub FB learning value Vafsfbg" to "the output value Vabyfs of the upstream air-fuel ratio 57". The sub FB learning value Vafsfbg is a value capturing a portion of the integral term Ki·SDVoxs (the steady-state component) of the sub feedback amount Vafsfb. Accordingly, when the sub FB learning value Vafsfbg is updated, and if the sub feedback amount Vafsfb is not corrected in accordance with the change amount of the sub FB learning value Vafsfbg, a double correction may be made by "the updated sub FB learning value Vafsfbg and the sub feedback amount Vafsfb". It is therefore necessary to correct the sub feedback amount Vafsfb in accordance with the updated amount ΔG of the sub FB learning value Vafsfbg, when the sub FB learning value Vafsfbg is updated.

In view of the above, as shown in the formula (11) above and the formula (12) above, the CPU decreases the sub feedback amount Vafsfb by the change amount ΔG, when the sub FB learning value Vafsfbg is increased by the change amount ΔG. In the formula (11), Vafsfbg0 is the sub FB learning value Vafsfbg immediately before the update. Accordingly, the change amount ΔG can be a positive value and a negative value.

Step 1555: The CPU corrects the integrated value of the error amount of output DVoxs with the change amount ΔG, according to a formula (13) described below. It should be noted that step 1555 may be omitted. Further, step 1545 and step 1555 may be omitted.

$$SDVoxsnew = SDVoxs - \Delta G/Ki \tag{13}$$

With the processes described above, the sub feedback amount Vafsfb and the sub FB learning value Vafsfbg are updated, every time the predetermined time elapses.

In contrast, when the sub feedback control condition is not satisfied, the CPU makes a "No" determination at step 1505 in FIG. 15 to execute processes from steps 1560 to 1565 described below in this order, and then proceed to step 1595 to end the present routine tentatively.

Step 1560: The CPU sets the value of the sub feedback amount Vafsfb at (to) "0".

Step 1565: The CPU sets the value of the integrated value SDVoxs of the error amount of output at (to) "0".

By the processes described above, as is clear from the formula (2) above, the output value Vabyfc for a feedback control becomes equal to the sum of the output value Vabyfs of the upstream air-fuel ratio 57 and the sub FB learning value Vafsfbg. That is, in this case, "updating the sub feedback amount Vafsfb" and "reflecting the sub feedback amount Vafsfb in (into) the final fuel injection amount Fi" are stopped. It should be noted that the sub FB learning value Vafsfbg corresponding to the integral term of the sub feedback amount Vafsfb is reflected in (into) the final fuel injection amount Fi.

<Determination of the Air-Fuel Ratio Imbalance Among Cylinders>

Processes for performing the "determination of the air-fuel ratio imbalance among cylinders" will next be described, with reference to FIG. 16.

Figure 16:
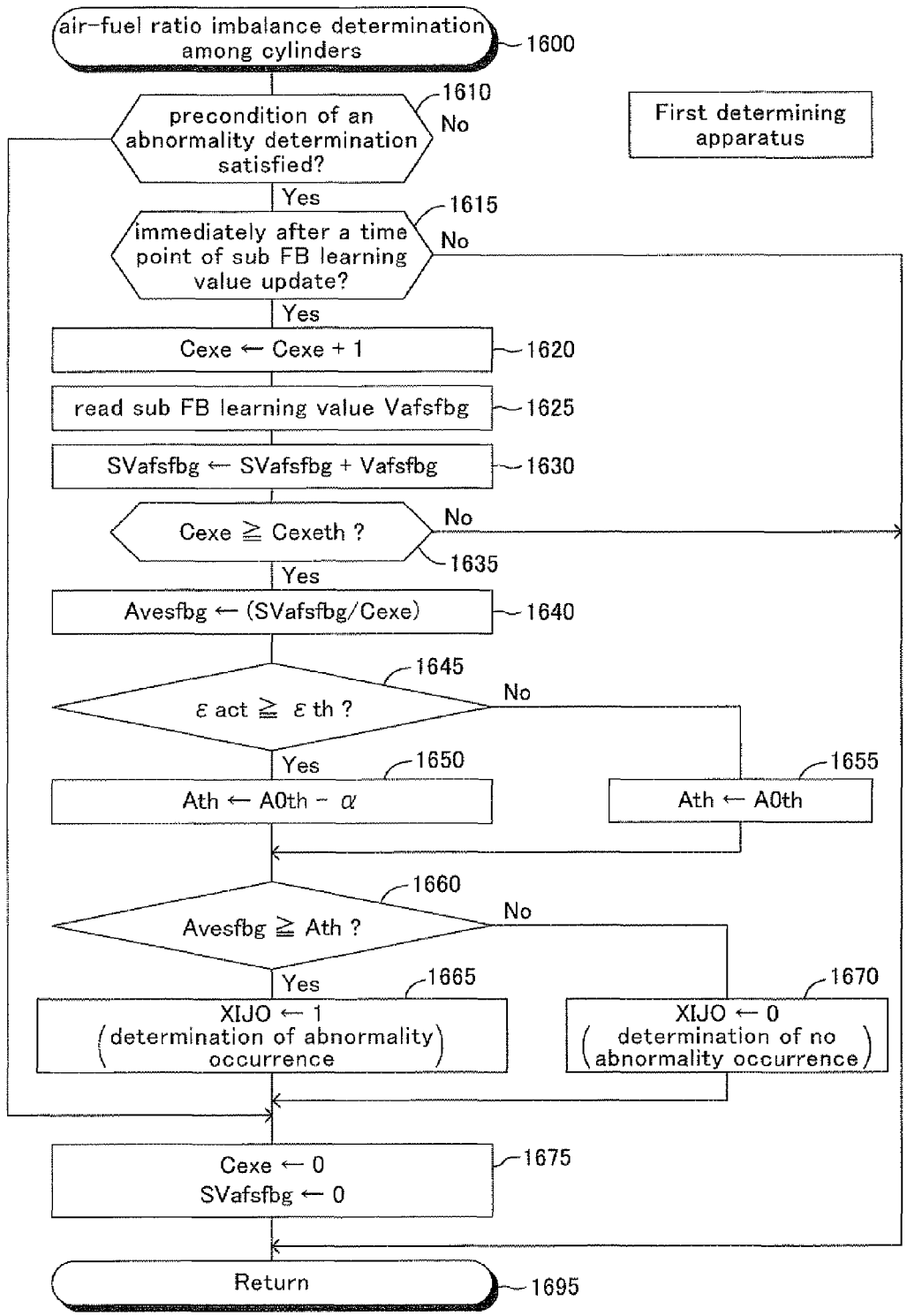
FIG. 16 is a flowchart shown a routine, executed by the CPU of an electrical control apparatus shown in FIG. 1, for carrying out an air-fuel ratio imbalance determination among cylinders.

The CPU repeatedly executes a "routine for the determination of the air-fuel ratio imbalance among cylinders" shown in FIG. 16, every time a predetermined time elapses. Accordingly, at an appropriate timing, the CPU starts a process from step 1600 to proceed to step 1610, at which CPU determines whether or not a "precondition (determination performing condition) of an abnormality determination" is satisfied.

The precondition of the abnormality determination is also a "allowable condition for obtaining the imbalance determining parameter". If the precondition of the abnormality determination is not satisfied, a "prohibiting condition for the determination" of the air-fuel ratio imbalance among cylinders is satisfied. When the "prohibiting condition for the determination" of the air-fuel ratio imbalance among cylinders is satisfied, a determination of the "air-fuel ratio imbalance among cylinders" described below using an "imbalance determining parameter calculated based on the sub FB learning value Vafsfbg" is not performed.

The precondition of the abnormality determination may includes conditions from (D1) to (D4) described below, for example. The precondition of the abnormality determination is satisfied, when all of the conditions from (D1) to (D4) are satisfied. In other words, the prohibiting condition for the determination is satisfied, when any one of conditions from (D1) to (D4) is not satisfied. In addition, the precondition may be a combination of one or more of these conditions, or another condition may be added to these conditions.

(Condition D1) A purifying ability to oxidize hydrogen of the upstream-side catalyst 43 is neither equal to nor smaller than a first predetermined ability. That is, the purifying ability to oxidize hydrogen of the upstream-side catalyst 43 is larger than the first predetermined ability. The condition D1 may be a condition which is satisfied when, for example, an oxygen storage amount of the upstream-side catalyst 43 is equal to or larger than a first oxygen storage amount threshold. In this case, it is possible to determine that the purifying ability to oxidize hydrogen of the upstream-side catalyst 43 is larger than the first predetermined ability. It should be noted that the CPU separately obtains the oxygen storage amount of the upstream-side catalyst 43 according to a well known method (refer to Japanese Patent Application Laid-Open No. 2007-239700, Japanese Patent Application Laid-Open No. 2003-336535, and Japanese Patent Application Laid-Open No. 2004-036475, etc.).

(Condition D2) The purifying ability to oxidize hydrogen of the upstream-side catalyst 43 is neither equal to nor larger than a second predetermined ability. The second predetermined ability is larger than the first predetermined ability.

(Condition D3) A flow rate of the exhaust gas discharged from each of the combustion chambers 21 of the engine 10 is neither equal to nor larger than a flow rate of the exhaust gas threshold. That is, the flow rate of the exhaust gas discharged from the engine 10 is smaller than the flow rate of the exhaust gas threshold. The condition D3 is a condition which is satisfied when the load (load rate KL, the throttle valve opening degree TA, the operation amount Accp of the accelerator pedal, or the like) of the engine 10 is equal to or smaller than a load threshold. Alternatively, the condition D3 is a condition which is satisfied when the intake air amount Ga of the engine 10 per unit time is equal to or smaller than an intake air amount threshold GAth.

(Condition D4) The target upstream-side air-fuel ratio abyfr is set at the stoichiometric air-fuel ratio.

It is assumed that the precondition ((the condition D1)-(the condition D4) of the abnormality determination described above is satisfied. In this case, the CPU makes a "Yes" determination at step 1610 to execute processes from step 1615. The processes from step 1615 are a portion of processes for the abnormality determination (air-fuel ratio imbalance determination among cylinders).

Step 1615: The CPU determines whether or not the present time is "immediately after a time point (immediate after a time point of sub FB learning value update) at which the sub FB learning value Vafsfbg is updated". When the present time is the time point immediately after the time point of the sub FB learning value update, the CPU proceeds steps from step 1620 to step 1635. When the present time is not the time point immediately after the time point of the sub FB learning value update, the CPU proceeds to step 1695 to end the present routine tentatively.

Step 1620: The CPU increments a value of a learning value cumulative counter Cexe by "1".

Step 1625: The CPU reads the sub FB learning value Vafsfbg calculated at step 1540 of the routine shown in FIG. 15.

Step 1630: The CPU updates a cumulative value SVafsfbg of the sub FB learning value Vafsfbg. That is, the CPU adds the "sub FB learning value Vafsfbg which was read at step 1625" to the "present cumulative value SVafsfbg" in order to obtain the new cumulative value SVafsfbg.

The cumulative value SVafsfbg is set at (to) "0" in the initialization routine. Further, the cumulative value SVafsfbg is also set at (to) "0" by a process at step 1675 described later. The process of the step 1675 is executed when the abnormality determination (determination of the air-fuel ratio imbalance among cylinders, steps 1660-1670) is carried out. Accordingly, the cumulative value SVafsfbg is an integrated value of the sub FB learning value Vafsfbg in a period in which "the precondition of the abnormality determination is satisfied" after "the engine start or the last execution of the abnormality determination".

Step 1635: The CPU determines whether or not the value of the learning value cumulative counter Cexe is equal to or larger than a counter threshold Cexeth. The learning value cumulative counter Cexe is a predetermined natural number. When the value of the learning value cumulative counter Cexe is smaller than the counter threshold Cexeth, the CPU makes a "No" determination at step 1635 to directly proceed to step 1695 to end the present routine tentatively. In contrast, when the value of the learning value cumulative counter Cexe is equal to or larger than the counter threshold Cexeth, the CPU makes a "Yes" determination at step 1635 to proceed to step 1640 and step 1645.

Step 1640: The CPU obtains a sub FB learning value average Avesfbg by dividing the "cumulative value SVafsfbg of the sub FB learning value Vafsfbg" by the "learning value cumulative counter Cexe". As described above, the sub FB learning value average Avesfbg is the "imbalance determining parameter (hydrogen amount difference indicating parameter)" which increases as the difference becomes larger between the amount of hydrogen included in the exhaust gas which has not passed through the upstream-side catalyst 43 and the amount of hydrogen included in the exhaust gas which has passed through the upstream-side catalyst 43. It should be noted that the value of the counter threshold Cexeth may be "1", and in this case, the sub FB learning value average Avesfbg coincides with the sub FB learning value Vafsfbg.

Step 1645: The CPU obtains an "actual mechanical compression ratio εact at the present time (actual mechanical compression ratio εact) based on the distance ST detected by the stroke sensor 56, and determines whether or not the actual mechanical compression ratio εact is equal to or larger than mechanical compression ratio threshold εth. It should be noted that the first determining apparatus sends the instruction signal to the actuator 208 of the compression ratio varying mechanism in such a manner that the mechanical compression ratio of the engine 10 is set to (at) the "first mechanical compression ratio ε1 as a target compression ratio" when the load KL of the engine 10 is equal to or larger than a predetermined value, and sends the instruction signal to the actuator 208 of the compression ratio varying mechanism in such a manner that the mechanical compression ratio of the engine 10 is set to (at) the "second mechanical compression ratio ε2 as the target compression ratio" when the load KL of the engine 10 is smaller than the predetermined value. The first mechanical compression ratio ε1 is smaller than the mechanical compression ratio threshold εth, and the second mechanical compression ratio ε2 is equal to or larger than the mechanical compression ratio threshold εth. The CPU proceeds to step 1650 described below when the actual mechanical compression ratio ε act is equal to or larger than the mechanical compression ratio threshold εth, and the CPU proceeds to step 1655 described below when the actual mechanical compression ratio εact is smaller than the mechanical compression ratio threshold εth.

Step 1650: The CPU sets the imbalance determination threshold Ath at (to) a value smaller than the value A0th by α (A0th−α, α>0) (refer to FIG. 10). Thereafter, the CPU proceeds to step 1660. The value A0th is the standard threshold.

Step 1655: The CPU sets the imbalance determination threshold Ath at (to) the value A0th. Thereafter, the CPU proceeds to step 1660.

Step 1660: The CPU determines whether or not the sub FB learning value average Avesfbg (imbalance determining parameter, hydrogen amount difference indicating parameter) is equal to or larger than the "imbalance determination threshold Ath, set at step 1650 above or step 1655 above."

As described above, when the air-fuel ratio non-uniformity among cylinders becomes excessively large, and thus, the air-fuel ratio imbalance among cylinders is occurring, the sub feedback amount Vafsfb becomes a value which greatly corrects (shifts) the air-fuel ratio of the mixture supplied to the engine 10 to the richer side. That causes the sub FB learning value average Avesfbg which is the average of the sub FB learning value Vafsfbg to become a "value (equal to or larger than the imbalance determination threshold Ath) which greatly corrects (shifts) the air-fuel ratio of the mixture supplied to the engine 10 to the richer side."

Accordingly, the CPU determines that the air-fuel ratio imbalance among cylinders is occurring when the sub FB learning value average Avesfbg is equal to or larger than the imbalance determination threshold Ath. That is, when the sub FB learning value average Avesfbg is equal to or larger than the imbalance determination threshold Ath, the CPU makes a "Yes" determination at step 1660 to proceed to step 1665, at which the CPU sets a value of an abnormality occurrence flag XIJO to (at) "1". Thus, when the value of the abnormality occurrence flag XIJO is "1", the flag XIJO indicates that the air-fuel ratio imbalance among cylinders is occurring. It should be noted that the value of the abnormality occurrence flag XIJO is stored in the backup RAM. Further, when the value of the abnormality occurrence flag XIJO is set to (at) "1", the CPU may turn on an unillustrated warning lamp. Thereafter, the CPU proceeds to step 1675.

In contrast, when the sub FB learning value average Avesfbg is smaller than the imbalance determination threshold Ath, the CPU makes a "No" determination at step 1660 to proceed to step 1670. Then, at step 1670, the CPU sets the value of the abnormality occurrence flag XIJO to (at) "0" so as to indicate that the "air-fuel ratio imbalance among cylinders is not occurring." Thereafter, the CPU proceeds to step 1675.

Step 1675: The CPU sets the value of the learning value cumulative counter Cexe to (at) "0" (i.e., the CPU resets the counter Cexe), and sets the value of the cumulative value SVafsfbg of the sub FB learning value to (at) "0" (i.e., the CPU resets the value SVafsfbg).

It should be noted that the CPU proceeds to step 1695 to end the present routine tentatively after executing the process of step 1675, when the CPU executes the process of step 1610 and the precondition of the abnormality determination is not satisfied. Further, the CPU directly proceeds to step 1695 from step 1615 to end the present routine tentatively, when the CPU executes the process of step 1615 and that time point is not the time point immediately after the time point of the sub FB learning value update.

As described above, the first determining apparatus is applied to the multi-cylinder internal combustion engine (10) having a plurality of cylinders, and comprises:

the catalyst (43) disposed, in the exhaust passage of the engine, and at the portion downstream of the exhaust gas aggregated portion into which exhaust gases discharged from combustion chambers (21) of at least two or more of cylinders (in the first embodiment, all of the cylinders) of a plurality of the cylinders merge;

fuel injectors (25), each being disposed so as to correspond to each of the at least two or more of cylinders and so as to inject a fuel to be contained in the mixture supplied to each of the combustion chambers of the at least two or more of cylinders;

the upstream air-fuel ratio sensor (57), which is disposed at the exhaust gas aggregated portion (41*b*) or at a position between the exhaust gas aggregated portion (41*b*) and the catalyst (43) in the exhaust passage, which includes the diffusion resistance layer with which an exhaust gas before passing through the catalyst contacts, and includes the air-fuel ratio detecting element, which is covered by the diffusion resistance layer, and which outputs, as the output value of the upstream air-fuel ratio sensor, a signal in accordance with an air-fuel ratio of an exhaust gas reaching the air-fuel ratio detecting element after passing through the diffusion resistance layer;

imbalance determining means for obtaining, based on at least "the output value Vabyfs and the output value Voxs of the downstream air-fuel ratio sensor (58)" (refer to FIGS. 14-16, especially step 1540 and step 1640), the imbalance determining parameter (the sub FB learning value average Avesfbg) which becomes larger as the degree (e.g., the imbalance rate) of the imbalance among the individual cylinder air-fuel ratios" becomes larger, each of the individual cylinder air-fuel ratios being an air-fuel ratio of a mixture supplied to each of the at least two or more of cylinders, and for performing the determination as to whether or not the air-fuel ratio imbalance state among cylinders is occurring, based on the comparison result as to whether or not the obtained imbalance determining parameter is larger than or equal to the predetermined threshold (Ath) (refer to steps 1660-1670 shown in FIG. 16); and wherein, the imbalance determining means is configured so as to vary the predetermined threshold (Ath), in accordance with the compression ratio (εact) of the engine varied by the compression ratio varying means (steps 1645-1655 shown in FIG. 16).

Accordingly, it is possible to determine that the "air-fuel ratio imbalance state among cylinders has occurred" at a time point before the emissions worsen, whatever the compression ratio (the mechanical compression ratio, in the present example) of the engine 10 is, and therefore, to perform warning if necessary.

In this case, the imbalance determining means determines, based on the compression ratio of the engine, the predetermined threshold (Ath) in such a manner that an amount of unburnt substances flowing out from the catalyst coincides with the constant permissible limit value regardless of the compression ratio, when the imbalance determining parameter becomes a value exceeding the predetermined threshold. In other words, the imbalance rate is measured when the discharge amount of the emission reaches the permissible limit value Cth (refer to FIG. 12) under each of the compression ratios, and the threshold (Ath) is set based on the compression ratio in such a manner that it is determined that the air-fuel ratio imbalance state among cylinders has occurred when the degree of the air-fuel ratio imbalance among cylinders coincides with the measured imbalance rate while the engine is being operated under each of the compression ratio.

According to the above configuration, it is possible to determine that the "air-fuel ratio imbalance state among cylinders has occurred" at a time point before the amount of the unburnt substance flowing out from the catalyst 43 exceeds the constant permissible limit value, whatever the compression ratio of the engine 10 is.

It should be noted that the first determining apparatus can be said to be the air-fuel ratio imbalance among cylinders determining apparatus including:

the downstream air-fuel ratio sensor 58 which outputs the output value varying depending on the air-fuel ratio of the exhaust gas which has passed through the catalyst 43;

sub feedback amount updating means (FIG. 15) for updating, based on the output value of the downstream air-fuel ratio sensor, the sub feedback amount Vafsfb to have the output value of the downstream air-fuel ratio sensor becomes equal to a value corresponding to the stoichiometric air-fuel ratio every time a predetermined first update timing arrives;

fuel injection amount determining means (steps 1410-1435 shown in FIG. 14) for determining the fuel injection amount based on at least the output value Vabyfs of the upstream air-fuel ratio sensor 57 and the sub feedback amount Vafsfb every time a predetermined second update timing arrives;

sub feedback amount learning means for (steps 1535-1555 shown in FIG. 15) for updating the learning value Vafsfbg of the sub feedback amount based on the sub feedback amount every time a predetermined third update timing arrives in such a manner that the learning value comes closer to the steady-state component of the sub feedback amount; and wherein, the imbalance determining means is configured so as to obtain, based on the learning value of the sub feedback amount, the imbalance determining parameter in such a manner that the imbalance determining parameter becomes larger as the learning value of the sub feedback amount, becomes larger (step 1640 shown in FIG. 16).

Second Embodiment

An air-fuel ratio imbalance among cylinders determining apparatus (hereinafter, referred to as a "second determining apparatus") of a multi-cylinder internal combustion engine according to a second embodiment of the present invention will next be described. The second determining apparatus is different from the first determining apparatus only in that the second determining apparatus corrects the imbalance determining parameter based on the mechanical compression ratio (i.e., it obtains the imbalance determining parameter further based on the mechanical compression ratio), instead of changing the imbalance determination threshold Ath based on the mechanical compression ratio. Accordingly, this difference will be mainly described.

Figure 17:
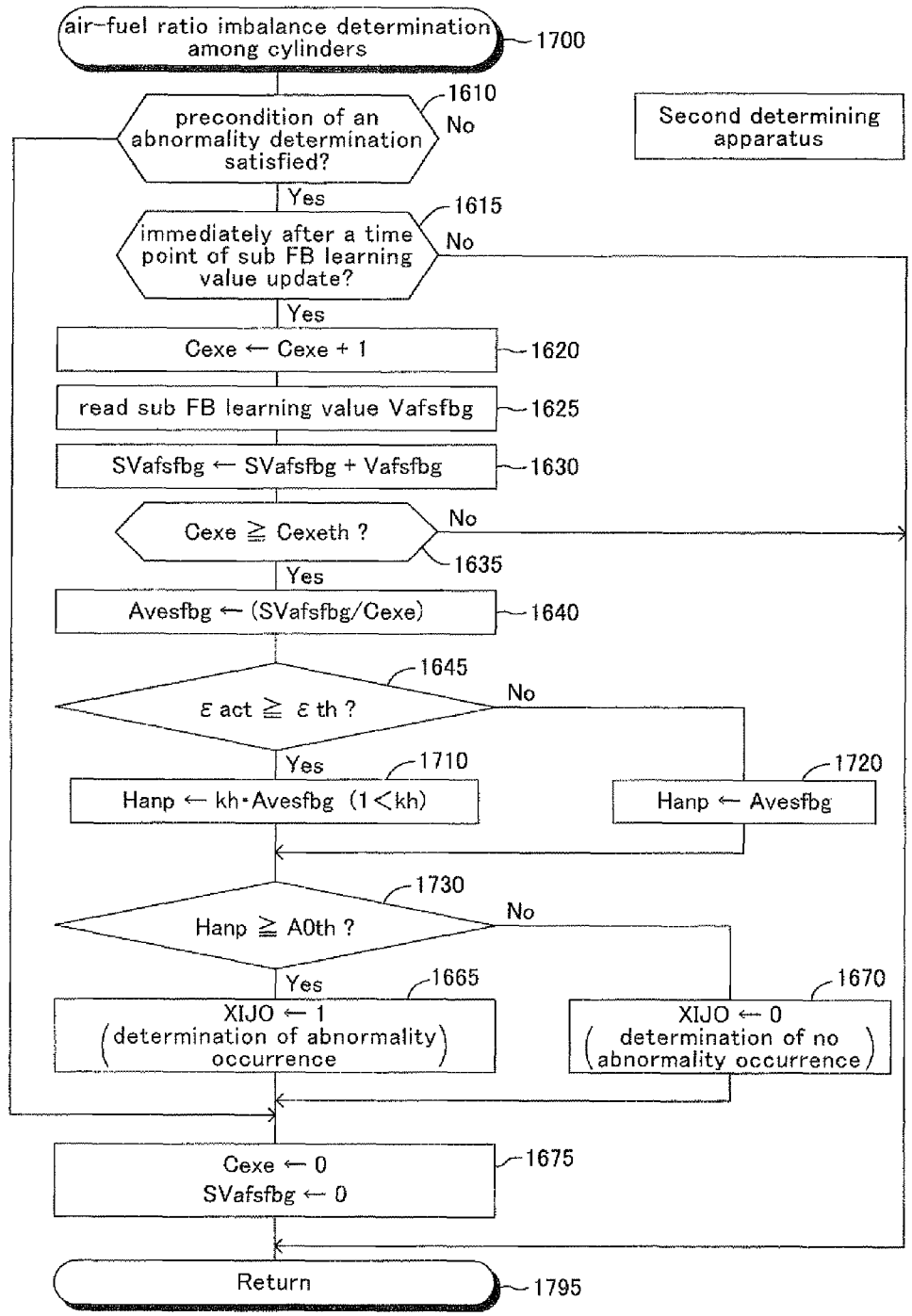
FIG. 17 is a flowchart shown a routine, executed by a CPU of an air-fuel ratio imbalance among cylinders determining apparatus according to a second embodiment of the present invention, for carrying out an air-fuel ratio imbalance determination among cylinders.

A CPU of the second determining apparatus executes the routines the CPU of the first determining apparatus executes except the "routine shown in FIG. 16", and further, the CPU of the second determining apparatus repeatedly executes a "routine for the determination of the air-fuel ratio imbalance among cylinders" shown by a flowchart in FIG. 17, every time a predetermined time period elapses. It should be noted that symbols given to the steps which were already described are given to steps, each for carrying out a process which is the same as one provided by the step already described. Descriptions on those steps will be properly omitted.

The routine shown in FIG. 17 is different from the routine shown in FIG. 16 only in that it has steps from step 1710 to step 1730. That is, the CPU of the second determining apparatus obtains the sub FB learning value average Avesfbg by the processes from step 1610 to step 1640. In the present example, the sub FB learning value average Avesfbg is a base value for (of) the imbalance determining parameter. Further, when the CPU determines that the actual mechanical compression ratio εact is equal to or larger than the mechanical compression ratio threshold εth at step 1645, it proceeds to step 1710 to obtain an imbalance determining parameter Hanp by correcting the sub FB learning value average Avesfbg.

Specifically, at step 1710, the CPU sets a value (kh·Avesfbg) obtained by multiplying the sub FB learning value average Avesfbg by a correction coefficient kh as the imbalance determining parameter Hanp. The correction coefficient kh is a value larger than "1" and a coefficient which is set/adapted beforehand in such a manner that the value (kh·Avesfbg) coincides with the standard threshold A0th when the imbalance rate coincides with the value IM1 shown in FIG. 10 while the actual mechanical compression ratio εact is set at (to) the "second mechanical compression ratio ε2 which is equal to or larger than the mechanical compression ratio threshold εth". Thereafter, the CPU proceeds to step 1730.

In contrast, when the CPU determines that the actual mechanical compression ratio εact is smaller than the mechanical compression ratio threshold εth, the CPU proceeds to step 1720 to adopt the sub FB learning value average Avesfbg (without correcting the sub FB learning value average Avesfbg) as the imbalance determining parameter Hanp. Thereafter, the CPU proceeds to step 1730.

At step 1730, the CPU determines whether or not the imbalance determining parameter Hanp, obtained at step 1710 above or at step 1720 above is equal to or larger than the "imbalance determination threshold A0th."

When the imbalance determining parameter Hanp is equal to or larger than the "imbalance determination threshold A0th", the CPU determines that the air-fuel ratio imbalance among cylinders is occurring, and it proceeds from step 1730 to step 1665, at which the CPU sets the value of the abnormality occurrence flag XIJO to (at) "1". Thereafter, the CPU proceeds to step 1675.

In contrast, when the imbalance determining parameter Hanp is smaller than the "imbalance determination threshold A0th", the CPU makes a "No" determination at step 1730 to proceed to step 1670. Then, the CPU sets the value of the abnormality occurrence flag XIJO to (at) "0" so as to indicate that the "air-fuel ratio imbalance among cylinders is not occurring." Thereafter, the CPU proceeds to step 1675.

As described above, similarly to the first determining apparatus, the second determining apparatus is applied to the multi-cylinder internal combustion engine having a plurality of the cylinders, and comprises: the means for varying a compression ratio; the catalyst; the fuel injectors; the upstream air-fuel ratio sensor; and imbalance determining means for obtaining the imbalance determining parameter which becomes larger as the degree of the imbalance among the individual cylinder air-fuel ratios becomes larger and for performing the determination as to whether or not the air-fuel ratio imbalance state among cylinders is occurring, based on the comparison result as to whether or not the obtained imbalance determining parameter is larger than or equal to the predetermined threshold (refer to steps 1730, 1665, and 1670 shown in FIG. 17).

Further, the imbalance determining means of the second determining apparatus is configured so as to vary the imbalance determining parameter in accordance with the compression ratio of the engine changed by the means for varying a compression ratio (refer to steps 1645, 1710, and 1720 shown in FIG. 17).

According to the above configuration, it is possible to determine that the "air-fuel ratio imbalance state among cylinders has occurred" at a time point before the amount of the unburnt substance flowing out from the catalyst 43 exceeds the constant permissible limit value, whatever the compression ratio of the engine 10 is.

Third Embodiment

An air-fuel ratio imbalance among cylinders determining apparatus (hereinafter, referred to as a "third determining apparatus") of a multi-cylinder internal combustion engine according to a third embodiment of the present invention will next be described. The third determining apparatus sends the instruction signal to the actuator 208 of the compression ratio varying mechanism in such a manner that the mechanical compression ratio of the engine 10 coincides with (becomes equal to) a "target mechanical compression ratio which is determined based on the load KL of the engine 10 and the engine rotational speed NE (i.e., the operating state of the engine 10)." That is, the mechanical compression ratio of the engine 10 is varied between a lower limit value and an upper limit value in a continuous fashion. Further, the third determining apparatus is different from the first determining apparatus only in that the third determining apparatus varies the imbalance determination threshold Ath based on the mechanical compression ratio in a continuous fashion. Accordingly, this difference will be mainly described.

Figure 18:
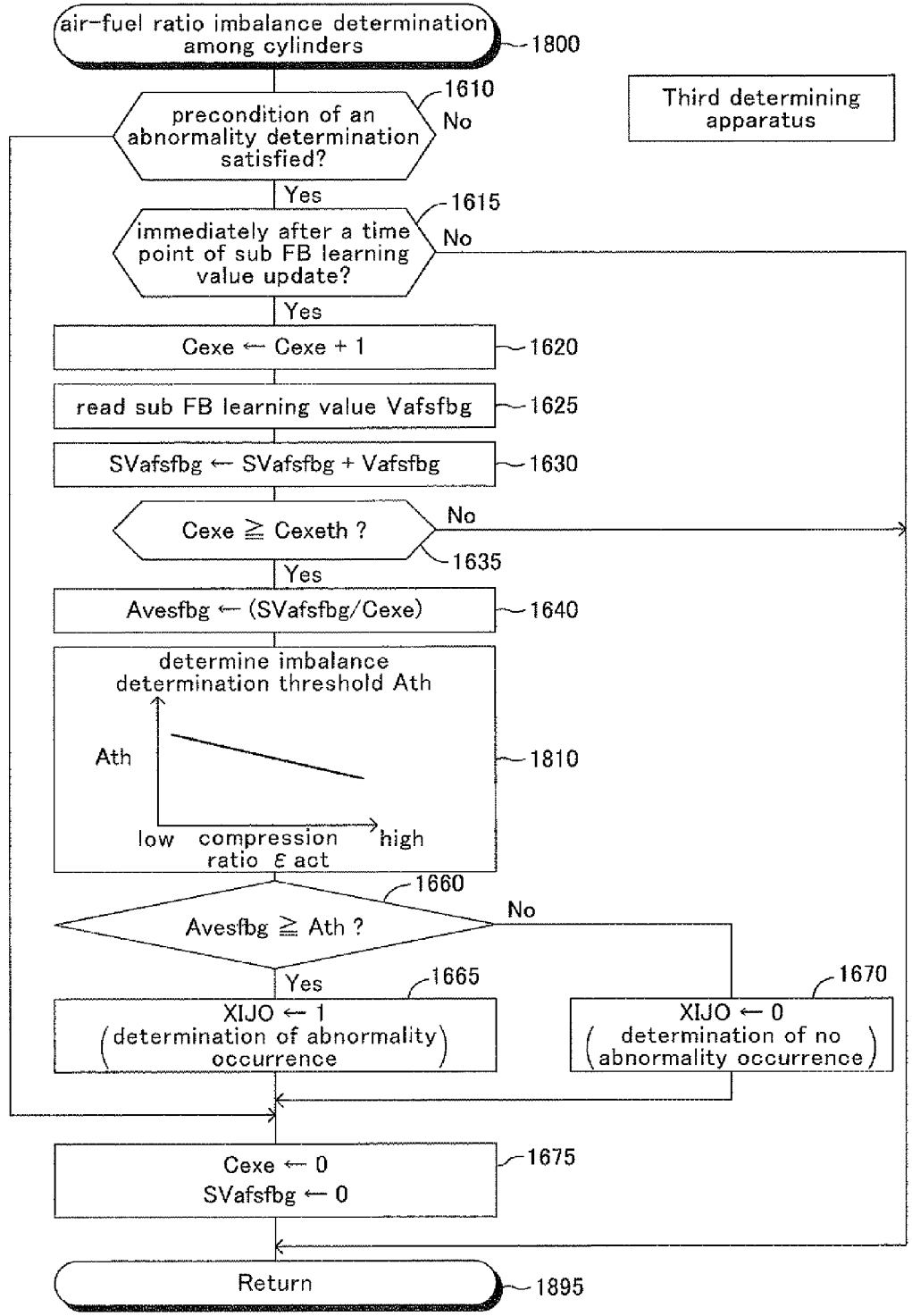
FIG. 18 is a flowchart shown a routine, executed by a CPU of an air-fuel ratio imbalance among cylinders determining apparatus according to a third embodiment of the present invention, for carrying out an air-fuel ratio imbalance determination among cylinders.

Specifically, a CPU of the third determining apparatus executes the routines the CPU of the first determining apparatus executes except the "routine shown in FIG. 16", and further, the CPU of the third determining apparatus repeatedly executes a "routine for the determination of the air-fuel ratio imbalance among cylinders" shown by a flowchart in FIG. 18, every time a predetermined time period elapses.

The routine shown in FIG. 18 is different from the routine shown in FIG. 16 only in that steps from step 1645 to step 1655 shown in FIG. 16 are replaced with step 1810. That is, the CPU of the third determining apparatus obtains the sub FB learning value average Avesfbg by the processes from step 1610 to step 1640.

Subsequently, the CPU proceeds to step 1810 to obtain the actual mechanical compression ratio ε act based on the distance ST detected by the stroke sensor 56, and determines the imbalance determination threshold Ath by applying the actual mechanical compression ratio εact to a table shown in a block of step 1810. According to the table, the imbalance determination threshold Ath is determined to become smaller as the actual mechanical compression ratio εact becomes higher. Thereafter, the CPU executes the processes after step 1660 to perform the imbalance determination.

As described before, the imbalance rate which causes the emission to reach the permissible level value becomes smaller as the mechanical compression ratio becomes higher. Accordingly, the third determining apparatus decreases the imbalance determination threshold Ath as the mechanical compression ratio becomes higher. Therefore, it is possible to determine that the air-fuel ratio imbalance state among cylinders has occurred at a time point when the "degree of the non-uniformity (imbalance) of the individual cylinder air-fuel ratios" is smaller, as the mechanical compression ratio becomes higher. Consequently, whatever the mechanical compression ratio is, it is possible to determine that the "air-fuel ratio imbalance state among cylinders has occurred" at a time point when an amount of the unburnt substances flowing out from the catalyst 43 does not exceed the constant permissible level value.

Fourth Embodiment

An air-fuel ratio imbalance among cylinders determining apparatus (hereinafter, referred to as a "fourth determining apparatus") of a multi-cylinder internal combustion engine according to a fourth embodiment of the present invention will next be described. The fourth determining apparatus, similarly to the third determining apparatus, sends the instruction signal to the actuator 208 of the compression ratio varying mechanism in such a manner that the mechanical compression ratio of the engine 10 coincides with (becomes equal to) the "target mechanical compression ratio which is determined based on the load KL of the engine 10 and the engine rotational speed NE (i.e., the operating state of the engine 10)." That is, the mechanical compression ratio of the engine 10 is varied between the lower limit value and the upper limit value in a continuous fashion. Further, the fourth determining apparatus corrects the imbalance determining parameter based on the mechanical compression ratio (precisely) in a continuous fashion (i.e., it determines the imbalance determining parameter further based on the mechanical compression ratio), instead of varying the imbalance determination threshold Ath based on the mechanical compression ratio. This difference will be mainly described.

Figure 19:
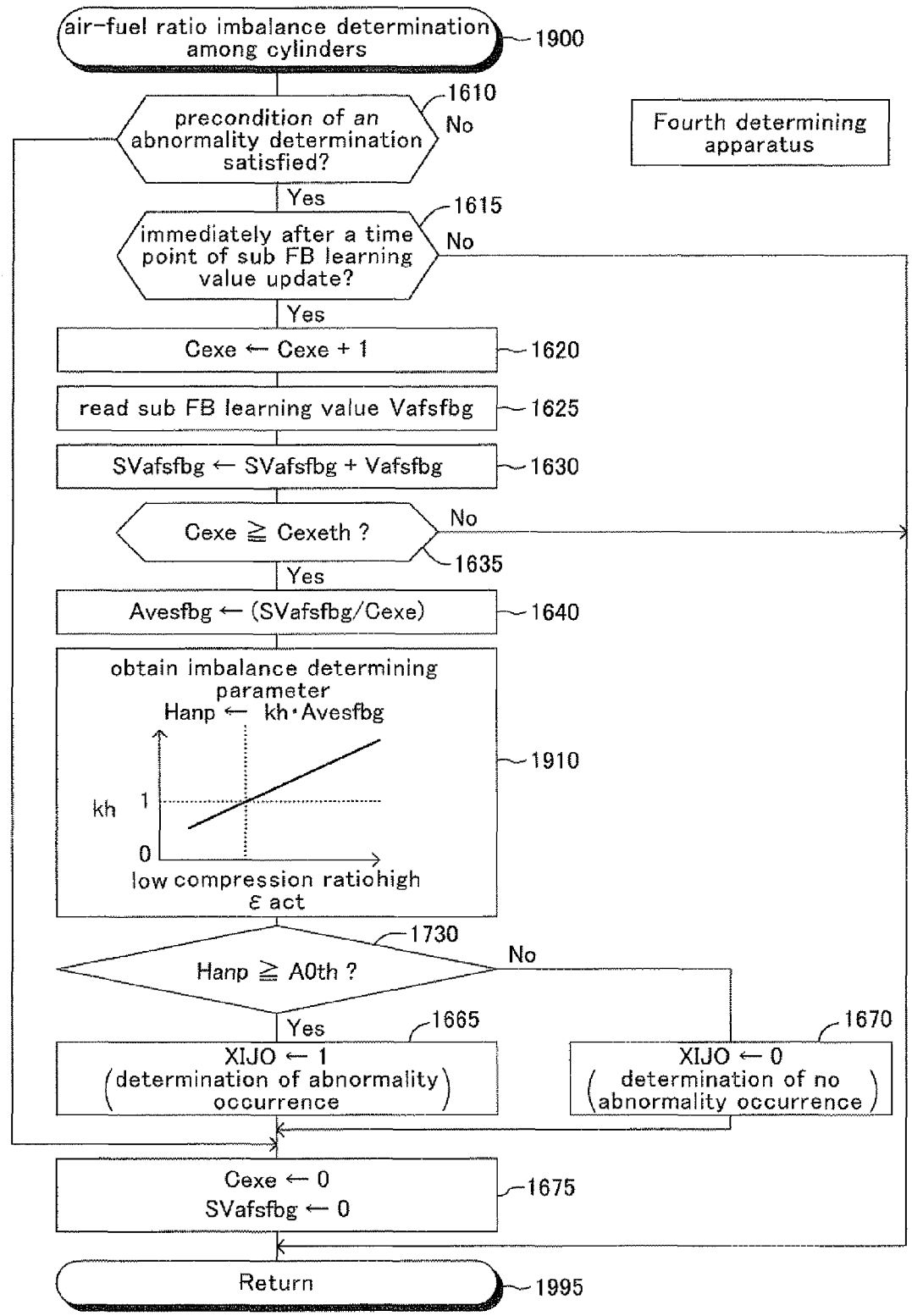
FIG. 19 is a flowchart shown a routine, executed by a CPU of an air-fuel ratio imbalance among cylinders determining apparatus according to a fourth embodiment of the present invention, for carrying out an air-fuel ratio imbalance determination among cylinders.

Specifically, a CPU of the fourth determining apparatus executes the routines the CPU of the first determining apparatus executes except the "routine shown in FIG. 16", and further, the CPU of the fourth determining apparatus repeatedly executes a "routine for the determination of the air-fuel ratio imbalance among cylinders" shown by a flowchart in FIG. 19 every time a predetermined time period elapses.

The routine shown in FIG. 19 is different from the routine shown in FIG. 16 only in that steps from step 1645 to 1660 shown in FIG. 16 are replaced with step 1910 and step 1730. That is, the CPU of the fourth determining apparatus obtains the sub FB learning value average Avesfbg (base value for (of) the imbalance determining parameter) by the processes from step 1610 to step 1640.

Subsequently, the CPU proceeds to step 1910 to obtain the actual mechanical compression ratio εact based on the distance ST detected by the stroke sensor 56, and determines a correction coefficient kh by applying the actual mechanical compression ratio εact to a table shown in a block of step 1910. According to the table, the correction coefficient kh is determined to become larger as the actual mechanical compression ratio εact becomes higher. Thereafter, at step 1910, the CPU sets a value (kh. Avesfbg) obtained by multiplying the sub FB learning value average Avesfbg by a correction coefficient kh as the imbalance determining parameter Hanp. Subsequently, the CPU proceeds to steps after step 1730 so as to perform the imbalance determination based on a comparison between the imbalance determining parameter Hanp obtained at step 1910 and the standard threshold A0th.

As described above, the fourth determining apparatus obtains the final imbalance determining parameter Hanp by correcting the sub FB learning value Avesfbg in such a manner that the sub FB learning value Avesfbg obtained as the base value for the imbalance determining parameter is corrected to become larger as the mechanical compression ratio becomes higher, and performs the imbalance determination based on the comparison result between the final imbalance determining parameter Hanp and the constant standard threshold A0th. Consequently, whatever the mechanical compression ratio is, it is possible to determine that the "air-fuel ratio imbalance state among cylinders has occurred" at a time point when an amount of the unburnt substances flowing out from the catalyst 43 does not exceed the constant permissible level value.

Modified Embodiment

A modified air-fuel ratio imbalance among cylinders determining apparatus (hereinafter, referred to as a "modified apparatus") of a multi-cylinder internal combustion engine of the present invention will next be described. The modified apparatus is an air-fuel ratio control apparatus, and is characterized in that it switches the air-fuel ratio conversion table based on the mechanical compression ratio.

As described before, an amount of generated hydrogen increases as the mechanical compression ratio becomes higher. Accordingly, the detected air-fuel ratio abyfs, obtained using the output value Vabyfs of the upstream air-fuel ratio sensor having the diffusion resistance layer and the air-fuel ratio conversion table Mapabyfs which is made under a certain mechanical compression ratio, becomes a value corresponding to an air-fuel ratio which becomes richer with respect to the true air-fuel ratio as the mechanical compression ratio becomes higher.

Figure 20:
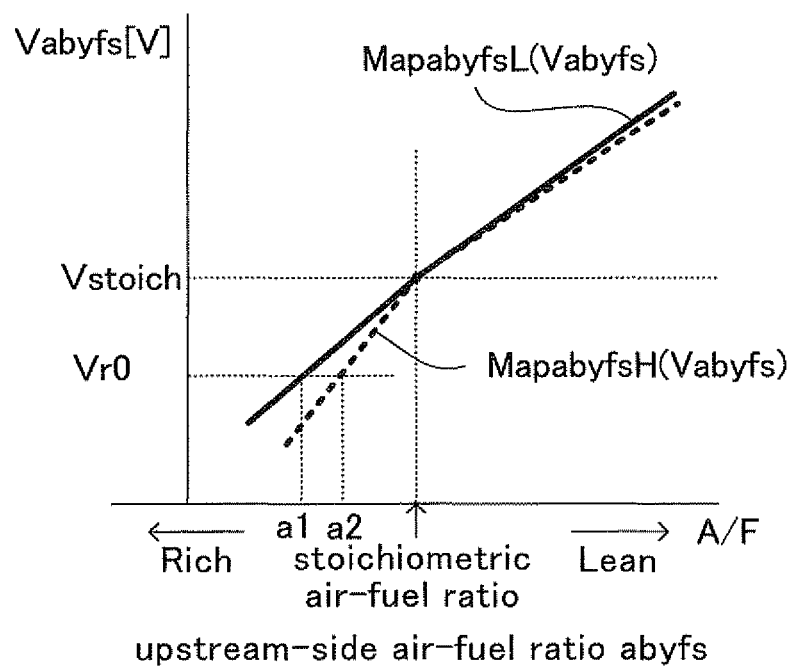
FIG. 20 shows an air-fuel ratio conversion table to which a CPU of a modified air-fuel ratio imbalance among cylinders determining apparatus of the present invention refers.

In view of the above, the modified apparatus performs the air-fuel ratio feedback control (especially, the main feedback control) using an "air-fuel ratio conversion table MapabyfsL (first air-fuel ratio conversion table) for a lower compression ratio" shown by a solid line in FIG. 20, when the mechanical compression ratio is lower than the mechanical compression ratio threshold εth (i.e., when the mechanical compression ratio is equal to a first mechanical compression ratio ε1 which is lower than the mechanical compression ratio threshold εth). Further, the modified apparatus performs the air-fuel ratio feedback control (especially, the main feedback control) using an "air-fuel ratio conversion table MapabyfsH (second air-fuel ratio conversion table) for a higher compression ratio" shown by a broken line in FIG. 20, when the mechanical compression ratio is higher than the mechanical compression ratio threshold εth (i.e., when the mechanical compression ratio is equal to a second mechanical compression ratio ε2 which is higher than the mechanical compression ratio threshold εth).

Figure 21:
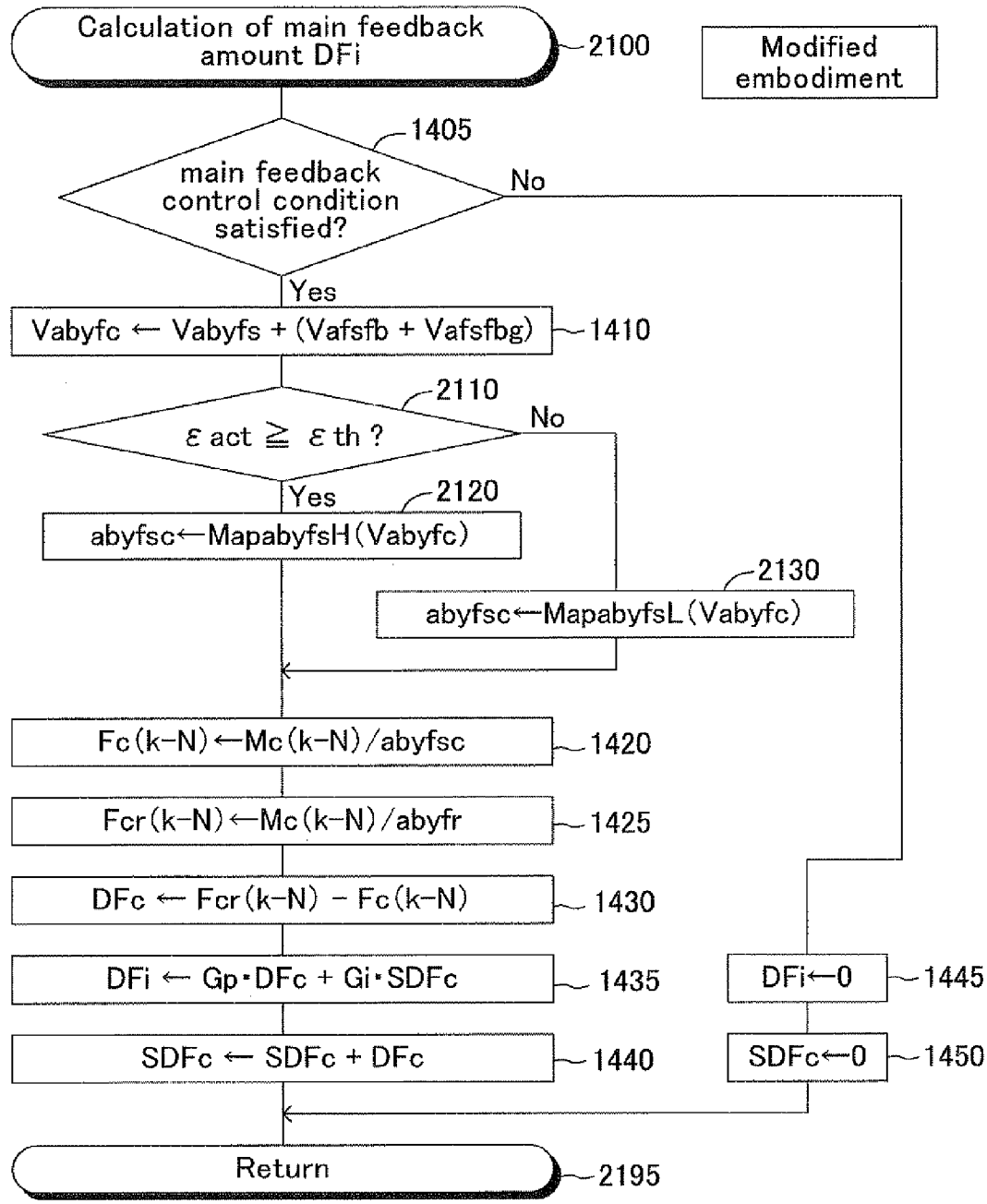
FIG. 21 is a flowchart shown a routine, executed by the CPU of the modified air-fuel ratio imbalance among cylinders determining apparatus of the present invention, for carrying out an air-fuel ratio imbalance determination among cylinders.

Specifically, a CPU of the modified apparatus executes the routines the CPU of the first determining apparatus executes except the "routine shown in FIG. 14", and further, the CPU of the modified apparatus repeatedly executes a "routine for the calculation of the main feedback amount" shown by a flowchart in FIG. 21 which replaces FIG. 14, every time a predetermined time period elapses.

The routine shown in FIG. 21 is different from the routine shown in FIG. 14 only in that step 1415 shown in FIG. 14 is replaced with steps from step 2110 to step 2130.

That is, the CPU of the modified apparatus obtains the output value Vabyfc for a feedback control according to the formula (2) described above, and proceed to step 2110, at which the CPU determines whether or not the actual mechanical compression ratio εact is equal to or larger than the mechanical compression ratio threshold εth. The CPU of the modified apparatus, similarly to the CPU of the first determining apparatus, sends the instruction signal to the actuator 208 of the compression ratio varying mechanism in such a manner that the mechanical compression ratio of the engine 10 is set to (at) the first mechanical compression ratio ε1 when the load KL of the engine 10 is equal to or larger than the predetermined value, and sends the instruction signal to the actuator 208 of the compression ratio varying mechanism in such a manner that the mechanical compression ratio of the engine 10 is set to (at) the second mechanical compression ratio ε2 when the load KL of the engine 10 is smaller than the predetermined value.

The CPU proceeds to step 2120 described below when the actual mechanical compression ratio εact is equal to or larger than the mechanical compression ratio threshold εth (i.e., the actual mechanical compression ratio εact is equal to the second mechanical compression ratio ε2). The CPU proceeds to step 2130 described below when the actual mechanical compression ratio εact is smaller than the mechanical compression ratio threshold εth (i.e., the actual mechanical compression ratio ε act is equal to the first mechanical compression ratio ε1).

Step 2120: The CPU obtains the air-fuel ratio abyfsc for a feedback control by applying the output value Vabyfc for a feedback control obtained at step 1410 to the "air-fuel ratio conversion table MapabyfsH for a higher compression ratio" shown by the broken line in FIG. 20.

Step 2130: The CPU obtains the air-fuel ratio abyfsc for a feedback control by applying the output value Vabyfc for a feedback control obtained at step 1410 to the "air-fuel ratio conversion table MapabyfsL for a lower compression ratio" shown by the solid line in FIG. 20. Thereafter, the CPU executes the processes from step 1420 to step 1440 to calculate the main feedback amount DFi.

Therefore, according to the modified apparatus, it is possible to reduce a "difference between the air-fuel ratio represented by the output value of the upstream air-fuel ratio sensor and the air-fuel ratio (i.e., average of the air-fuel ratio of the mixture supplied to the entire engine) of the gas which has actually reached the position at which the upstream air-fuel ratio sensor is disposed", caused by a change in the mechanical compression ratio. In practice, the modified apparatus can accurately obtain an air-fuel ratio which is supposed to be represented by the output value Vabyfc for a feedback control. Consequently, the emission can be further improved, regardless of whether or not the air-fuel ratio imbalance state among cylinders is occurring.

As described above, the air-fuel ratio imbalance among cylinders determining apparatus according to each of the embodiments of the present invention can determine that the air-fuel ratio imbalance state among cylinders has occurred at an appropriate time point when the emission has not yet worsened, even when the compression ratio is changed.

The present invention is not limited to the embodiments described above, but various modifications may be adopted without departing from the scope of the invention. For example, the imbalance determining parameter is the sub FB learning value average Avesfbg in each of the embodiments, however, "the sub FB learning value Vafsfbg itself, or an average of the sub feedback amount Vafsfb" may be obtained as the imbalance determining parameter. Further, the imbalance determining parameter may be one of parameters described below.

(P1) The imbalance determining parameter may be a trajectory length of the output value Vabyfs of the upstream air-fuel ratio sensor 57 or a trajectory length of the detected air-fuel ratio abyfs. For example, the trajectory length of the detected air-fuel ratio abyfs may be obtained by obtaining the output value Vabyfs every time the constant sampling time period is elapses, converting the output value Vabyfs into the detected air-fuel ratio abyfs, and integrating an absolute value of a difference between the detected air-fuel ratio abyfs and the detected air-fuel ratio abyfs obtained the sampling time period is prior to the present time. The integrated value may preferably be set (reset) to "0" every time a unit combustion cycle elapses. The "unit combustion cycle period" is a period in which any one of a plurality of the cylinders (all cylinders, in the present example) discharging the exhaust gases which reach the upstream air-fuel ratio sensor 57 requires a time to complete "one combustion cycle including an intake stroke, a compression stroke, an expansion stroke, and an exhaust stroke". Since the engine 10 is a four-cylinder and four-cycle engine, the unit combustion cycle period is a time period in which the "crank angle of the engine 10 increases by 720° crank angle."

Figure 22:
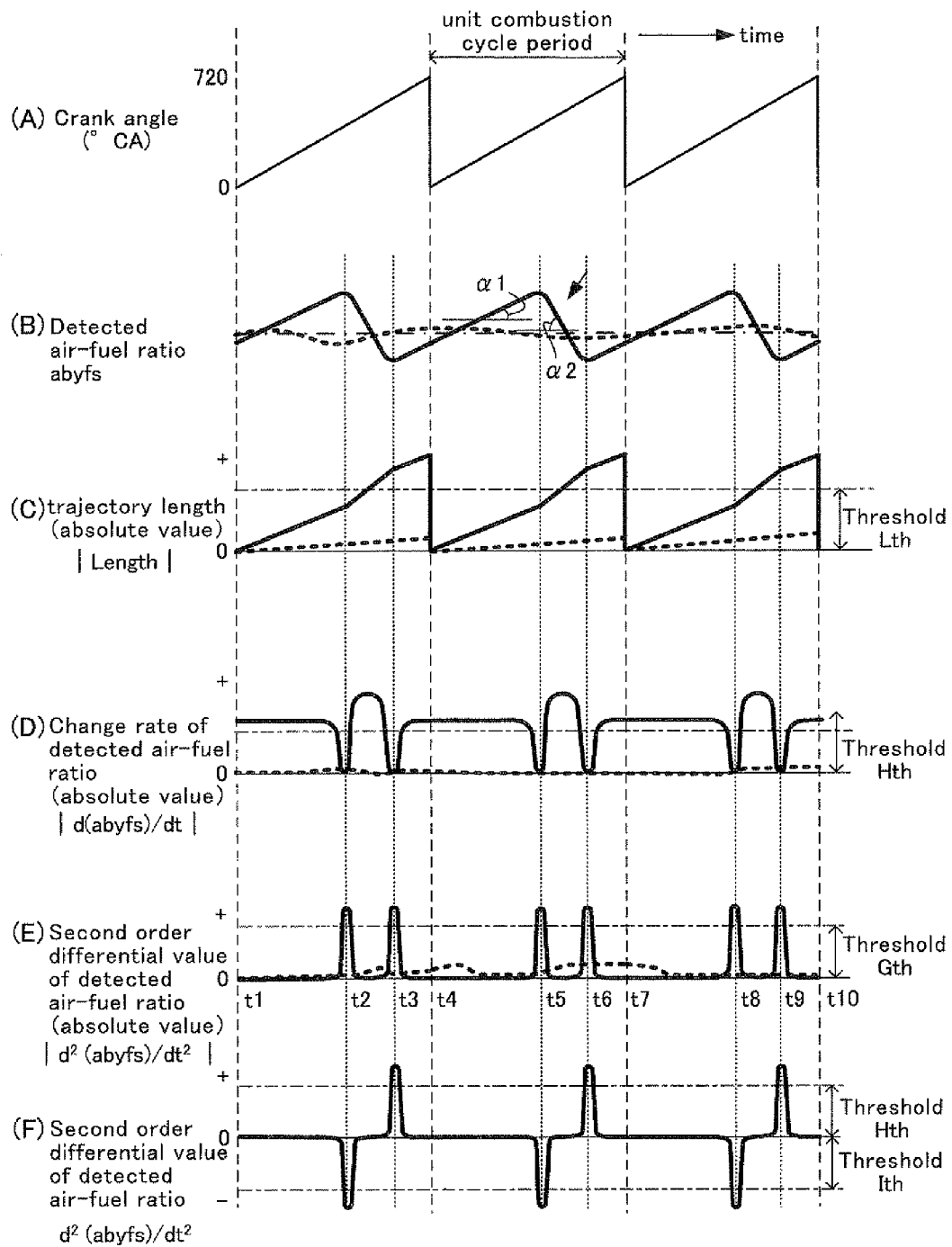
FIG. 22 is a time chart showing various parameters.

As shown by a broken line in (B) of FIG. 22, when the air-fuel ratio imbalance state among cylinders is not occurring, the detected air-fuel ratio abyfs based on the output value Vabyfs of the upstream air-fuel ratio sensor 57 hardly varies. In contrast, as shown by a solid line in (B) of FIG. 22, when the air-fuel ratio imbalance state among cylinders is occurring, the detected air-fuel ratio abyfs greatly varies every time the exhaust gas from the "abnormal cylinder whose individual air-fuel ratio deviates from the stoichiometric air-fuel ratio to the rich side or the lean side" reaches the upstream air-fuel ratio sensor 57. Further, the detected air-fuel ratio abyfs fluctuates more greatly as the degree of the imbalance among individual cylinder air-fuel ratios is greater.

Accordingly, the trajectory length of the output value Vabyfs of the upstream air-fuel ratio sensor 57 or the trajectory length of the detected air-fuel ratio abyfs increases when the air-fuel ratio imbalance state among cylinders has occurred, and becomes equal to or larger than a threshold Lth. The determining apparatus of the present invention may vary the threshold Lth based on (in accordance with) the compression ratio. Specifically, the determining apparatus decreases the threshold Lth as the mechanical compression ratio εact becomes larger. It should be noted that the trajectory length of the output value Vabyfs or the trajectory length of the detected air-fuel ratio abyfs increases as the engine rotational speed NE become higher, and therefore, the determining apparatus may preferably increase the threshold Lth as the engine rotational speed NE become higher.

(P2) The imbalance determining parameter may be an absolute value of a value corresponding to a temporal change rate of the output value Vabyfs of the upstream air-fuel ratio sensor 57 (i.e., a differential value dVabyfs/dt of the output value Vabyfs of the upstream air-fuel ratio sensor with respect to time, or a differential value dabyfs/dt of the detected air-fuel ratio abyfs (=Mapabyfs(Vabyfs)) represented by the output value Vabyfs of the upstream air-fuel ratio sensor 57 with respect to time) (refer to magnitude of inclinations α1, α2 shown in (B) of FIG. 22). The value corresponding to the temporal change rate of the output value Vabyfs of the upstream air-fuel ratio sensor 57 may be said to be a change amount of the air-fuel ratio (detected air-fuel ratio abyfs)

represented by the output value Vabyfs of the upstream air-fuel ratio sensor 57 per unit time.

For example, the change rate of the detected air-fuel ratio abyfs can be obtained by obtaining the output value Vabyfs every time the constant sampling time period ts elapses, converting the output value Vabyfs into the detected air-fuel ratio abyfs, and subtracting the detected air-fuel ratio abyfs obtained the sampling time period ts prior to the present time from the currently detected air-fuel ratio abyfs. In this case, a maximum value may be selected from a plurality of "absolute values of the change rate of the detected air-fuel ratio abyfs" obtained in the unit combustion cycle, and the maximum value may be adopted as the imbalance determining parameter.

In fact, as shown by a solid line in (D) of FIG. 22, the absolute value of the value corresponding to the change rate of the output value Vabyfs of the upstream air-fuel ratio sensor 57 becomes larger when the air-fuel ratio imbalance state among cylinders has occurred, and exceeds a threshold Hth. Further, the absolute value of the value corresponding to the change rate of the output value Vabyfs of the upstream air-fuel ratio sensor 57 becomes larger as the degree of the imbalance among individual cylinder air-fuel ratios becomes larger.

In contrast, as shown by a broken line in (D) of FIG. 22, the absolute value of the value corresponding to the change rate of the output value Vabyfs of the upstream air-fuel ratio sensor 57 does not exceed the threshold Hth, when the air-fuel ratio imbalance state among cylinders has not occurred. Therefore, the absolute value of the value corresponding to the change rate of the output value Vabyfs of the upstream air-fuel ratio sensor 57 is a parameter which can be used as the imbalance determining parameter. Further, the determining apparatus according to the present invention varies the threshold Hth in accordance with the compression ratio. Specifically, the determining apparatus decreases the threshold Hth as the mechanical compression ratio εact becomes higher.

It should be noted that the absolute value of the value corresponding to the change rate of the output value Vabyfs of the upstream air-fuel ratio sensor 57 varies depending on the intake air flow rate Ga, but does not vary depending on the engine rotational speed NE. This reason is as follows. As described before, the upstream air-fuel ratio sensor 57 is disposed in such a manner that the center line Cg of the outer protective cover 57*b* is orthogonal to the direction of the flow of the exhaust gas and the bottom surface of the outer protective cover 57*b* is parallel to the direction of the flow of the exhaust gas. Accordingly, as shown in FIGS. 3 and 4, the exhaust gas EX in the exhaust passage which has reached the inflow holes 57*b*1 of the outer protective cover 57*b* is sucked into the inside of the outer protective cover 57*b* and the inside of the inner protective cover 57*c* owing to a flow of the exhaust gas passing through the exhaust passage in the vicinity of the outflow hole 57*b*2 of the outer protective cover 57*b*.

Accordingly, a flow rate of the exhaust gas inside of the outer protective cover 57*b* and the inner protective cover 57*c* varies depending on a flow rate of the exhaust gas EX flowing in the vicinity of the outflow hole 57*b*2 of the outer protective cover 57*b* (and therefore, depending on the intake air flow rate Ga which is the intake air amount per unit time). In other words, a time period from a "time point at which an exhaust gas (a first exhaust gas) having a certain air-fuel ratio reaches the inflow hole 57*b*1" to a "time point at which the first exhaust gas reaches the air-fuel ratio detecting element 57*a*" varies depending on the intake air flow rate Ga, but does not vary depending on the engine rotational speed NE. This is also true when the upstream air fuel ratio sensor 57 comprises the inner protective cover only.

Consequently, after the exhaust gas having an air-fuel ratio greatly deviating from the stoichiometric air-fuel ratio to the rich side begins to reach the inflow holes 57*b*1, the exhaust gas reaches the air-fuel ratio detecting element 57*a* with a short delay. At this time, as described above, the flow rate of the exhaust gas flowing inside of the outer protective cover 57*b* and the inner protective cover 57*c* is determined by the flow rate of the exhaust gas flowing in the exhaust passage.

Further, the air-fuel ratio of the exhaust gas contacting with the air-fuel ratio detecting element 57*a* is the air-fuel ratio of the exhaust gas formed by mixing the "exhaust gas which has newly reached the air-fuel ratio detecting element 57*a*" and the "exhaust gas which has been residing in the vicinity of the air-fuel ratio detecting element 57*a*." Therefore, the change rate of the air-fuel ratio of the exhaust gas contacting with (reaching) the air-fuel ratio detecting element 57*a* (the change rate which is the temporal differential value of the air-fuel ratio, and accordingly, the differential value of the detected air-fuel ratio abyfs with respect to time, the detected air-fuel ratio change rate, inclination of change in the detected air-fuel ratio) becomes larger as the "intake air flow rate Ga which is substantially proportion to the flow rate of the exhaust gas EX" becomes larger. That is, the air-fuel ratio of the exhaust gas contacting with (reaching) the air-fuel ratio detecting element 57*a* rapidly decreases as the intake air flow rate Ga increases.

Thereafter, when the exhaust gas having an air-fuel ratio which does not greatly deviate from the stoichiometric air-fuel ratio begins to reach the inflow holes 57*b*1, the exhaust gas reaches the air-fuel ratio detecting element 57*a* with a short delay. In this case as well, as described above, the flow rate of the exhaust gas flowing inside of the outer protective cover 57*b* and the inner protective cover 57*c* is determined by the flow rate of the exhaust gas flowing in the exhaust passage. Therefore, the air-fuel ratio of the exhaust gas contacting with (reaching) the air-fuel ratio detecting element 57*a* more rapidly increases as the intake air flow rate Ga increases. Accordingly, the change rate of the detected air-fuel ratio abyfs has a tendency that it increases as the intake air flow rate Ga increases.

Meanwhile, a time interval between time points, the time point being when the exhaust gas greatly deviating from the stoichiometric air-fuel ratio to the rich side begins to reach the inflow hole 57*b*1 (i.e., air-fuel ratio fluctuation period) becomes shorter as the engine rotational speed is higher. However, the flow rate of the exhaust gas flowing inside of the outer protective cover 57*b* and the inner protective cover 57*c* varies depending on the flow rate of the exhaust gas EX flowing in the exhaust passage, but is not affected by the engine rotational speed NE. Therefore, even when the engine rotational speed NE varies, the change rate of the detected air-fuel ratio abyfs does not change as long as the intake air flow rate Ga does not vary. In view of the above, it is preferable that the determining apparatus increase the threshold Hth as the intake air flow rate Ga becomes larger.

(P3) The imbalance determining parameter may be an absolute value of a value corresponding to a change rate (temporal change rate) of a change rate (temporal change rate) of the output value of the upstream air-fuel ratio sensor 57 (i.e., an absolute value of a second order differential value $d^2(\text{Vabyfs})/dt$ with respect to time of the output value Vabyfs of the upstream air-fuel ratio sensor 57, or an absolute value of a second order differential value $d^2(\text{abyfs})/dt$ with respect to time of the detected air-fuel ratio abyfs represented by the output value Vabyfs of the upstream air-fuel ratio sensor 57). The value corresponding to the change rate of the change rate of the output value Vabyfs of the upstream air-fuel ratio sensor 57 can be said to be a change amount of a change amount per unit time of the air-fuel ratio (detected air-fuel ratio abyfs) represented by the output value Vabyfs of the upstream air-fuel ratio sensor 57.

For example, the change rate of the change rate of the detected air-fuel ratio abyfs can be obtained as follows.

The output value Vabyfs is obtained every time the constant sampling time period ts elapses.

The output value Vabyfs is converted into the detected air-fuel ratio abyfs.

A difference between the detected air-fuel ratio abyfs and the previously detected air-fuel ratio abyfs obtained the constant sampling time period ts before is obtained as a change rate of the detected air-fuel ratio abyfs.

A difference between the change rate of the detected air-fuel ratio abyfs and the previous change rate of the detected air-fuel ratio abyfs obtained the constant sampling time period ts before is obtained as the change rate of the change rate of the detected air-fuel ratio abyfs.

In this case, among a "plurality of the change rates of the change rate of the detected air-fuel ratio abyfs" obtained in the unit combustion cycle period, a "value whose absolute value is the largest" is selected, and the selected largest value may be adopted as the imbalance determining parameter.

As described above, while the air-fuel ratio imbalance state among cylinders is occurring, the output value Vabyfs of the upstream air-fuel ratio sensor 57 rapidly changes when the exhaust gas reaching the upstream air-fuel ratio sensor 57 changes "from the exhaust gas from the normal cylinder to the exhaust gas from the abnormal cylinder, and from the exhaust gas from the abnormal cylinder to the exhaust gas from the normal cylinder." Accordingly, as shown by a solid line in (E) of FIG. 22, the absolute value of the change rate of the change rate of the detected air-fuel ratio abyfs represented by the output value Vabyfs of the upstream air-fuel ratio sensor 57 (i.e., the absolute value of the second order differential value of the output value Vabyfs, or the absolute value of the second order differential value of the detected air-fuel ratio abyfs) becomes larger when the air-fuel ratio imbalance state among cylinders has occurred and exceeds a threshold Gth. Further, the absolute value of the change rate of the change rate of the detected air-fuel ratio abyfs becomes larger as the degree of the imbalance among individual cylinder air-fuel ratios becomes greater.

In contrast, as shown by a broken line in (E) of FIG. 22, the absolute value of the change rate of the change rate of the detected air-fuel ratio abyfs does not exceed the threshold Gth, when the air-fuel ratio imbalance state among cylinders has not occurred. Therefore, the absolute value of the value corresponding to the change rate of the change rate of the detected air-fuel ratio abyfs is a parameter which can be used as the imbalance determining parameter. Further, the determining apparatus according to the present invention varies the threshold Gth in accordance with the compression ratio. Specifically, the determining apparatus decreases the threshold Gth as the mechanical compression ratio εact becomes higher.

(P4) The imbalance determining parameter may be a magnitude of a difference among individual cylinder air-fuel ratios, each estimated by analyzing the output value Vafbyfs of the upstream air-fuel ratio sensor 57 using the engine rotational speed NE, the crank angle of the engine, the intake air-flow rate Ga, and so on" (for example, the imbalance determining parameter may be an absolute value of a difference between a maximum value and the minimum value of the individual cylinder air-fuel ratios).

The sub feedback control by the determining apparatus described above is a control in which the air-fuel ratio abyfs obtained based on the output value Vabyfs of the upstream air-fuel ratio sensor 57 is substantially corrected in such a manner that the output value Voxs of the downstream air-fuel ratio sensor 58 coincides with the target downstream value Voxsref (refer to the formula (2) above). In contrast, the sub feedback control may be a control in which an air-fuel ratio correction coefficient calculated based on the output value of the upstream air-fuel ratio sensor 57 is adjusted based on a "sub feedback amount obtained by integrating the output value Voxs of the downstream air-fuel ratio sensor 58", as disclosed in Japanese Patent Application Laid-Open No. Hei 6-010738.

Furthermore, the determining apparatus may be as follows, as disclosed in Japanese Patent Application Laid-Open No. 2007-77869, Japanese Patent Application Laid-Open No. 2007-146661, and Japanese Patent Application Laid-Open No. 2007-162565. The apparatus calculates a main feedback amount KFmain by high-pass filtering a difference between the upstream-side air-fuel ratio abyfs obtained based on the output value Vabyfs of the upstream air-fuel ratio sensor 57 and the target upstream-side air-fuel ratio abyfr. The apparatus obtains a sub feedback amount Fisub by performing a proportional-integral process on a value obtained by low-pass filtering an error between the output value Voxs of the downstream air-fuel ratio sensor 58 and the target downstream value Voxsref. In this case, as described in a formula (14) below, the final fuel injection amount Fi may be obtained by correcting the base fuel injection amount Fbase using these feedback amounts in a mode in which these feedback amounts are obtained and used independently from each other.

$$Fi = KF\text{main} \cdot F\text{base} + Fi\text{sub} \quad (14)$$

Moreover, the determining apparatus may update the sub FB learning value Vafsfbg according to a formula (15) described below. In this case, as is clear from the formula (15), the sub FB learning value Vafsfbg is a value obtained by performing a "filtering process to eliminate noises" on the "sub feedback amount Vafsfb". In other words, the sub FB learning value Vafsfbg may be a first order lag amount (blurred value) of the sub feedback amount Vafsfb. In the formula (15), the value p is a constant larger than 0 and smaller than 1.

$$Vafsfbg\text{new} = (1-P) \cdot Vafsfbg + p \cdot Vafsfb \quad (15)$$

The present determining apparatus may be applied to a V-type engine. In this case, the V-type engine may comprise a right bank upstream-side catalyst disposed downstream of an exhaust gas aggregated portion of two or more of cylinders belonging to a right bank (i.e., a catalyst disposed in an exhaust passage of the engine at a position downstream of an exhaust gas aggregated portion into which exhaust gases discharged from at least two or more of cylinders of a plurality of cylinders aggregate), and a left bank upstream-side catalyst disposed downstream of an exhaust gas aggregated portion of two or more of cylinders belonging to a left bank (i.e., a catalyst disposed in an exhaust passage of the engine at a position downstream of an exhaust gas aggregated portion into which exhaust gases discharged from at least two or more of cylinders other than the at least two or more of cylinders among a plurality of the cylinders aggregate). Further, the V-type engine may comprise an upstream air-fuel ratio sensor for the right bank and a downstream air-fuel ratio sensor for the right bank disposed upstream and downstream of the right bank upstream side catalyst, respectively, and may comprise an upstream air-fuel ratio sensor for the left bank and a downstream air-fuel ratio sensor for the left bank disposed upstream and downstream of the left bank upstream side catalyst, respectively. In this case, a main feedback control for the right bank and a sub feedback for the right bank are performed, and a main feedback control for the left bank and a sub feedback for the left bank are independently performed.

In addition, in the embodiments described above, each of the thresholds (threshold which is compared with the imbalance determining parameter) for performing the determination as to whether or not the air-fuel ratio imbalance state among cylinders is occurring is changed based on the mechanical compression ratio. In contrast, when the determining apparatus is configured so as to vary a substantial compression ratio of the engine 10 (vary the closing timing of the intake valve 22a) based on the load KL of the engine, the engine rotational speed NE, and so on, the determining apparatus may be configured so as to change the threshold based on the substantial compression ratio.

The invention claimed is:

1. An air-fuel ratio imbalance among cylinders determining apparatus of an internal combustion engine, applied to a multi-cylinder internal combustion engine having a plurality of cylinders, comprising:
compression ratio varying means for varying a compression ratio of said engine in accordance with an operating state of said engine;
a catalyst disposed, in an exhaust passage of said engine, and at an exhaust gas aggregated portion into which exhaust gases discharged from combustion chambers of at least two or more of cylinders of a plurality of said cylinders merge or at a portion downstream of said exhaust gas aggregated portion;
fuel injectors, each being disposed so as to correspond to each of said at least two or more of cylinders and so as to inject a fuel to be contained in a mixture supplied to each of said combustion chambers of said at least two or more of cylinders;
an upstream air-fuel ratio sensor, which is disposed at said exhaust gas aggregated portion or at a position between said exhaust gas aggregated portion and said catalyst in said exhaust passage, which includes a diffusion resistance layer with which an exhaust gas which has not passed through said catalyst contacts, and an air-fuel ratio detecting element, which is covered by said diffusion resistance layer, and which outputs, as an output value of said upstream air-fuel ratio sensor, a signal in accordance with an air-fuel ratio of an exhaust gas reaching said air-fuel ratio detecting element after passing through said diffusion resistance layer;
imbalance determining means for obtaining an imbalance determining parameter with using at least said output value of said upstream air-fuel ratio sensor, said imbalance determining parameter being larger as a degree of an imbalance among individual cylinder air-fuel ratios being larger, each of said individual cylinder air-fuel ratios being an air-fuel ratio of a mixture supplied to each of said at least two or more of cylinders, and for performing a determination as to whether or not an air-fuel ratio imbalance state among cylinders is occurring, based on a comparison result as to whether or not said obtained imbalance determining parameter is larger than or equal to a predetermined threshold; and wherein,
said imbalance determining means is configured so as to vary, in accordance with said compression ratio of said engine varied by said compression ratio varying means, at least one of said predetermined threshold and said imbalance determining parameter.

2. The air-fuel ratio imbalance among cylinders determining apparatus of an internal combustion engine according to claim 1, comprising:
air-fuel ratio for feedback control obtaining means for obtaining an air-fuel ratio for feedback control by applying a value based on actual output value of said upstream air-fuel ratio sensor to a first air-fuel ratio conversion table which defines a relationship between said output value of said upstream air-fuel ratio sensor and an air-fuel ratio when said compression ratio is equal to a first compression ratio, and obtaining said air-fuel ratio for feedback control by applying said value based on said actual output value of said upstream air-fuel ratio sensor to a second air-fuel ratio conversion table, which is different from said first air-fuel ratio conversion table, and which defines a relationship between said output value of said upstream air-fuel ratio sensor and an air-fuel ratio, when said compression ratio is equal to a second compression ratio different from said first compression ratio; and
fuel injection amount correcting means for varying an amount of said fuel which is injected in such a manner that said obtained air-fuel ratio for feedback control coincide with a predetermined target air-fuel ratio.

3. The air-fuel ratio imbalance among cylinders determining apparatus of an internal combustion engine according to claim 1, wherein,
said imbalance determining means is configured so as to determine, based on said compression ratio of said engine, said predetermined threshold in such a manner that an amount of unburnt substances flowing out from said catalyst coincides with a constant permissible limit value regardless of said compression ratio, when said imbalance determining parameter becomes a value exceeding said predetermined threshold.

4. The air-fuel ratio imbalance among cylinders determining apparatus of an internal combustion engine according to claim 3, comprising:
air-fuel ratio for feedback control obtaining means for obtaining an air-fuel ratio for feedback control by applying a value based on actual output value of said upstream air-fuel ratio sensor to a first air-fuel ratio conversion table which defines a relationship between said output value of said upstream air-fuel ratio sensor and an air-fuel ratio when said compression ratio is equal to a first compression ratio, and obtaining said air-fuel ratio for feedback control by applying said value based on said actual output value of said upstream air-fuel ratio sensor to a second air-fuel ratio conversion table, which is different from said first air-fuel ratio conversion table, and which defines a relationship between said output value of said upstream air-fuel ratio sensor and an air-fuel ratio, when said compression ratio is equal to a second compression ratio different from said first compression ratio; and
fuel injection amount correcting means for varying an amount of said fuel which is injected in such a manner that said obtained air-fuel ratio for feedback control coincide with a predetermined target air-fuel ratio.

5. The air-fuel ratio imbalance among cylinders determining apparatus of an internal combustion engine according to claim 3, wherein,
said compression ratio varying means includes;
a compression ratio varying mechanism for varying, in response to an instruction signal, a mechanical compression ratio which is a ratio of a volume of said combustion chamber when a piston of said engine is at a bottom dead center to a volume of said combustion chamber when said piston is at a top dead center; and compression ratio control means for providing to said compression ratio varying mechanism said instruction signal to have an actual mechanical compression ratio of said engine become equal to a target mechanical compression ratio determined in accordance with said operating state of said engine.

6. The air-fuel ratio imbalance among cylinders determining apparatus of an internal combustion engine according to claim 5, comprising:

air-fuel ratio for feedback control obtaining means for obtaining an air-fuel ratio for feedback control by applying a value based on actual output value of said upstream air-fuel ratio sensor to a first air-fuel ratio conversion table which defines a relationship between said output value of said upstream air-fuel ratio sensor and an air-fuel ratio when said compression ratio is equal to a first compression ratio, and obtaining said air-fuel ratio for feedback control by applying said value based on said actual output value of said upstream air-fuel ratio sensor to a second air-fuel ratio conversion table, which is different from said first air-fuel ratio conversion table, and which defines a relationship between said output value of said upstream air-fuel ratio sensor and an air-fuel ratio, when said compression ratio is equal to a second compression ratio different from said first compression ratio; and fuel injection amount correcting means for varying an amount of said fuel which is injected in such a manner that said obtained air-fuel ratio for feedback control coincide with a predetermined target air-fuel ratio.

7. The air-fuel ratio imbalance among cylinders determining apparatus of an internal combustion engine according to claim 5, wherein, said imbalance determining means is configured so as to, include a mechanical compression ratio detecting sensor which detects said actual mechanical compression ratio of said engine; and determine said predetermined threshold based on said actual mechanical compression ratio detected by said mechanical compression ratio detecting sensor.

8. The air-fuel ratio imbalance among cylinders determining apparatus of an internal combustion engine according to claim 7, comprising:

air-fuel ratio for feedback control obtaining means for obtaining an air-fuel ratio for feedback control by applying a value based on actual output value of said upstream air-fuel ratio sensor to a first air-fuel ratio conversion table which defines a relationship between said output value of said upstream air-fuel ratio sensor and an air-fuel ratio when said compression ratio is equal to a first compression ratio, and obtaining said air-fuel ratio for feedback control by applying said value based on said actual output value of said upstream air-fuel ratio sensor to a second air-fuel ratio conversion table, which is different from said first air-fuel ratio conversion table, and which defines a relationship between said output value of said upstream air-fuel ratio sensor and an air-fuel ratio, when said compression ratio is equal to a second compression ratio different from said first compression ratio; and fuel injection amount correcting means for varying an amount of said fuel which is injected in such a manner that said obtained air-fuel ratio for feedback control coincide with a predetermined target air-fuel ratio.

9. An air-fuel ratio imbalance among cylinders determining apparatus of an internal combustion engine, applied to a multi-cylinder internal combustion engine having a plurality of cylinders, comprising:

compression ratio varying means for varying a compression ratio of said engine in accordance with an operating state of said engine;

a catalyst disposed, in an exhaust passage, and at an exhaust gas aggregated portion into which exhaust gases discharged from combustion chambers of at least two or more of cylinders of a plurality of said cylinders merge or at a portion downstream of said exhaust gas aggregated portion;

fuel injectors, each being disposed so as to correspond to each of said at least two or more of cylinders and so as to inject a fuel to be contained in a mixture supplied to each of said combustion chambers of said at least two or more of cylinders;

an upstream air-fuel ratio sensor, which is disposed at said exhaust gas aggregated portion or at a position between said exhaust gas aggregated portion and said catalyst in said exhaust passage, which includes a diffusion resistance layer with which an exhaust gas which has not passed through said catalyst contacts, and an air-fuel ratio detecting element, which is covered by said diffusion resistance layer, and which outputs, as an output value of said upstream air-fuel ratio sensor, a signal in accordance with an air-fuel ratio of an exhaust gas reaching said air-fuel ratio detecting element after passing through said diffusion resistance layer;

air-fuel ratio for feedback control obtaining means for obtaining an air-fuel ratio for feedback control by applying a value based on actual output value of said upstream air-fuel ratio sensor to a first air-fuel ratio conversion table which defines a relationship between said output value of said upstream air-fuel ratio sensor and an air-fuel ratio when said compression ratio is equal to a first compression ratio, and obtaining said air-fuel ratio for feedback control by applying said value based on said actual output value of said upstream air-fuel ratio sensor to a second air-fuel ratio conversion table, which is different from said first air-fuel ratio conversion table, and which defines a relationship between said output value of said upstream air-fuel ratio sensor and an air-fuel ratio, when said compression ratio is equal to a second compression ratio different from said first compression ratio; and fuel injection amount correcting means for varying an amount of said fuel which is injected in such a manner that said obtained air-fuel ratio for feedback control coincide with a predetermined target air-fuel ratio.

* * * * *